United States Patent
Chen et al.

(10) Patent No.: US 12,412,103 B1
(45) Date of Patent: Sep. 9, 2025

(54) MONITORING AND VISUALIZATION OF MODEL-BASED CLUSTERING DEFINITION PERFORMANCE

(71) Applicant: Splunk Inc., San Francisco, CA (US)

(72) Inventors: Yanpei Chen, Sunnyvale, CA (US); Archana Ganapathi, Palo Alto, CA (US)

(73) Assignee: SPLUNK LLC, San Jose, CA (US)

( * ) Notice: Subject to any disclaimer, the term of this patent is extended or adjusted under 35 U.S.C. 154(b) by 894 days.

(21) Appl. No.: 17/589,445

(22) Filed: Jan. 31, 2022

Related U.S. Application Data

(60) Provisional application No. 63/143,477, filed on Jan. 29, 2021.

(51) Int. Cl.
  *G06N 5/022* (2023.01)
  *G06Q 30/0201* (2023.01)

(52) U.S. Cl.
  CPC ......... *G06N 5/022* (2013.01); *G06Q 30/0201* (2013.01)

(58) Field of Classification Search
  CPC .......................... G06N 5/022; G06Q 30/0201
  See application file for complete search history.

(56) References Cited

U.S. PATENT DOCUMENTS

| | | | |
|---|---|---|---|
| 5,832,182 A | 11/1998 | Zhang et al. | |
| 6,408,402 B1 | 6/2002 | Norman | |
| 7,359,913 B1 | 4/2008 | Ordonez | |
| 10,546,233 B1* | 1/2020 | Bhattacharyya | G06N 3/063 |
| 10,789,543 B1* | 9/2020 | Sun | G06N 7/01 |
| 11,544,317 B1* | 1/2023 | Pancha | G06F 40/30 |
| 11,862,346 B1* | 1/2024 | Boussios | G16H 50/70 |
| 2003/0083933 A1 | 5/2003 | McAlear | |
| 2006/0026036 A1* | 2/2006 | Mahmood | G06Q 10/04 |
| | | | 703/2 |
| 2010/0159438 A1 | 6/2010 | German et al. | |

(Continued)

OTHER PUBLICATIONS

Final Office Action received for U.S. Appl. No. 17/589,414 dated Dec. 12, 2023, 15 pages.

(Continued)

*Primary Examiner* — David E Choi
(74) *Attorney, Agent, or Firm* — Baker Botts L.L.P.

(57) ABSTRACT

This document discloses methods and systems for cohort identification. The methods and systems include improved calculations to perform cohort identification and practical applications of the improved calculations. Specifically, the systems and methods described herein may utilize key components that include enhancements of existing cohort clustering techniques with regard to selecting a number of cohort input dimensions, normalizing input data using a logarithm kernel-function, treatment of categorical data with mutually exclusive and not-mutually exclusive values, methods and visualization tool to determine appropriate number of cohorts, methods and visualization tool to compare cohorts extracted from different input dimensions, and methods to quantify the difference in cohorts. Beyond improvements to the cohort clustering techniques, also disclosed are ancillary tools to prepare input data by joining CRM and product usage data and facilitate subsequent automated action via an API to retrieve cohort results.

20 Claims, 27 Drawing Sheets

(56) References Cited

U.S. PATENT DOCUMENTS

| | | | |
|---|---|---|---|
| 2012/0041851 A1 | 2/2012 | Tan | |
| 2013/0096835 A1 | 4/2013 | Chok et al. | |
| 2017/0154280 A1 | 6/2017 | Adir et al. | |
| 2018/0144003 A1* | 5/2018 | Formoso | G06N 5/022 |
| 2018/0285526 A1* | 10/2018 | Wickson | G16H 10/20 |
| 2019/0028766 A1 | 1/2019 | Wold et al. | |
| 2020/0175410 A1 | 6/2020 | Panging et al. | |
| 2021/0035658 A1* | 2/2021 | Neumann | G06N 20/00 |
| 2022/0100960 A1* | 3/2022 | Therani | G06F 40/35 |
| 2023/0043354 A1 | 2/2023 | Knicker et al. | |

OTHER PUBLICATIONS

Non Final Office Action received for U.S. Appl. No. 17/589,414 dated Apr. 29, 2024, 18 pages.
Non Final Office Action received for U.S. Appl. No. 17/589,414 dated Aug. 1, 2023, 13 pages.

* cited by examiner

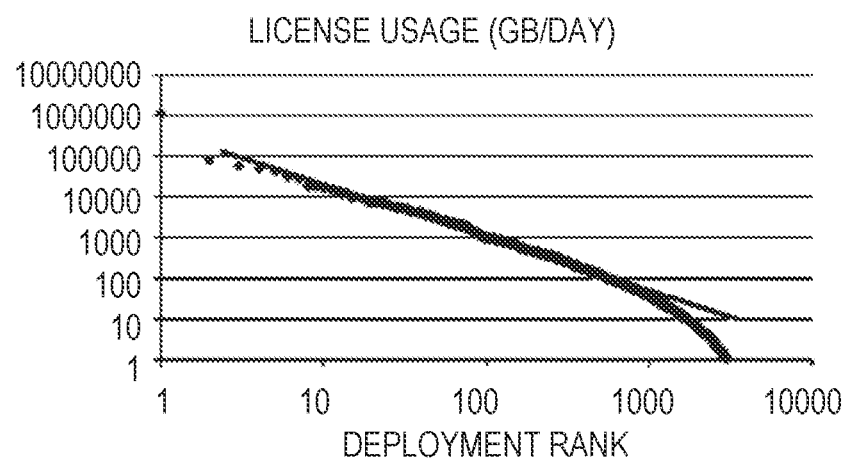
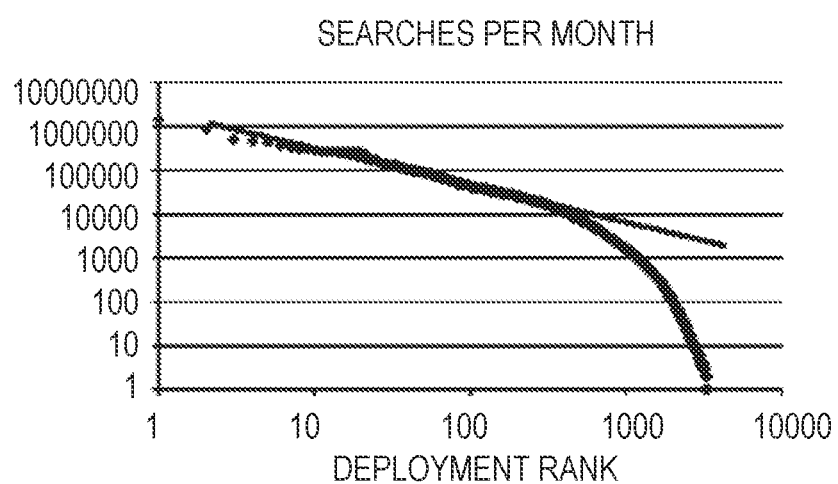
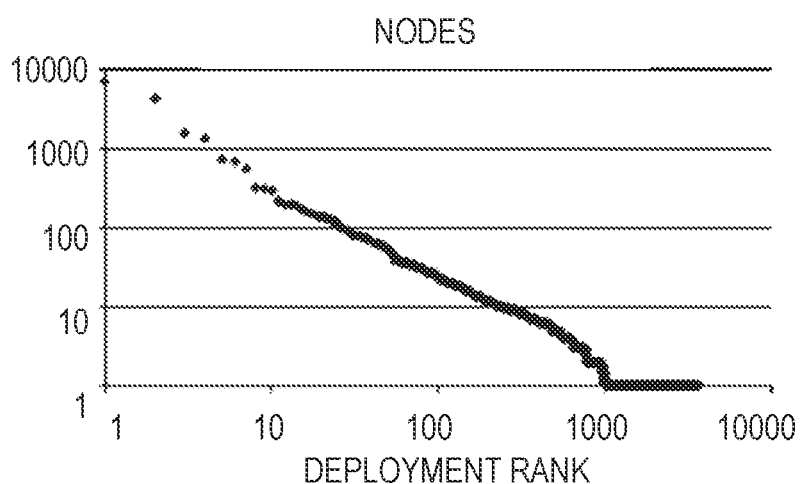
FIG. 1

200
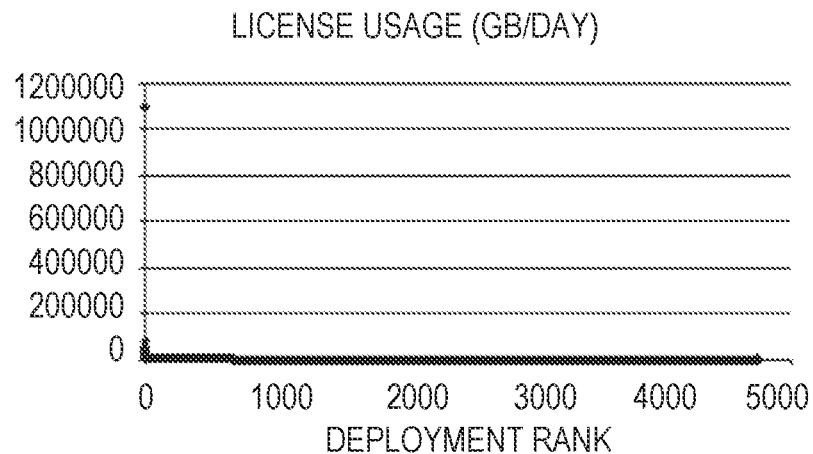
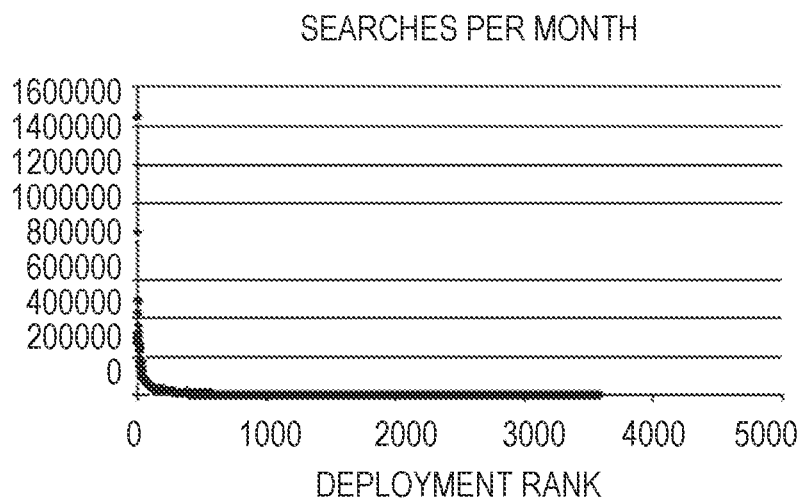
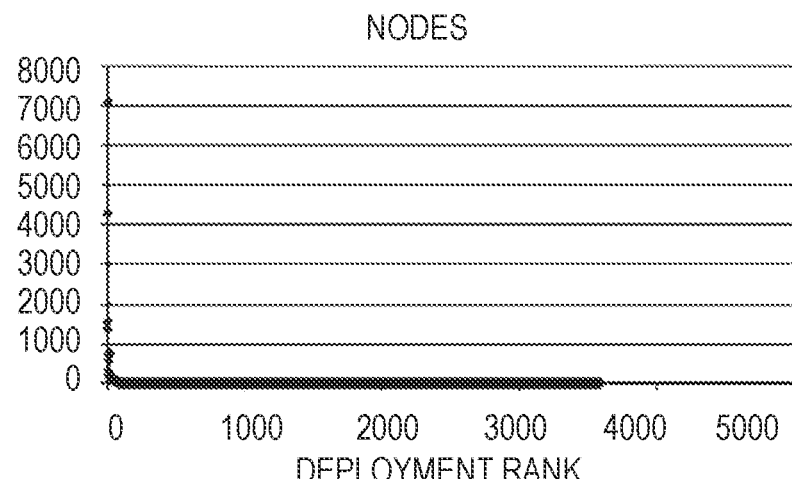
FIG. 2

15. COHORTS OF SIMILAR CLOUD STACKS IN SCALE DIMENSIONS (SET E)

| COHORT | CLOUD STACKS | DAILY SEARCHES | NUMBER OF 3RD PARTY APPS INSTALLED | USER CREATED INDEXES |
|---|---|---|---|---|
| LARGEST STACKS | 277 | 169754.59 | 97.47 | 131.11 |
| LARGER STACKS | 635 | 32928.52 | 65.75 | 60.27 |
| MEDIUM STACKS | 440 | 21938.51 | 40.10 | 14.49 |
| SMALLER STACKS | 437 | 3668.01 | 34.83 | 16.15 |
| SMALLEST STACKS | 263 | 704.41 | 28.68 | 3.68 |

16. COHORTS OF SIMILAR CLOUD STACKS IN SCALE DIMENSIONS (SET F)

| COHORT | CLOUD STACKS | DAILY SEARCHES | MONTHLY PAGE VIEWS | USER CREATED INDEXES |
|---|---|---|---|---|
| LARGEST STACKS | 305 | 124972.62 | 8477.17 | 128.48 |
| LARGER STACKS | 714 | 28173.52 | 1341.00 | 39.75 |
| MEDIUM STACKS | 345 | 14632.97 | 129.99 | 20.86 |
| SMALLER STACKS | 164 | 1850.60 | 9.94 | 6.22 |
| SMALLEST STACKS | 329 | 1772.74 | 340.74 | 7.69 |

COHORTS OF SIMILAR ACCOUNTS -- UP TO FY21-Q2

| DESCRIPTION OF COHORT | # OF CPUS | CUSTOMER AGE | HISTORICAL #CPUS | PRODUCTS BOUGHT |
|---|---|---|---|---|
| >898K # OF CPUS, MANY YEARS WITH XYZ COMPANY, ~898 HISTORICAL CPUS | 1,393.64 | 8.13 YEARS | 84.4 | 3.45 |
| ~898K # OF CPUS, ~2 YEARS WITH XYZ COMPANY, <27 HISTORICAL CPUS | 805.54 | 2.15 YEARS | 2.0 | 1.64 |
| <898K # OF CPUS, ~5 USE CASES, <180 HISTORICAL CPUS | 262.77 | 4.67 YEARS | 14.2 | 2.53 |
| <898K # OF CPUS, MANY YEARS WITH XYZ COMPANY, <80 HISTORICAL CPUS | 134.21 | 9.02 YEARS | 5.6 | 1.96 |
| <90K # OF CPUS, <2 USE CASES, <18 HISTORICAL CPUS | 30.69 | 5.73 YEARS | 1.3 | 1.35 |
| <9K # OF CPUS, <2 USE CASES, <8 HISTORICAL CPUS | 2.83 | 2.11 YEARS | .7 | 1.28 |

FIG. 14

COHORTS OF SIMILAR ACCOUNTS – UP TO FY21-Q2 (CONTINUED)

| DESCRIPTION OF COHORT | USE CASES BOUGHT | % SHARE OF ACCOUNTS | % SHARE OF # OF CPUS | % SHARE OF TOTAL YEARLY CPU USAGE | ANNUAL CPUS AS % ACCOUNTS' # OF CPUS |
|---|---|---|---|---|---|
| >888K # OF CPUS, MANY YEARS WITH XYZ COMPANY, ~888 HISTORICAL CPUS | 9.46 | 8.43% | 16.66% | 55.66% | 0.007% |
| ~888K # OF CPUS, ~2 YEARS WITH XYZ COMPANY, <27 HISTORICAL CPUS | 1.85 | 19.66% | 42.15% | 5.55% | 0.001% |
| <888K # OF CPUS, ~5 USE CASES, <180 HISTORICAL CPUS | 5.18 | 13.65% | 16.80% | 21.51% | 0.012% |
| <888K # OF CPUS, MANY YEARS WITH XYZ COMPANY, <90 HISTORICAL CPUS | 3.06 | 16.03% | 16.18% | 12.37% | 0.005% |
| <90K # OF CPUS, <2 USE CASES, <18 HISTORICAL CPUS | 1.77 | 26.33% | 8.28% | 3.49% | 0.007% |
| <9K # OF CPUS, <2 USE CASES, <9 HISTORICAL CPUS | 1.58 | 18.90% | 0.04% | 1.42% | 0.109% |

DETERMINE A PLURALITY OF SETS OF CLUSTERS FROM A FIRST NUMBER (N) OF DATA POINTS, EACH SET OF CLUSTERS COMPRISING A DIFFERENT NUMBER (K) OF CLUSTERS
1702

FOR EACH SET OF CLUSTERS IN THE PLURALITY OF SETS OF CLUSTERS, DETERMINE A RESIDUAL ERROR (RK) FOR THE N DATA POINTS
1704

CAUSE A USER INTERFACE TO BE PRESENTED ON A DISPLAY DEVICE, THE USER INTERFACE COMPRISING A GRAPH THAT INDICATES RK AS A FUNCTION OF K FOR THE PLURALITY OF SETS OF CLUSTERS
1706

```
┌─────────────────────────────────────────────────────────────┐
│  APPLY A CLUSTERING ALGORITHM TO A FIRST DATA SET           │
│  COMPRISING FIRST DATA POINTS TO DETERMINE A FIRST          │
│  CENTER POINT FOR EACH OF A NUMBER (K) OF FIRST CLUSTERS    │
│  AND ASSIGN EACH DATA POINT IN THE FIRST DATA SET TO A      │
│                    FIRST CLUSTER                            │
│                         1802                                │
└─────────────────────────────────────────────────────────────┘
                              │
                              ▼
┌─────────────────────────────────────────────────────────────┐
│  APPLY THE CLUSTERING ALGORITHM TO A SECOND DATA SET        │
│  COMPRISING SECOND DATA POINTS TO DETERMINE A SECOND        │
│  CENTER POINT FOR EACH OF K SECOND CLUSTERS AND ASSIGN      │
│  EACH DATA POINT IN THE SECOND DATA SET TO A SECOND         │
│                       CLUSTER                               │
│                         1804                                │
└─────────────────────────────────────────────────────────────┘
                              │
                              ▼
┌─────────────────────────────────────────────────────────────┐
│  DETERMINE, FOR EACH SECOND CENTER POINT, A DIFFERENCE      │
│    VECTOR FROM A NEAREST FIRST CENTER POINT TO THE          │
│                  SECOND CENTER POINT                        │
│                         1806                                │
└─────────────────────────────────────────────────────────────┘
                              │
                              ▼
┌─────────────────────────────────────────────────────────────┐
│       BASED ON THE DETERMINED DIFFERENCE VECTORS,           │
│  DETERMINE A DIFFERENCE MEASURE BETWEEN THE FIRST           │
│       CLUSTERS AND THE SECOND CLUSTERS                      │
│                         1808                                │
└─────────────────────────────────────────────────────────────┘
                              │
                              ▼
┌─────────────────────────────────────────────────────────────┐
│  CAUSE A USER INTERFACE TO BE PRESNTED ON A DISPLAY         │
│  DEVICE, THE USER INTERFACE COMPRISING AN INDICATION OF     │
│                 THE DIFFERENCE MEASURE                      │
│                         1810                                │
└─────────────────────────────────────────────────────────────┘
```

FIG. 18

MONITORING AND VISUALIZATION OF MODEL-BASED CLUSTERING DEFINITION PERFORMANCE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a set of three graphs drawn on logarithmic axes.
FIG. 2 is a set of three graphs drawn on linear axes.
FIG. 10 is a diagram illustrating data, according to an example, labeled "Set E.
"
FIG. 12 is a diagram illustrating data, according to an example, labeled "Set F.
"
FIG. 14 is a diagram illustrating a user interface, according to an example, for viewing data of cohorts of similar accounts.
FIG. 15 is a diagram illustrating a user interface, according to an example, for viewing data of cohorts of similar accounts.
FIG. 17 is a flowchart illustrating an example process for providing a user interface comprising a graph of residual error as a function of a number of clusters.
FIG. 18 is a flowchart illustrating an example process for providing a user interface comprising an indication of differences between clusters generated using the same clustering model on different data sets.

DETAILED DESCRIPTION

Figure 3:
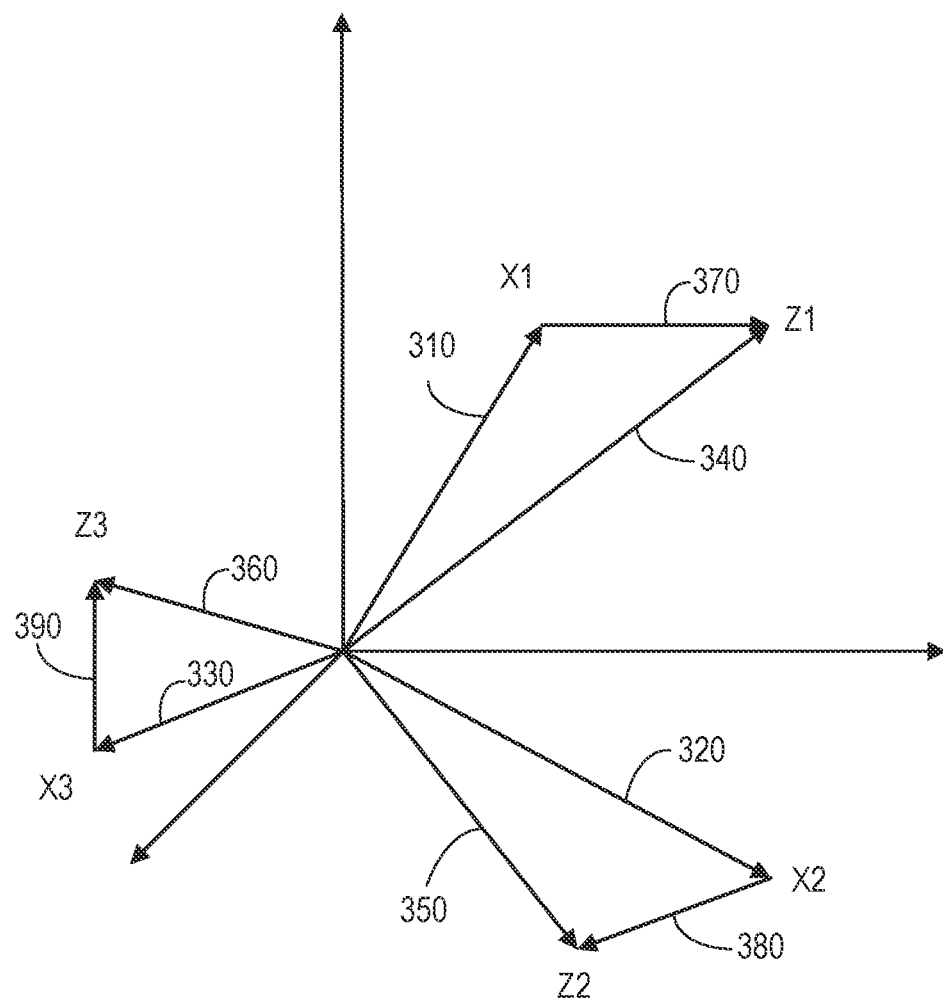
FIG. 3 illustrates a fractional change between two sets of clustering results.

This document discloses methods and systems for customer cohort identification. The methods and systems include generating and evaluating a large number of machine learning models for performing cohort identification, and practical applications of the models. Such machine learning models may be referred to herein as cohort identification models, cohort clustering models, or clustering models. In one practical application, the systems and methods may be utilized to perform cohort identification based on combined Customer Relationship Management (CRM) data including customer profile data and machine-generated product usage data. For example, the combined CRM data and machine-generated product usage data may be generated by and received from an XYZ Company. Specifically, the systems and methods described herein may utilize key components that include enhancements of existing cohort identification/clustering algorithms with regard to selecting a number of cohort input dimensions, normalizing input data using a logarithm kernel-function, treatment of categorical data with mutually exclusive and not-mutually exclusive values, methods and visualization tool to determine appropriate number of cohorts, methods and visualization tool to compare cohorts extracted from different input dimensions, and methods to quantify the difference in cohorts. Beyond improvements to cohort identification/clustering techniques, also disclosed are ancillary tools to prepare input data by joining CRM and product usage data, and facilitate subsequent automated action via an application programming interface (API) to retrieve cohort results.

An example cohort identification model may receive as input a large dataset of CRM data, and product usage data automatically generated by customers using a software product. The dataset may initially have high volume, potentially billions of data points. When input into the cohort identification model, the data may be aggregated and condensed into far fewer data points, potentially hundreds, thousands, or tens of thousands of data points. The cohort identification model may generate a cohort structure by grouping the data points with similar product usage into a number of cohorts of data points. For example, the cohort identification model can group customers by multiple dimensions of product usage, with customers of similar product usage being grouped together in the same cohort.

A particular cohort identification model may utilize K-means clustering. In one example, the cohort identification model may utilize K-means clustering as its core. The cohort identification model may augment the classic K-means techniques with a number of enhancements. These augmentations are generally applicable for all clustering methods, with K-means being merely a specific example.

1.0 Selecting Combinations of Input Dimensions

Real world semantics and constraints require aggregating potentially billions of raw data points into a potentially far smaller number of data points for cohort input. Concurrently, cohorts involving more inputs may capture more descriptive and complex behavior. However, if too many cohort dimensions are included for a given number of data points, the cohort structure, or cohort definition, constructed may become "overfitted," in the sense that each cohort specifically fits the statistical variations in the input data, while failing to capture general behavior of the real world systems being analyzed.

For example, if there are, e.g., 100 data points, each having 100 dimensions, and a cohort structure is constructed using all 100 input dimensions, then a degenerate and perfectly-fit cohort assignment may be constructed where each of the cohort corresponds to a data point. However, such a set of cohorts conveys no information about the actual groupings and commonality among data points. That said, if there are, e.g., 100 data points, and 10 input dimensions are desired, is that too many? This disclosure includes a method to systemically answer and practically applies this category of questions.

For illustration, assume there are N data points. The system revolves around this question: If the N data points are spread across D cohort input dimensions, is there enough information in each of the D dimensions?

The described techniques construct a solution in reverse. If there are D dimensions, and each carries one bit of information (i.e., a true/false or high/low), then there are $2^1=2$ values in each dimension, and $(2^1)^D=2^D$ data points in total. Generalizing, if each of D dimensions carries B bits of information, there are $2^B$ values in each dimension, and $2^{BD}$ data points in total. So, if $$B = \frac{1}{D}\log2(N)$$

bits of information.

A threshold value B_threshold may be set, such that if B<B_threshold, the system will recommend not proceeding with cohort construction, because the available N data points do not carry enough information to support the D proposed cohort dimensions.

Existing clustering techniques, including K-means, operate without knowledge about the semantics of the input dimensions. They give out answers regardless of whether the input dimensions are too many, meaningless, or overfitted. The existing knowledge regarding the use of clustering models assumes (1) an abundance of data and (2) the number of input dimensions are small and well-known (e.g., group individuals into cohorts based on data for height, age, and weight for a large population). Where there was initially limited data, the existing knowledge assumes that either a larger population can be surveyed or a longer observational period can generate more data. Hence there has been no systematic prior exploration regarding the problem of determining the appropriate number of input dimensions for clustering.

In a provided example, cohorts are identified for cloud stacks offered by XYZ Company, XYZ Company customers, XYZ Company searches, customer support cases, and other business and product concepts based on dimensions of product usage, such as volume of data ingested and searched, and dimensions customer firmographics, such as customer age and historical customer purchase.

In one instance, the available number of data points is as few as around 2300. Using the system and setting B_threshold=3=log 2(8)=no fewer than 8 data points per dimension, the following parameters for cohort construction were recommended:

$$D = 1, B = \frac{1}{1}\log2(2300) = 11.2 > B \text{ threshold, cohort acceptable}$$

$$D = 2, B = \frac{1}{2}\log2(2300) = 5.6 > B \text{ threshold, cohort acceptable}$$

$$D = 3, B = \frac{1}{3}\log2(2300) = 3.7 > B \text{ threshold, cohort acceptable}$$

$$D = 4, B = \frac{1}{4}\log2(2300) = 2.8 > B \text{ threshold,}$$

cohort inappropriate and will overfit

The system selects D=3 as the maximum number of input dimensions. Thus, any number of input dimensions, up to 3, can be used to appropriately generate a model for constructing cohort groups. Additionally, given that there can be multiple candidate input dimensions available, after finding the number of input dimensions to use, further steps are taken to select which D dimensions to use. This selection of which dimensions to use may include comparing different candidate cohorts structures with different groupings of candidate dimensions.

2.0 Normalization for Long-Tailed Distributions

The input data to the machine learning model is machine generated, therefore different dimensions of monitored product usage often have vastly different numerical scales. Sometimes one dimension can have numerical values that are millions of times larger than those of other dimensions. Left in their original form, small statistical fluctuations in a dimension with large numerical values may completely hide signals in dimensions with smaller numerical values. Hence there is a need to bring the different numerical dimensions to approximately the same numerical range, a process called "normalization."

The existing knowledge, which does not apply normalization is insufficient in this regard because machine generated data often has long-tail distributions, where the largest outliers in any dimension are far larger than the most common data points in the same dimension. Disclosed herein is a method and practical applications for normalization to address this issue.

A base-10 logarithm function is applied to normalize data in all dimensions. In other words, for each dimension of each data point, values_normalized=log 10(values_raw) and the values_normalized is used as input for the cohort. In other examples, other bases for the logarithm may be used (e.g., base-2).

In the disclosed techniques, for dimensions of different numerical ranges and different numerical offsets, increases of the same multiple between two pairs of values will be normalized to the same value. For example, if dimension D1 has range of 0 to 1000, dimension D2 has range of 1,000,000 to 100,000,000, an increase of 10× from, say, 5 to 50 in D1 and 10,000,000 to 100,000,000 in D2 will both become a difference of log 10(50)–log 10(5)=log 10(100,000,000)–log 10(10,000,000)=log 10(50/5)=log 10(100,000,000/10,000,000)=log 10(10)=1. This property is highly desirable because it encodes the view that increases or decreases of the same multiple are "equal," regardless of the range and offset of data values in each dimension.

This normalization is applied on all numerical dimensions, except dimensions representing percentage values ranging from 0 to 100%. Dimensions with percentage values should be left without the logarithmic normalization, because logarithm of 0 is undefined. This treatment is better than the alternative of applying logarithm normalization but having a potentially sizable fraction of values becoming undefined and therefore NULL. Treatment of dimensions with non-numerical categorical data is described further below in Section 3.0.

The techniques described herein represent a significant advance over the existing knowledge. For instance, the standard normalization method in the existing knowledge uses the "standard score" construct (i.e., value_normalized= (value_raw−mean)/standard_deviation, where mean and standard_deviation are respectively the numerical mean and standard deviation of each dimension). While the "standard score" works well for most every-day data and data that closely resemble the Gaussian (Normal) distribution, and hence the name "normalization," this standard method utterly fails for long-tailed distributions. For long-tailed distributions, such as an empirically common Zipf distribution, the mean and standard deviation are determined by the largest few outliers, and normalization using the standard score construct in the existing knowledge will result in the vast majority of the data points bunched together into a small numerical range with little variation, and a few outliers occupying the vast majority of the numerical range.

The described logarithm kernel function overcomes this shortcoming by spreading data points of all ranges evenly. For example, raw values of common data points from 1 to 10 will occupy the same normalized range as raw values of outliers from 1,000,000 to 10,000,000.

The logarithm kernel function used to normalize cohort inputs represents a specific example of the general category of "positive definite kernel functions." The properties and applications of these functions are areas of active research in machine learning and general mathematics.

Examples (1) require a kernel function for normalization prior to cohort building, (2) specifically use the logarithm function as the most appropriate kernel function, and (3) leave percentage data un-normalized, represents an advance over the existing knowledge.

FIG. 1 illustrates a set of three graphs drawn on logarithmic axes. Many product usage data follow long-tailed statistical distributions, such as the Zipf distribution. For example, the graphs shown in FIG. 1 on logarithmic axes of rank versus size for some product usage dimensions show the tell-tale signatures of a Zipf distribution, straight-line under logarithmic axes.

FIG. 2 is a set of the same three graphs drawn on linear axes. These graphs make it visually obvious that these data distributions are nothing like the more familiar Gaussian distributions. Viewed in linear space used by the "standard score" calculations in the existing knowledge, there is no structure and no signals. However, viewed in logarithmic space, the structures in the data distributions emerge.

3.0 Processing of Categorical Data 3.1 Data with Mutually Exclusive Values

Categorical data is non-numerical data such as Boolean (true/false) or one or more categories (A, B, C, D, etc.). In operation, such data arises routinely as, for example, different types of searches, the industry sector to which a customer belongs, and the like. It is desirable to include such information in cohort identification. However, the non-numerical and unordered nature of such data requires special treatment. The following section deals with the treatment of categorical data with mutually exclusive values (i.e., each data point can have only one of several possible categories).

Given input data dimension D contains categorical data of n distinct and mutually exclusive values (V1, V2, . . . Vn), a system performs the following data conversion:

1. Expand D into n distinct dimensions of indicator functions, corresponding to each of the distinct values. Specifically, replace Column D (corresponding to the categorical data) in the data table with Columns D_V1, D_V2, . . . D_Vn.
2. For each row in the table, if originally D=Vj for one of the values, assign D_Vj to have value 1, and other indicator dimensions D_Vi with i≠j to have value 0.
3. Multiply by $1/\sqrt{2}$ each of dimensions D_V1, D_V2, . . . D_Vn. Hereafter, if originally D=Vj for one of the values, D_Vj will have value $1/\sqrt{2}$, and other indicator dimensions D_Vi with i≠j to have value 0.
4. If a row in the data table has a NULL value for column D, each of the D_V1, D_V2, . . . D_Vn new columns is filled with value $1/(2\sqrt{2})$.

The rationale behind this treatment is to have the dimension D carry the same Euclidean (L2) distance weight regardless of how many distinct values D has. Processes 1-4 prevent the combined indicator dimensions from becoming overweighted when applying the clustering model.

To illustrate this concern, suppose the input data table has two columns including Column A and Column D. Column A contains numerical data values after logarithm kernel normalization described above. Column D contains a Boolean (true=1, false=0) variable. In this space, a data point of values (A=a, D=1) and a data point of values (A=a, D=0) has Euclidean (L2) distance of 1.

Alternately, if the input data table includes two columns including Column A and Column D, with Column A as before, but Column D now has three distinct, mutually exclusive values (V1, V2, V3), the expansion into three indicator functions will cause the values of D to be graphed into 3-dimensional space. In this space, without additional treatment, a data point of values (A=a, D_V1=1, D_V2=0, D_V3=0) and a data point of values (A=a, D_V1=0, D_V2=0, D_V3=1) has Euclidean (L2) distance of $\sqrt{(a-a)^2+(1-0)^2+(0-0)^2+(0-1)^2}=\sqrt{2}$. Note, because the distinct values of D are mutually exclusive, the distance is (2 regardless of the number of mutually exclusive, distinct values. Hence, to re-normalize the distance to the same as that for a Boolean dimension, a factor of $1/\sqrt{2}$ is applied. Using this logic, the NULL value is merely the "middle" value of ½ normalized by the additional factor of $1/\sqrt{2}$. Hence NULL values are converted to $1/(2\sqrt{2})$.

Although existing techniques are known to convert categorical data into multiple indicator functions with values 1, 0, such existing techniques do not apply a further weighting factor to the indicator functions, or determine the exact weighting factor to be applied. Thus existing techniques leave categorical data either overweighted or underweighted when run through subsequent clustering techniques. Thus, the described solutions for categorical data with mutually exclusive values, including: (1) the indicator functions should be further weighted, (2) the weight may be set to $1/\sqrt{2}$, and (3) NULL values may be converted to $1/(2\sqrt{2})$, represent an advance over the existing knowledge in accordance with one example.

This model enhancement may be practically applied when the cohort data input contains categorical data with mutually exclusive values. For example, when performing cohort extraction for common XYZ Company search cohorts, this method may be used to incorporate XYZ Company search types, which has one of the values of "ad-hoc," "scheduled," "data model acceleration," "report acceleration," and/or "other." Alternately, when performing customer cohort extraction, this method may be used to incorporate the customer's industry sectors, which has one of the values of, for example, "Communications, Media, Technology", "Financial Services", "Healthcare & Lifesciences", "Manufacturing & Retail", "Public Sector", "Resources", "Services", and/or "Others."

3.2 Data with Non-Mutually Exclusive Values

The described systems and methods further deal with the treatment of categorical data with non-mutually exclusive values (i.e., each data point can have one or more of several possible categories). Given input data dimension D contains categorical data of n distinct and non-mutually exclusive values (V1, V2, . . . Vn), a system performs the following data conversion.

1. Expand D into n distinct dimensions of indicator functions, corresponding to each of the distinct values. Specifically, replace Column D (corresponding to the categorical data) in the data table with Columns D_V1, D_V2, . . . D_Vn.

2. For each row in the table, if originally D=(V_j1, V_j2, . . . Vjm), assign D_V_j1, D_V_j2, . . . D_V_jm to have value 1, and other indicator dimensions D_Vi with i≠(j1, j2, . . . jm) to have value 0.

3. Multiply by $1/\sqrt{n}$ each of dimensions D_V1, D_V2, . . . D_Vn. Hereafter, if originally D=(V_j1, V_j2, . . . Vjm), D_V_j1, D_V_j2, . . . D_V_jm will have value $1/\sqrt{n}$, and other indicator dimensions D_Vi with i≠(j1, j2, . . . jm) will have value 0.

4. If a row in the data table has a NULL value for column D, each of the D_V1, D_V2, . . . D_Vn new columns is filled with value $1/(2\sqrt{n})$.

The rationale behind this treatment is to have the dimension D carry the same Euclidean (L2) distance weight regardless of how many distinct values D has. Processes 1-4 prevent the combined indicator dimensions from becoming overweight when applying the clustering model.

To illustrate this concern, suppose the input data table has two columns including Column A and Column D. Column A contains numerical data values after logarithm kernel normalization described earlier. Column D contains a Boolean (true=1, false=0) variable. In this space, a data point of values (A=a, D=1) and a data point of values (A=a, D=0) has Euclidean (L2) distance of 1.

Alternately, if the input data table includes two columns including Column A and Column D, with Column A as before, but Column D now has three distinct, non-mutually exclusive values (V1, V2, V3), the expansion into three indicator functions will cause the values of D to be graphed into 3-dimensional space. In this space, without additional treatment, a data point of values (A=a, D_V1=1, D_V2=0, D_V3=0) and a data point of values (A=a, D_V1=0, D_V2=1, D_V3=1) has Euclidean (L2) distance of $\sqrt{(a-a)^2+(1-0)^2+(1-0)^2+(0-1)^2}=\sqrt{3}$. In extremis, if D has a large number n of non-mutually exclusive values, the distance between two data points that differ in only D can become as high as $\sqrt{n}$ and grows unbounded. Hence, to re-normalize the distance to the same as that for a boolean dimension, a factor of $1/\sqrt{n}$ is applied. Using this logic, the NULL value is merely the "middle" value of ½ normalized by the additional factor of $1/\sqrt{n}$. Hence NULL values are converted to $1/(2\sqrt{n})$.

As mentioned above, existing techniques do not apply a weighting factor to the indicator functions, no determine the exact weighting factor to be applied, leaving categorical data either overweighted or underweighted when run through subsequent clustering techniques. Thus, the described solution for categorical data with non-mutually exclusive values, (1) the indicator functions should be further weighted, that (2) the weight should be $1/\sqrt{n}$, and (3) NULL values should be converted to $1/(2\sqrt{n})$, represent an advance over existing solutions.

This enhancement is applied concretely when the cohort data input contains categorical data with non-mutually exclusive values. For example, when performing cohort extraction for XYZ Company cloud stacks, this method may be used to incorporate the stack's list of products installed, which may be, in an example, one or more of "Cloud", "ES", and "ITSI" (n=3). As another example, when performing cohort extraction for XYZ Company customers, this method may be used to incorporate the customer's list of use cases purchased, which may be one or more of "Application Performance Analytics (IT Ops)," "Business Analytics," "DevOps (IT Ops)," "Infrastructure & Operations Management," "SIEM (Security)," "Security Investigation," "Service Intelligence (IT Ops)," "User Behavior Analytics (Security)," and "Others."

4.0 Comparison and Analysis of Model Characteristics and Constructed Candidate Cohorts Definitions Once the data is prepared as described above, it is input to train a machine learning model to produce various candidate cohort structures (also referred to as "candidate cohort definitions") with one or more cohort clusters. Each candidate cohort definition may be based on a different number of input dimensions and/or a different combination of selected input dimensions. Furthermore, each candidate cohort definition may be configured to organize the data into different numbers of cohort clusters. A candidate cohort definition may then be selected based on various cohort quality measures based on analysis of the generated clusters as discussed below.

4.1 Determination and Visualization of Appropriate Number of Cohorts

Existing clustering techniques can identify an arbitrary number of clusters or cohorts, and leaves it up to the user to determine what should be the appropriate number of clusters or cohorts. Thus, the existing knowledge on this topic does not offer a sufficiently thorough consideration of all factors involved. Accordingly, the systems and visualization tool presented herein is an improvement.

In contrast, the described systems and methods are configured to determine and visualize the optimal number of cohorts for a trained model. Given input data prepared as described above, the following example is provided:

1. Run the clustering model for the number of clusters K=1 to 10.
2. For each K=k, display the table of cohort/cluster centers, and the fraction of data points in each.
3. For each K=k, calculate the sum residual error Rk between the data points and their corresponding cohort/cluster centers. Display a graph of Rk vs K.
4. Calculate the fractional decrease in Rk going from K=k−1 to K=k. Display a graph of the fractional decrease in Rk vs K.
5. Calculate the fraction of all data points that shifts between cohorts/clusters going from K=k to K=k+1. Display a weighted directional graph of the movement of data points as K is increased. The nodes of the graph correspond to cohort centers at each K. The directional weighted edges of the graph correspond to the fraction of data points.
6. Upon user input, expand the displays in Steps 2 to 5 to cover K=11 to 20.

In this example, an upper limit of K=20 may be chosen because beyond that, it becomes difficult to take follow-up automated or manual actions based on a fragmented group of data cohorts. Displayed alongside one another, the visualizations in Steps 2-5 allows a thorough assessment of how many natural cohorts the data actually contains.

The combination of the above-mentioned steps are cutting edge. Each of these methods (e.g., 1, 2, 3, 4, 5, and 6), by themselves, often give ambiguous signals on how many natural clusters there are in the data. However, as combined, the different methods give a thorough picture of the underlying data greater than the sum of component parts. Additionally, there are no existing automated tools for performing Steps 3-5, which would require considerable effort to construct without the systems and methods disclosed herein. Hence, (1) the combination of methods, (2) the automation of methods, and (3) the combined display of the results from the different methods, are all advances over the prior art.

In particular, the automation of the above allows construction of method to compare cohort results using different candidate data input dimensions. As further discussed below, the method involves comparing the cohort results of 10s or even 100+ combinations of candidate data input dimensions, thus requiring a fast and repeatable way of determining the number of natural cohorts for each combination of input dimensions.

This method may be used in identifying cohorts for XYZ Company customers, XYZ Company cloud stacks, XYZ Company searches, XYZ Company users, and various other business and technology concepts at XYZ Company.

4.2 Determination and Visualization of Cohorts Extracted from Different Input Dimensions Given that the most informative input dimensions are not known a priori, and only a limited number of dimensions can be considered at once, it becomes necessary to enumerate the different combinations of candidate dimensions and compare the cohort results. The systems and methods disclosed herein include a method and visualization tool to do just that.

Given a data table where each of N rows is a data point and each of C columns is a candidate input dimension for cohort/clustering, examples do the following:

1. Determine the number of dimensions D that can be input concurrently based on the number of data points and a predetermined threshold, as discussed earlier.
2. Enumerate the $$\binom{C}{D}$$

combinations of candidate input dimensions.
3. For each combination of candidate dimensions:
   3.1. Perform logarithmic normalization.
   3.2. Convert any categorical data to numerical data.
   3.3. Display cohorts/clustering results for several different numbers of clusters and determine the number of cohorts/clusters to use.
   3.4. Based on user input, save the cohorts/clustering results for a particular number of cohorts/clusters. Specifically, save the table of cohort centers along with the fraction of data points assigned to each cohort.
4. For each of $$\binom{C}{D}$$

combinations of candidate input dimensions, display the table of results from Step 3.4 above.

In the above, $$\binom{C}{D}$$

represents the binomial coefficient with C being the number of candidate input dimensions, and D being the number of candidate input dimensions that can be considered at once.

For example, during cohort identification for XYZ Company cloud stacks, D=3 from ~2300 data points, and C=10, for a total of $$\binom{10}{3} = 120$$

combinations of candidate input dimensions. Without the systems and methods disclosed herein, it becomes intractable to compare so many combinations of input dimensions.

Existing clustering methods assume that the input dimensions are either few and well-known (e.g., group individuals into cohorts based on data for height, age, and weight for a large population). Where the input dimensions are not well-known, the existing methods do not tackle the problem altogether. The problem was deferred to "feature engineering" of input dimensions, while there is unactionable acknowledgement that the selection of "input features" will greatly impact the output of clustering models. Either way, the need to enumerate candidate input dimensions was not understood.

The behavior of software systems is complex, not nearly as well characterized, and subject to potential change based on changes in software design and customer behavior. Hence, it is not known which combinations of the candidate input dimensions will allow actionable cohorts to be extracted. The cohort results may be used to drive subsequent, concrete business and software automation processes. Since it is unacceptable to say, "selection of input features would greatly impact the cohort output results," the most appropriate set of input dimensions and the most appropriate cohort outputs need to be found. Thus, the need to enumerate and compare all potentially relevant cohort dimensions is relatively new, and the systems and methods disclosed herein fill a gap in the existing knowledge.

In the example of cohort identification for XYZ Company cloud stacks, the data indicated D=3 from ~2300 data points, and C=10, for a total of $$\frac{10}{3} = 120$$

combinations of candidate input dimensions. Ultimately, application of the disclosed systems and methods could allow for narrowing down to three combinations of input dimensions, yielding three complementary perspectives on what are cohorts of XYZ Company cloud stacks. Without the systems and methods disclosed herein, it will be intractable to compare so many combinations of input dimensions.

4.3 Quantifying Continuous Changes in Constructed Cohorts

Once the most appropriate input dimensions and number of cohorts are determined, it becomes important to monitor how the resulting cohorts change over time or change across population samples. There are no existing methods or techniques to quantify the difference in cohort results. To address this, the described systems and methods may also be configured to quantify and visualize changes in cohort groups constructed by a given model over time. Such techniques may also be applied to quantify and visualize differences in cohort groups constructed by different models.

FIG. 3 illustrates a fractional change between two sets of clustering results. Given two sets of results from a clustering model applied on two different data sets with the same data input schema, taken from different points in time, or different population samples, or some other contexts, the difference between the two sets of results is calculated thus:

Result 1:
Cohort/cluster centers: (X1, X2, . . . Xk), each a multi-dimensional vector of values for each of the input dimensions, representing the center of each cohort/cluster. Cohort/cluster centers X1, X2, and X3 are shown in FIG. 3 as vectors 310, 320, and 330.
Cohort/cluster assignments: (a1, a2, . . . ak), each a scalar fractional number, summing to 1, representing the fraction of input data points assigned to each cohort/cluster.

Result 2:
Cohort/cluster centers: (Y1, Y2, . . . Yk), each a multi-dimensional vector of values for each of the input dimensions, representing the center of each cohort/cluster.
Cohort/cluster assignments: (b1, b2, . . . bk), each a scalar fractional number, summing to 1, representing the fraction of input data points assigned to each cohort/cluster.

If the input data changed significantly, there may be major re-arrangement in the cohort centers. Hence, find cohort centers (Z1, Z2, . . . Zk) such that Zi=the vector in (Y1, Y2, . . . Yk) that is the nearest neighbor to X1. Find the corresponding cohort assignments (c1, c2, . . . ck) such that ci=the corresponding value in (c1, c2, . . . ck) for the cohort center Zi. Cohort/cluster centers Z1, Z2, and Z3 are shown in FIG. 3 as vectors 340, 350, and 360.

At this point, there are two sets of results re-arranged with pair-wise closest-neighbors for cohort centers and the corresponding cohort assignments:

(1) Cohort/cluster centers: (X1, X2, . . . Xk), (Z1, Z2, . . . Zk)
(2) Cohort/cluster assignments: (a1, a2, . . . ak), (c1, c2, . . . ck)

The difference between the two set of results is calculated as:

$$\text{Difference} = a1\left(|c1 - a1| + \frac{|Z1 - X1|}{|X1|}\right) + a2\left(|c2 - a2| + \frac{|Z2 - X2|}{|X2|}\right) \ldots ak\left(|ck - ak| + \frac{|Zk - Xk|}{|Xk|}\right)$$

Where $|c-a|$ represents the magnitude or absolute function for c, a being scalars, and $|Z-X|$ represents the magnitude or Euclidean (L2) distance function for Z, X being vectors. The difference vectors between Z1 and X1, Z2 and X2, and Z3 and X3 are shown in FIG. 3 as vectors 370, 380, and 390, respectively.

This difference measure is a fractional number, and has the following key properties:

Property 1: If the cohort/cluster centers are unchanged, the difference measure reduces to a weighted sum of the difference in cohort/cluster assignments, for example, $$\text{Difference} = a1(|c1-a1|) + a2(|c2-a2|) \ldots ak(|ck-ak|).$$

For example, if there are two cohorts with unchanging centers and the cohort assignments changed from (0.9999, 0.0001) of the data points to (0.0001, 0.9999) of the data points, the difference is $0.9999(|0.0001-0.9999|)+0.0001(|0.9999-0.0001|) \approx 1$, that is, the entirety of the cohort assignments changed, hence the fractional difference is 1=100%.

Likewise, if the assignments from two cohorts with unchanging centers went from (0.9999, 0.0001) of the data points to (0.5, 0.5) of the data points, the difference is 0.9999(|0.5−0.9999|)+0.0001(|0.5−0.0001|), 0.5, that is, half of the cohort assignments changed, hence the fractional difference is 0.5=50%.

Property 2. If the cohort/cluster assignments are unchanged, the difference measure reduces to a weighted sum of the fractional change in Euclidean (L2) distance movement in cohort/cluster centers, for example, $$\text{Difference} = a1\left(\frac{|Z1-X1|}{|X1|}\right) + a2\left(\frac{|Z2-X2|}{|X2|}\right) \ldots ak\left(\frac{|Zk-Xk|}{|Xk|}\right).$$

Graphically, |Z1−X1| is the Euclidean (L2) distance between cluster centers, and |X1| is the distance between the original and the initial cluster center. The collection of points with the same fractional change of f around a point X1 forms a hypersphere of radius f|X1| around X1.

For example, if there are three cohorts with unchanging cohort assignments, and two of the cohort centers are unchanged, and the cohort center of the third is doubled in all dimensions, then the difference measure becomes $$a1(0) + a2(0) - a3\left(\frac{|2X3-X3|}{|X3|}\right) = a3,$$

that is, the collection of all cohort centers move by the fractional movement of the third cohort center, weighted by the fraction of data points assigned to the third cohort (i.e., 1*a3=a3).

Similarly, if each of the cohort centers move by 0.1, then the difference aggregated across all cohorts is a1(0.1)+a2(0.1)+ . . . ak(0.1)=(a1+a2+ . . . ak) 0.1=0.1, since the fractional assignments of data points to each cohort sum to 1.

When different cohort centers move different amounts and different cohort assignments move different amounts, the overall difference measure is a weighted sum of all the changes.

Typically, applications of existing clustering models carry a sense of "one-time discovery." Hence there has been insufficient attention on the comparison between different clustering results. In contrast, examples disclosed herein provide a leading application of clustering models for "continuous operations," hence it becomes necessary to define an objective measure of the difference between two results of a clustering model.

This system may be used to calculate the change in customer cohorts across two financial quarters. In the example that follows, the input dimensions are deliberately omitted; their numerical values are those after the logarithm normalization described earlier.

Cohorts from FY2020-Q2:

| Cohort | Fraction of data points | Dimension 1 | Dimension 2 | Dimension 3 | Dimension 4 | Dimension 5 |
| --- | --- | --- | --- | --- | --- | --- |
| 0 | 0.25 | 1.21 | 1.35 | 1.65 | 9.01 | 4.45 |
| 1 | 0.14 | 1.41 | 1.68 | 8.01 | 8.31 | 5.15 |
| 2 | 0.23 | 1.04 | 1.41 | 2.15 | 6.50 | 4.04 |
| 3 | 0.10 | 1.76 | 4.37 | 3.15 | 8.62 | 5.24 |
| 4 | 0.06 | 2.48 | 5.08 | 7.45 | 9.31 | 6.14 |
| 5 | 0.22 | 1.30 | 1.59 | 4.94 | 8.06 | 4.73 |

Cohorts from FY2020-Q3:

| Cohort | Fraction of data points | Dimension 1 | Dimension 2 | Dimension 3 | Dimension 4 | Dimension 5 |
| --- | --- | --- | --- | --- | --- | --- |
| 0 | 0.23 | 1.04 | 1.39 | 2.40 | 6.63 | 4.03 |
| 1 | 0.24 | 1.23 | 1.35 | 1.77 | 9.01 | 4.49 |
| 2 | 0.14 | 1.38 | 1.65 | 8.21 | 8.29 | 5.12 |
| 3 | 0.22 | 1.31 | 1.58 | 5.10 | 8.18 | 4.76 |
| 4 | 0.07 | 2.52 | 4.87 | 7.59 | 9.46 | 6.17 |
| 5 | 0.09 | 1.76 | 4.38 | 3.31 | 8.65 | 5.25 |

Between the two set of cohort results, the nearest neighbors between FY2020-Q2 and FY2020-Q3 cohort centers are: (Q2 Cohort 0, Q3 Cohort 1), (Q2 Cohort 1, Q3 Cohort 2), (Q2 Cohort 2, Q3 Cohort 0), (Q2 Cohort 3, Q3 Cohort 5), (Q2 Cohort 4, Q3 Cohort 5), (Q2 Cohort 5, Q3 Cohort 4).

Applying the full formula for difference between groups of cohorts, the final result Difference=0.013=1.3%, that is, there is 1.3% change in the cohorts from one quarter to another. This measurement aligns with intuition, since the customer composition from quarter to quarter will drift, but will not change drastically.

FIGS. 4-9, further described below, illustrate examples of a user interface configured to display the analysis and comparison of cohort groupings in trained clustering models.

5.0 Joining CRM and Product Usage Data

The cohort extraction models may take as input a dataset combining data from traditional Customer Relationship Management (CRM) systems and product usage data generated from machines running complex software systems. Because these two different kinds of data have vastly different semantics, structures, scales, velocity of change, systems of storage, and method of query, joining the two types of data face various challenges. Methods and systems are provided for joining CRM and products usage data.

The systems and methods disclosed herein comprise systems to: (1) link CRM and product usage data, which are natively stored in separate systems, and (2) align and translate various semantic and structural differences between CRM data and product usage data. The describe operations may be performed by one or more of a product management system (such as the product management system 1902), a CRM system (such as the CRM system 1908), and a deployed computer system (such as the deployed computer systems 1904 and 1906).

The data join starts with cleaning product usage data and ends in retrieving related CRM data, and proceeds, for example, as follows.

1. Link CRM and Product Usage Data Via Intermediate Customer Identifiers.

The two sets of data are joined via intermediate customer identifiers. These are identifiers that denote a particular deployment or installation of an enterprise software product and reside within the software product actually used by customers. Records are created in CRM systems (such as 908 below) linking these intermediate identifiers to canonical identifiers for customers. Examples of intermediate identifiers include license keys, installation organizational keys, stack names, and the like. These identifiers are necessary so that the potentially confidential primary customer identifiers can remain within the well governed CRM systems.

2. Discard Intermediate Identifiers in Product Data Belonging to Partners and Resellers.

Partners and resellers may not be end customers. In such circumstances, product installations that are sold via partners and resellers should have intermediate identifiers belonging to both the partners/resellers as well as end customer accounts. Hence dropping the intermediate identifiers from partners and resellers may be appropriate.

3. Assign Product Usage Data to the Lowest Identifiable Level of an Account Hierarchy.

If the product usage data is linked to both an account and their subsidiary, product usage data is assigned to the subsidiary. This allows for subsequent, potentially automated actions to be as fine grained as possible. For example, the aggregated product usage of a cross-industries conglomerate may show no discernible pattern, and there is "nothing specific to act upon" at the parent customer level. However, at the subsidiary level, product usage may exhibit patterns unique to the business specialization of the subsidiary, and there may be highly specific actions that can be performed.

Concretely, this assignment requires appropriately traversing the account hierarchy as stored in the CRM system. For example, an installation of the product may have intermediate identifiers belonging to multiple accounts. In that case, both the account identifiers and the account hierarchy should be retrieved from the CRM system. Alternatively, where both parent and child/grandchild accounts are present, product usage is assigned to the child/grandchild account.

4. De-Duplicate Multiple Installations with Identical Intermediate Identifiers.

if there are multiple installations of the software product with an identical set of intermediate identifiers, such as the same set of license keys, the multiple instances are deduplicated such that only one of these installations is counted. This is appropriate because semantically it is unclear if the multiple installations are meant to be "mirror" installations, or the duplicate data had arisen in error out of some corner case configurations. The alternative (i.e., not deduplicating) potentially inflates the product usage at an account and is more likely to be more distortionary.

5. Aggregate Product Usage Across all Unique Installations at the Account.

The product usage across all unique installations at the account is then aggregated. Depending on the particular usage dimension involved, the aggregation calculations may be different. In some cases, a simple sum is appropriate, such as total page views. In other cases, a distinct count is appropriate, such as total pages viewed, and in other cases, some other aggregation method is appropriate.

6. Retrieve Necessary Additional Data from CRM Systems.

At this point, the product usage data is aggregated, cleaned, and linked to a canonical account identifier in the CRM system. Next, additional needed data from the CRM systems is retrieved using the structured, rigid schema with clear primary keys. Once that is done, product usage data is combined with CRM data and ready for input into the clustering models described earlier.

Existing clustering models have been applied to CRM data and product usage data only separately. The two kinds of data have many inherent differences and joining them successfully requires deep knowledge of both kinds of systems. In most enterprises, CRM data experts typically come from sales and marketing operation teams, while product usage data experts typically come from engineering and product management teams. Efforts to join the two kinds of data often take the form of manual heuristical joining, which fails to keep up with neither the complex semantics of CRM data nor the high volume of the product usage data.

6.0 Extraction of Modeling and Cohorting Results

The disclosure further describes a formal translation between the semantics and structure of CRM data and product usage data, and facilitation of an automated, machine-computable join of the two, therefore filling a critical gap in existing methods. In particular, a series of Application Processing Interfaces (API) allow machine-to-machine communication of the cohorting results is provided. These APIs allow adjacent software systems to query the cohort to which a data point belongs.

An example API operates as follows:

1. An adjacent software system queries the API with the input including: (1) an identifier for the data point and (2) a list of values for each dimension of the data input for the original cohort analysis. This corresponds to an existing or potentially new row in the data table used originally to extract the cohort.
2. The API internally does the following.
   2.1. If the data point already exists in the stored cohort results, retrieve the cohort identifier of the cohort to which it was assigned, along with the list of values in each of the dimensions that describe the cohort center.
   2.2. If the data point does not exist in the stored cohort results, calculate the cohort center closest to the input data point, along with the list of values in each of the dimensions that describe the closest cohort center.
3. The API outputs the cohort identifier retrieved/calculated above along with a list of values for the cohort center in each dimension.

For example, an adjacent software system may query the API for the customer cohort to which a customer belongs. The query issued to the API may contain the customer identifier, plus a list of CRM customer profile and product usage information that would have served as input dimensions for the original cohort identification model. The API may return (1) an identifier for the cohort to which the customer belongs, either as calculated a-priori, or as the closest cohort center if the customer was not included in the a-priori calculated results, and (2) the list of values for the cohort center in each dimension. The adjacent software system may then use the output to trigger other automated processes.

Existing applications of clustering models carry the flavor of "one-off" discovery. They are not put into "production operational use." There have been no attempts to connect the clustering model outputs to adjacent software systems and have the results trigger further automated processes. This is because existing techniques lack the disclosed methods herein, and have a characteristic of subjectiveness and arbitrariness, especially with regard to the choice of input dimensions among many available, and the treatment or wholesales exclusion of categorical data. Therefore, the entire category of cohort or cluster-based approaches were not considered robust enough to be put into "production operational use," nor trusted enough for automated operations. The cohort/clustering results may be put to production use and connected with automated operations. Hence there is a need to create these APIs.

There may be two versions of the described API. One for XYZ Company cloud stack cohorts and one for XYZ Company customer cohorts. For the Cloud stacks cohorts API, the primary applications are a number of model-based Cloud operational processes, where the adjacent software systems need to determine the cohort to which a Cloud stack belongs in order to retrieve a per-cohort model and conduct further operations. For the customer cohorts API, the primary applications are a number of product content, feature, and configuration recommendation systems, where the adjacent software systems need to determine the cohort to which a customer belongs in order to generate per-cohort product content, feature, and configuration recommendations.

7.0 Example Visualizations

Figure 4:
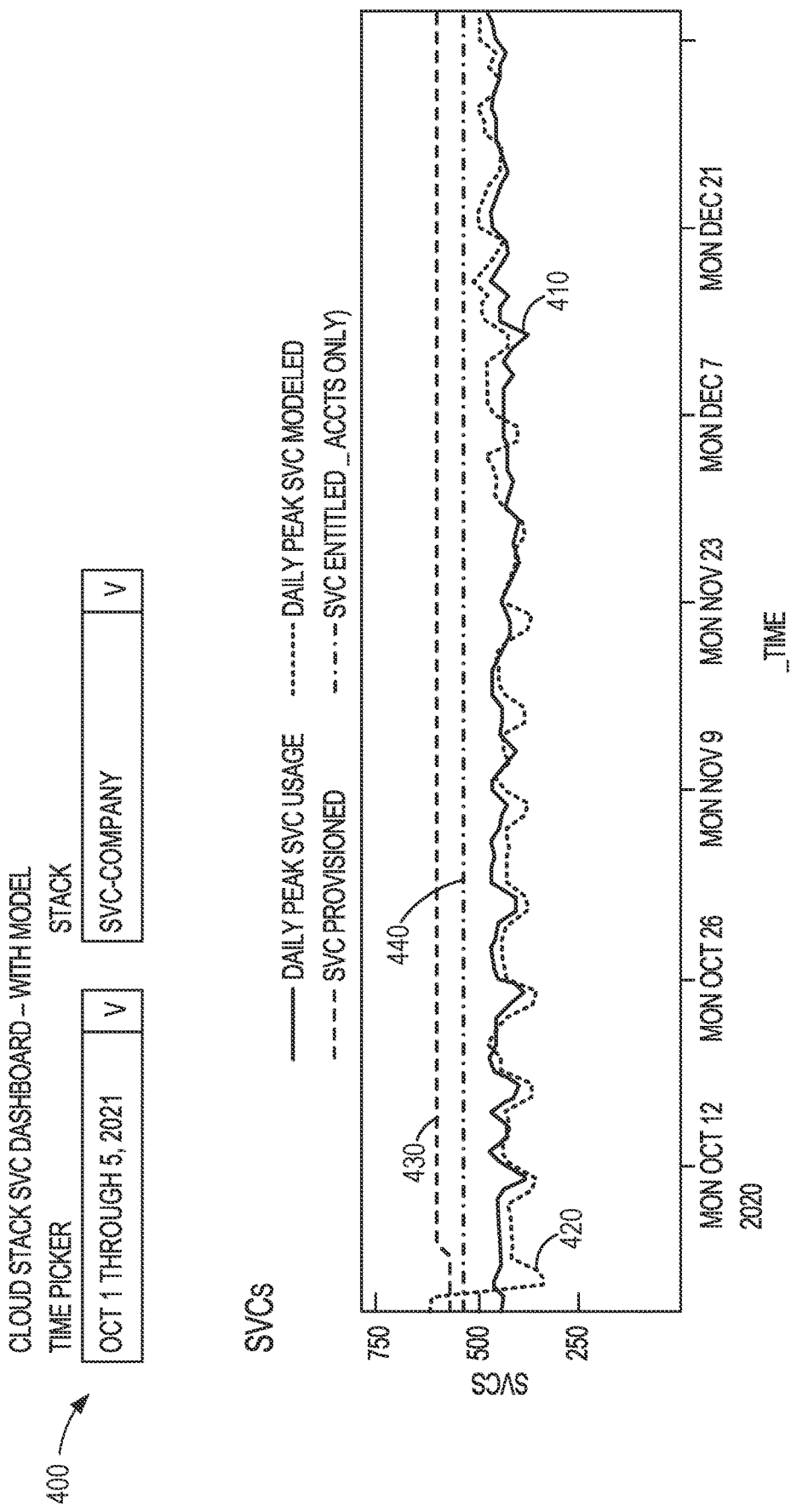
FIG. 4 is a diagram illustrating a user interface, according to an example, for system virtual computes.

FIG. 4 is a diagram illustrating a user interface 400, according to an example. The user interface 400 includes a metric panel to plot counts of system virtual computes (SVC) over an identified period of time for an identified stack. In the present example, the term SVC is defined as a "system virtual compute." The SVC may include one or more virtual central processing units and/or one or more physical central processing units. The central processing units, whether virtual or physical, may be hosted in a cloud (e.g., Amazon Web Services (AWS)) or on proprietary premises. In another example, the SVC may be defined as another type of system resource. In another example, the SVC may be defined as a collection of various types and numbers of system resources. The user interface 400 displays plot a count of SVCs, on a "Y" axis, over time, on an "X" axis. The metrics may include a daily peak SVC usage 410, a daily peaks SVC modeled 420, SVC provisioned 430, and SVC entitled accounts only 440. The user interface 400 may further include user interface mechanisms including a pull-down menu labeled "TIME PICKER" for identifying a period of time and a pull-down menu labeled "STACK" for identifying a cloud entity hosted by a cloud (e.g., Azure). The cloud entity "SVC-COMPANY" (e.g., XYZ-COMPANY), is associated with cloud resources (e.g., SVCs). For example, the user interface 400 illustrates the pull-down menu "TIME PICKER" being utilized to pick the workweek, "October 1, 2021-October 5, 2021," and the pull-down menu "STACK" to identify the cloud entity, "SVC-COMPANY." In one example, the metric panel being illustrated may be included with one or more other metric panels on a single dashboard.

Figure 5:
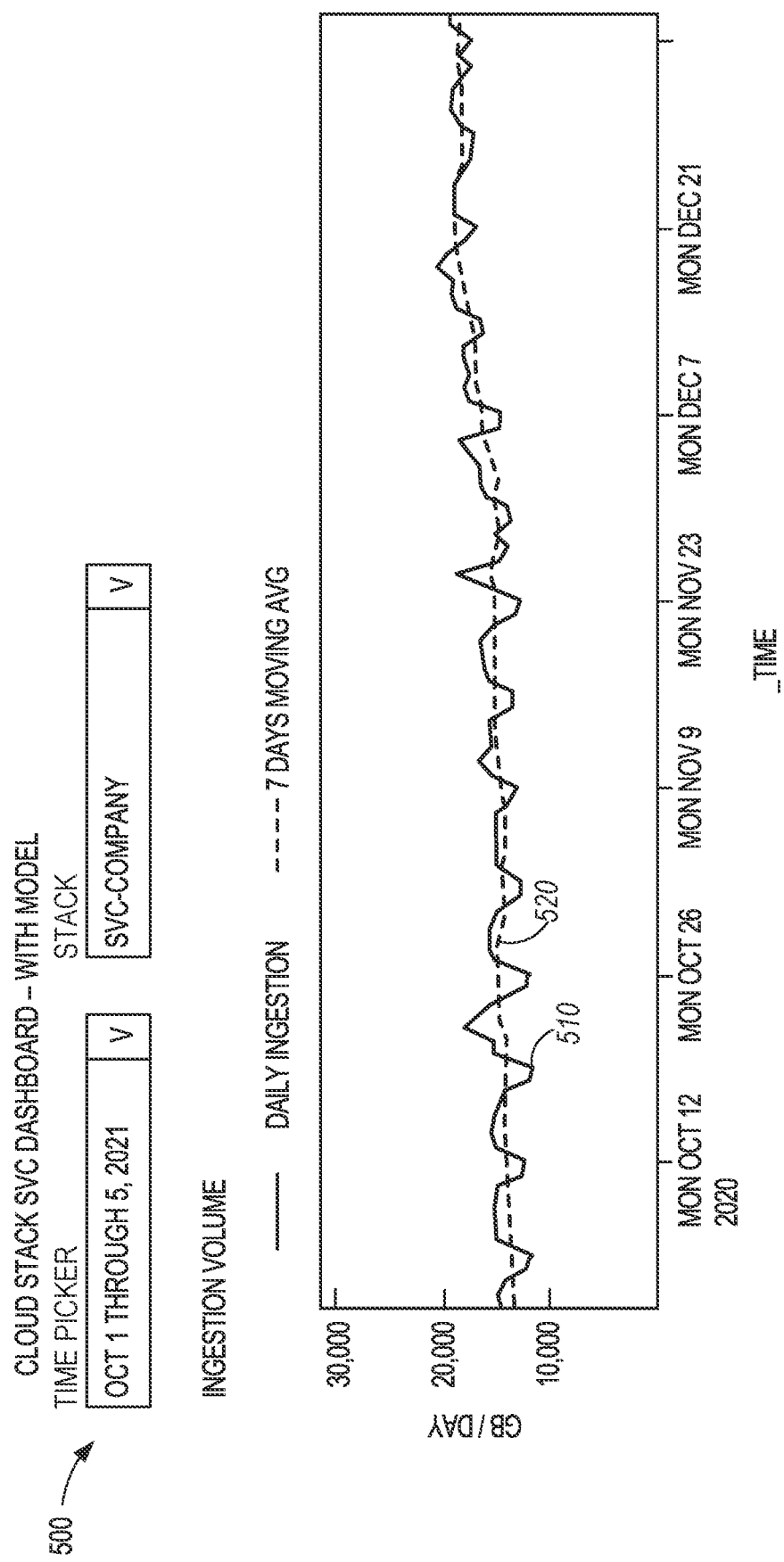
FIG. 5 is a diagram illustrating a user interface, according to an example, for ingestion volume.

FIG. 5 is a diagram illustrating a user interface 500, according to an example. The user interface 500 includes a metric panel for plotting ingestion volume over an identified period of time for an identified stack. The user interface 500 includes a "Y" axis to plot a count of Gigabytes per day (e.g., "GB/day") an "X" axis to plot the counts of Gigabytes per day (e.g., "GB/day") over time (e.g., workweek). The metrics may include a daily ingestion 510 and a seven-day moving average 520. The user interface 500 may further include user interface mechanisms including a pull-down menu labeled "TIME PICKER" for identifying a period of time and a pull-down menu labeled "STACK" for identifying a cloud entity hosted by a cloud (e.g., Azure), as previously described. In one example, the metric panel being illustrated may be included with one or more other metric panels on a single dashboard.

Figure 6:
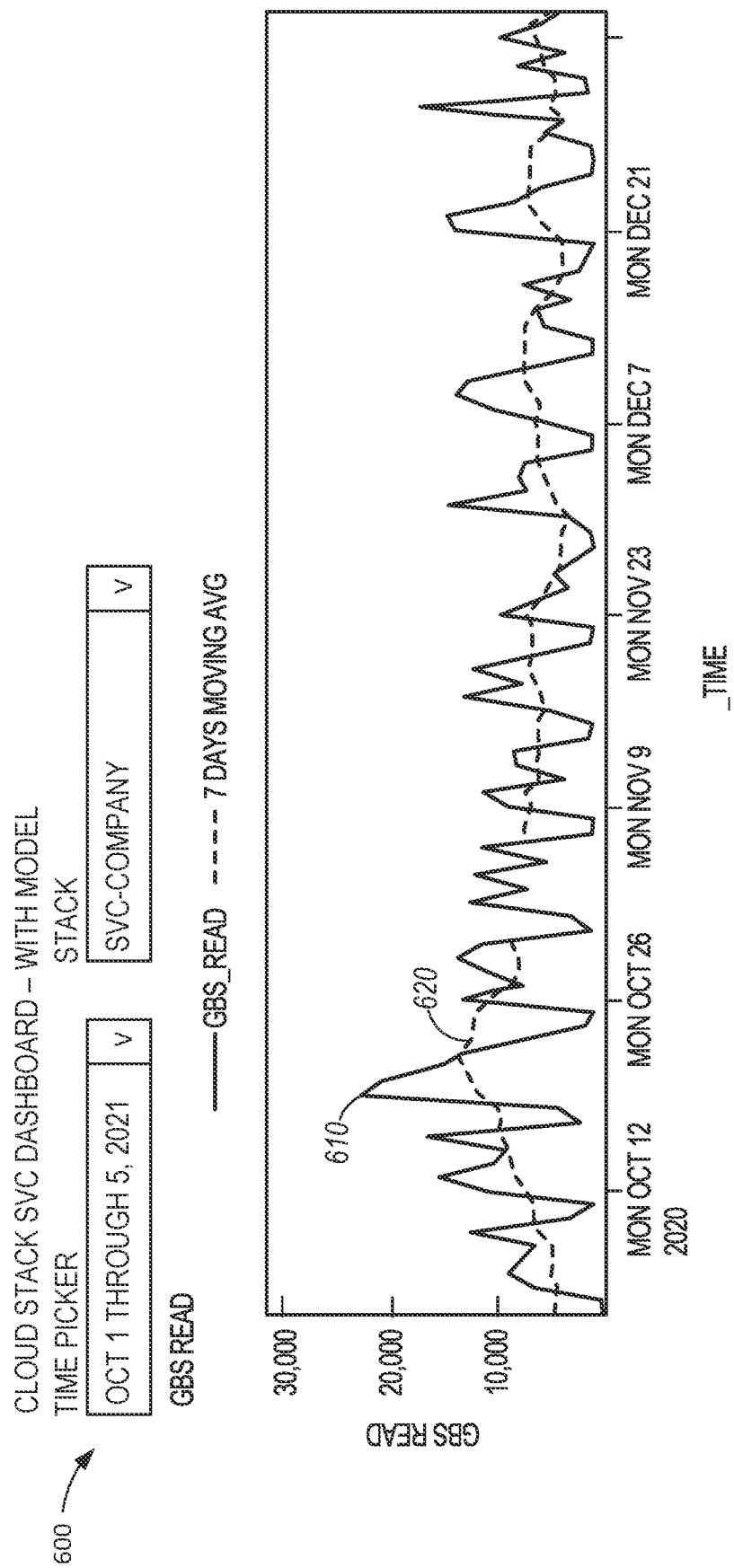
FIG. 6 is a diagram illustrating a user interface, according to an example, for gigabytes read.

FIG. 6 is a diagram illustrating a user interface 600, according to an example. The user interface 600 includes a metric panel for plotting Gigabytes read (e.g, GBs read) over an identified period of time for an identified stack. The user interface 600 includes a "Y" axis to plot a count of Gigabytes read (e.g., "GBs read") an "X" axis describing time (e.g., workweek). The metrics may include gigabytes read 610 (e.g., "GBs_read") and a seven-day moving average 620 (e.g., "7 days moving avg"). The user interface 600 may further include user interface mechanisms including a pull-down menu 'TIME PICKER" for identifying a period of time and a pull-down menu "STACK" for identifying a cloud entity hosted by a cloud (e.g., Azure), as previously described. In one example, the metric panel being illustrated may be included with one or more other metric panels on a single dashboard.

Figure 7:
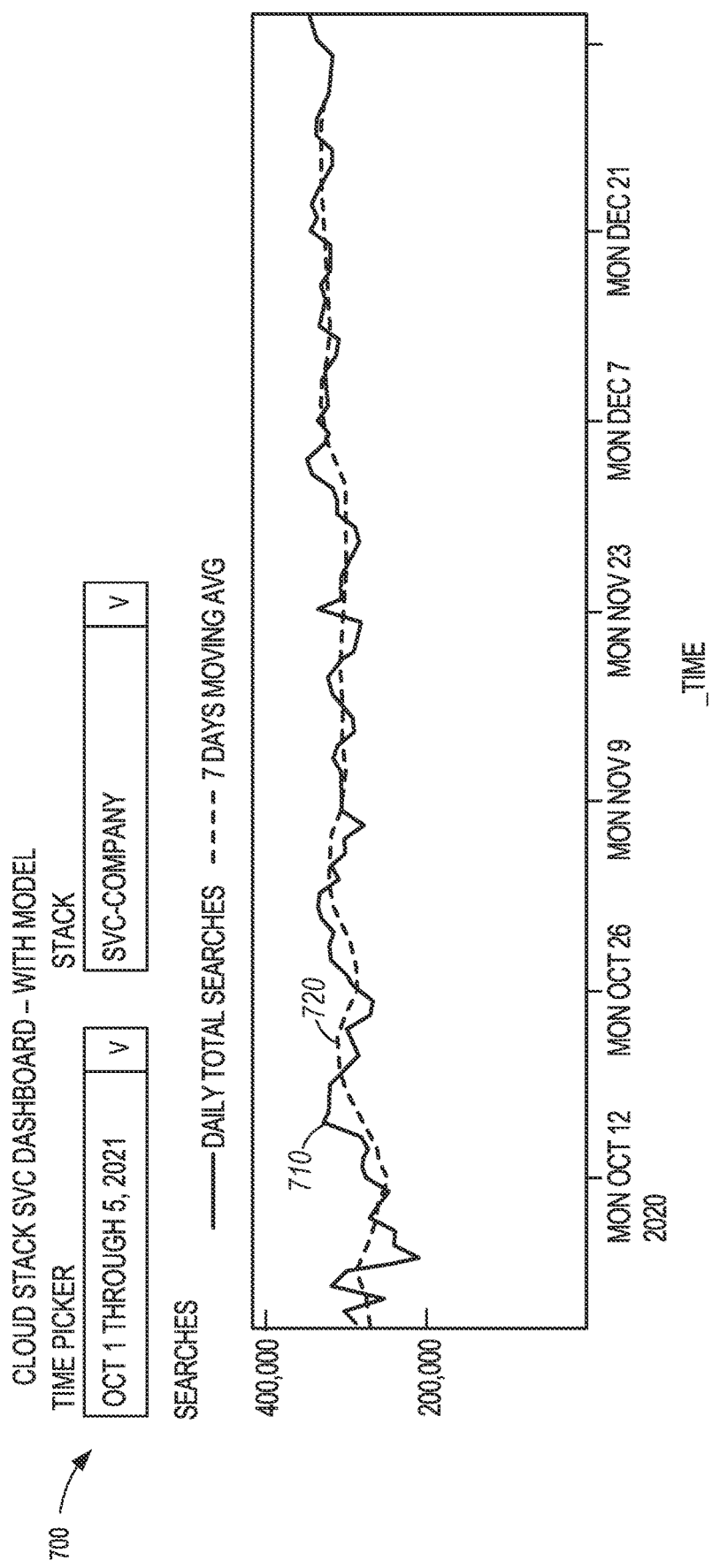
FIG. 7 is a diagram illustrating a user interface, according to an example, for searches.

FIG. 7 is a diagram illustrating a user interface 700, according to an example. The user interface 700 includes a metric panel for plotting searches (e.g., "Searches") over an identified period of time for an identified stack. The user interface 700 includes a "Y" axis to plot a count of searches an "X" axis for time (e.g., workweek). The metrics may include daily total searches 710 and a seven-day moving average 720 (e.g., "7 days moving avg"). The user interface 700 may further include user interface mechanisms including a pull-down menu labeled 'TIME PICKER" for identifying a period of time and a pull-down menu labeled "STACK" for identifying a cloud entity hosted by a cloud (e.g., Azure), as previously described. In one example, the metric panel being illustrated may be included with one or more other metric panels on a single dashboard.

Figure 8:
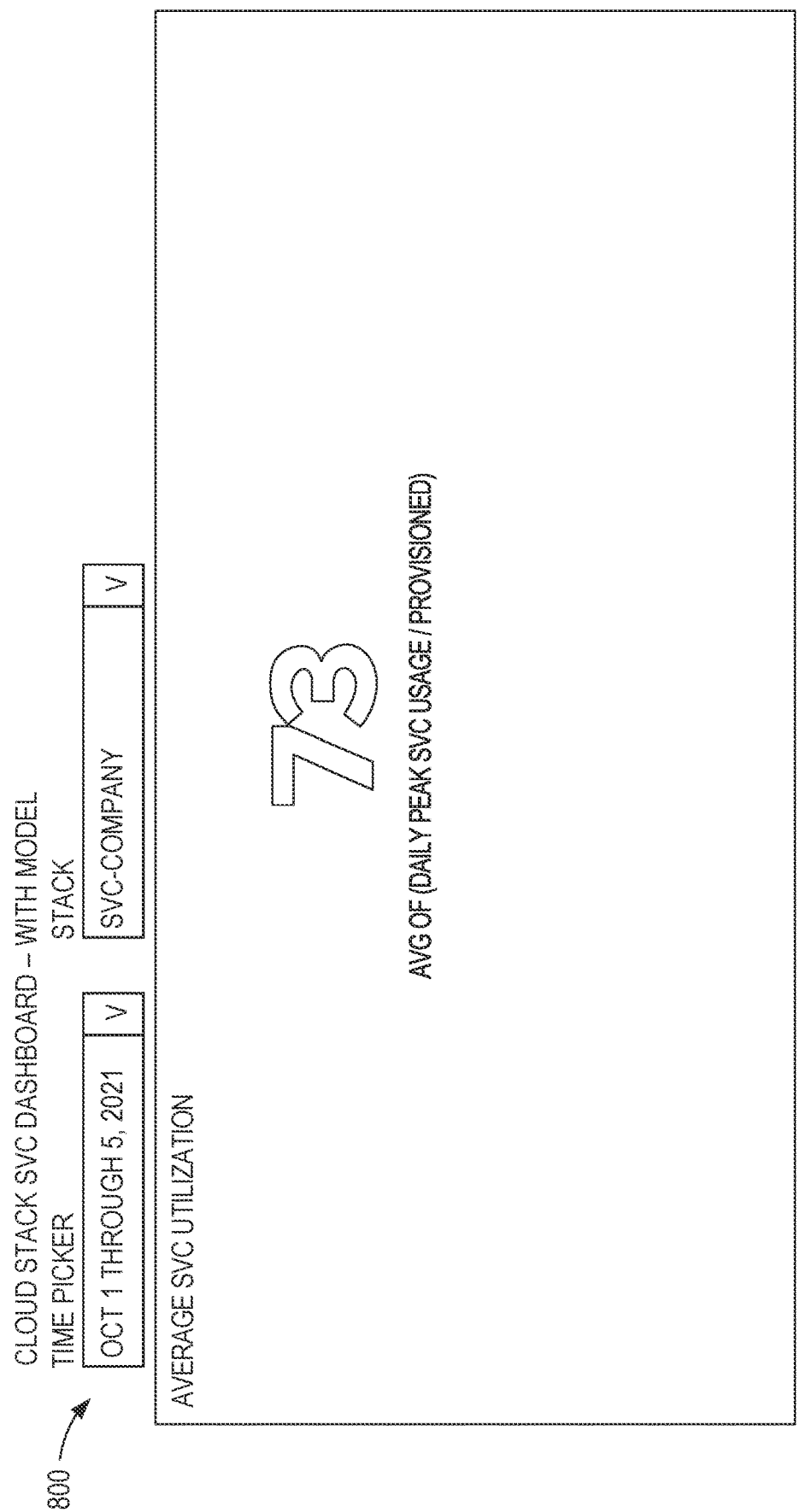
FIG. 8 is a diagram illustrating a user interface, according to an example, for average system virtual computes.

FIG. 8 is a diagram illustrating a user interface 800, according to an example. The user interface 800 includes a metric panel for plotting average SVC utilization (e.g., "Average SVC utilization") over an identified period of time for an identified stack. The user interface 800 includes an average (e.g., "73") that is computed by taking an average for the identified period of time of (daily peak SVC usage/ provisioned). The user interface 800 may further include user interface mechanisms including a pull-down menu labeled 'TIME PICKER" for identifying a period of time and a pull-down menu labeled "STACK" for identifying a cloud entity hosted by a cloud (e.g., Azure), as previously described. In one example, the metric panel being illustrated may be included with one or more other metric panels on a single dashboard.

Figure 9:
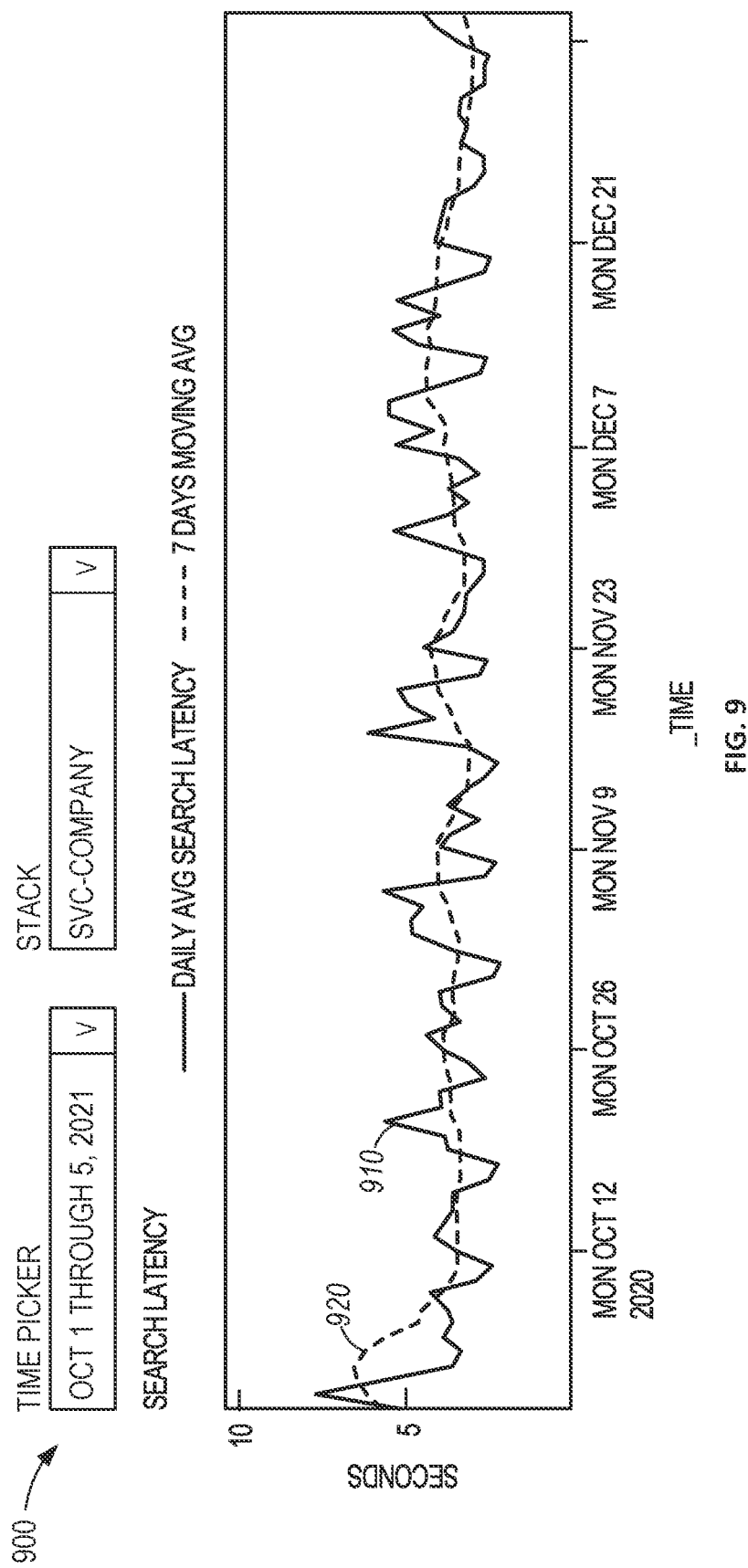
FIG. 9 is a diagram illustrating a user interface, according to an example, for search latency.

FIG. 9 is a diagram illustrating a user interface 900, according to an example. The user interface 900 includes a metric panel for plotting search latency (e.g., "Search latency") over an identified period of time for an identified stack. The user interface 900 includes a "Y" axis to plot a count of searches and an "X" axis for time (e.g., workweek). The metrics may include daily average search latency 910 and a seven-day moving average 920 (e.g., "7 days moving avg"). The user interface 910 may further include user interface mechanisms including a pull-down menu labeled 'TIME PICKER" for identifying a period of time and a pull-down menu labeled "STACK" for identifying a cloud entity hosted by a cloud (e.g., Azure), as previously described. In one example, the metric panel being illustrated may be included with one or more other metric panels on a single dashboard.

FIG. 10 is a diagram illustrating data 1000, according to an example, labeled "Set E." The data 1000 is arranged according to rows of cohorts and columns of attributes. For example, the respective rows include cohorts identified "Largest stacks," "Larger stacks," "Medium stacks," "Smaller stacks," and "Smallest stacks" and the respective columns include the attributes identified "Cloud stacks," "Daily searches," "Number of $3^{rd}$ party apps installed," and "User created indexes." The intersection of the rows and columns include the corresponding data 1000 labeled "Set E."

Figure 11:
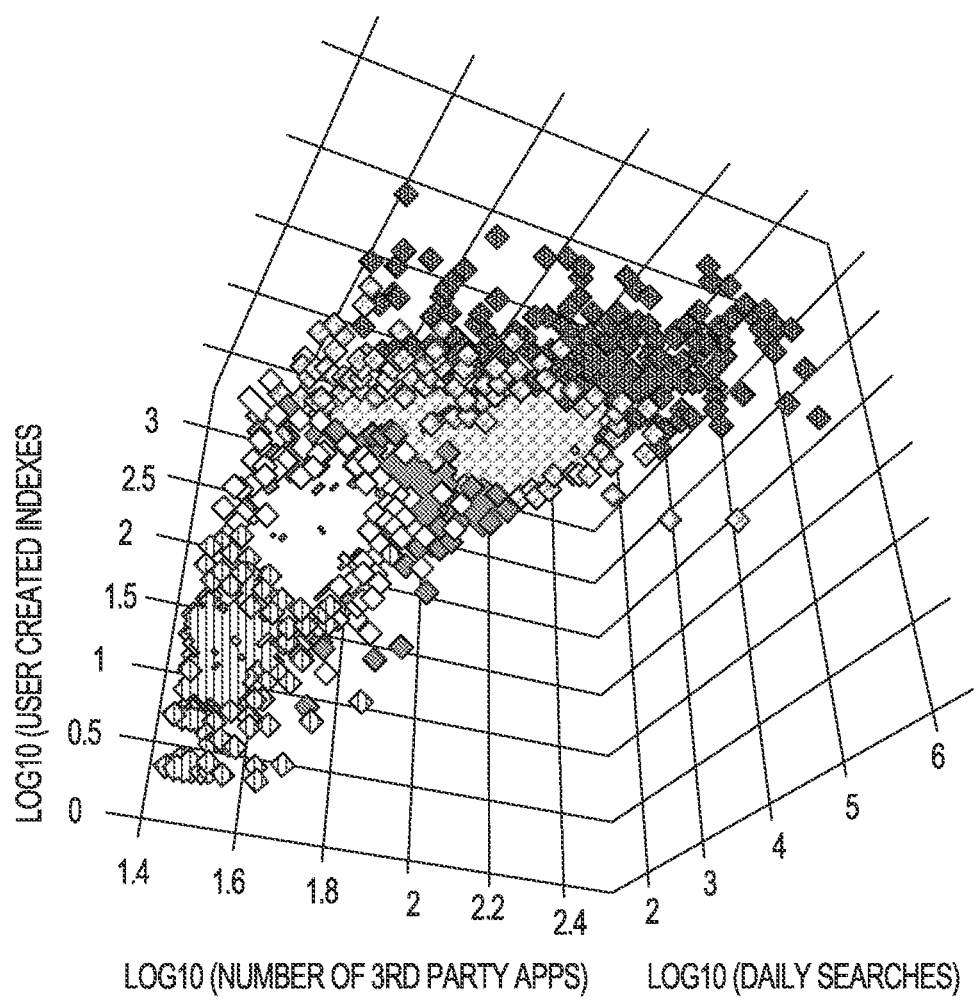
"
FIG. 11 is a diagram illustrating a user interface, according to an example, for visualizing cohorts using the data labeled "Set E.

FIG. 11 is a diagram illustrating a user interface 1100, according to an example. The user interface 1100 may be utilized for visualizing cohorts. For example, the user interface 1100 may be utilized for visualizing the cohorts of similar cloud stacks in scale dimensions (e.g., "Set E") including log 10 (user created indexes) and log 10 (number of third party searches) and log 10 (daily searches).

FIG. 12 is a diagram illustrating data 1200, according to an example, labeled "Set F." The data 1200 is arranged according to rows of cohorts and columns of attributes. For example, the rows of cohorts are respectively identified "Largest stacks," "Larger stacks," "Medium stacks," "Smaller stacks," and "Smallest stacks" and the columns of attributes are respectively identified "Cloud stacks," "Daily searches," "Number of 3$^{rd}$ party apps installed," and "User created indexes." The intersection of the rows and columns include the corresponding data 1200.

Figure 13:
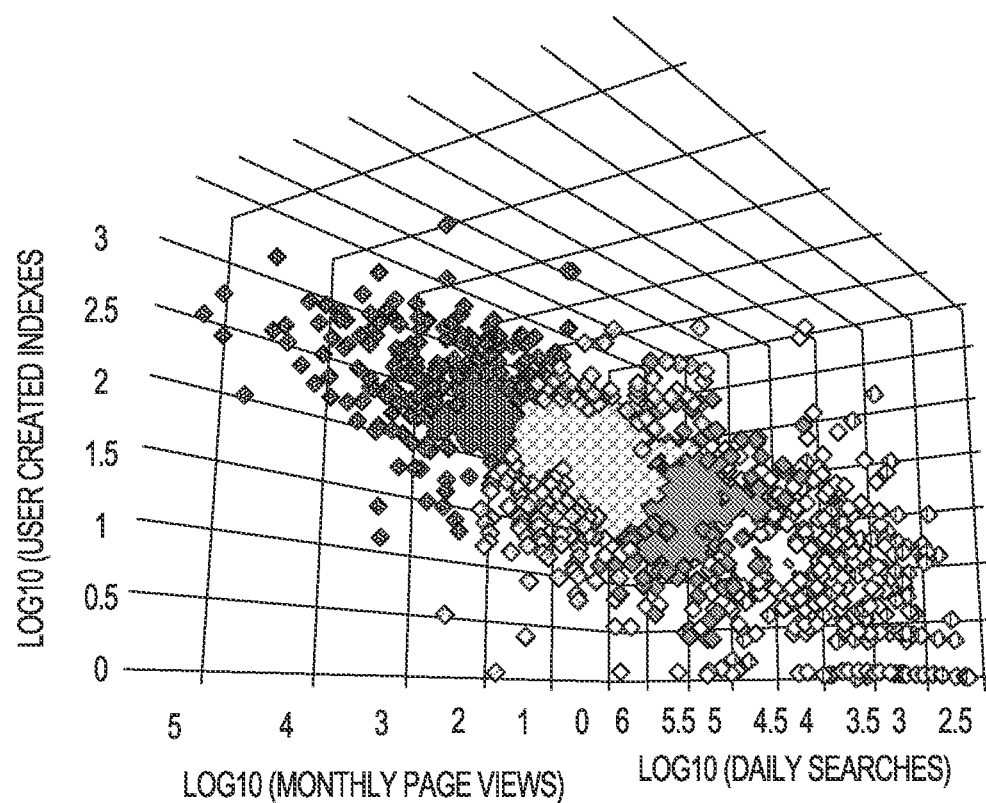
"
FIG. 13 is a diagram illustrating a user interface, according to an example, for visualizing cohorts using the data labeled "Set F.

FIG. 13 is a diagram illustrating a user interface 1300, according to an example. The user interface 1300 may be utilized for visualizing cohorts. For example, the user interface 1300 may be utilized for visualizing cohorts of similar cloud stacks in scaled dimensions (e.g., "Set F") including log 10 (daily searches) and log 10 (monthly page views) and log 10 (user created indexes).

FIG. 14 is a diagram illustrating a user interface 1400, according to an example. The user interface 1400 may be utilized for viewing cohorts of similar accounts. The user interface 1400 is arranged according to rows of cohorts and columns of attributes with the intersection of rows and columns presenting corresponding values. For example, the rows of cohorts are respectively identified, ">898K #OF CPUS, MANY YEARS WITH XYZ COMPANY, ~898B HISTORICAL CPUS," "~899K #OF CPUS, ~2 YEARS WITH XYZ COMPANY, <27 HISTORICAL CPUS," "<898K #OF CPUS, ~5 USE CASES, <180 HISTORICAL CPUS," "<898K #OF CPUS, MANY YEARS WITH XYZ COMPANY, <90 HISTORICAL CPUS," "<90K #OF CPUS, <2 USE CASES, <18 HISTORICAL CPUS," and "<9K #OF CPUS, <2 USE CASES, <8 HISTORICAL CPUS" and the columns of attributes are respectively identified, "#OF CPUS," "CUSTOMER AGE," "HISTORICAL #CPUS" and "PRODUCTS BOUGHT." The intersection of the rows and columns include the corresponding data.

FIG. 15 is a diagram illustrating a user interface 1500, according to an example, for viewing cohorts of similar accounts. The user interface 1500 adds five columns of attributes to the user interface 1400. For example, the rows of cohorts are again respectively identified, ">898K #OF CPUS, MANY YEARS WITH XYZ COMPANY, ~898B HISTORICAL CPUS," "~899K #OF CPUS, ~2 YEARS WITH XYZ COMPANY, <27 HISTORICAL CPUS," "<898K #OF CPUS, ~5 USE CASES, <180 HISTORICAL CPUS," "<898K #OF CPUS, MANY YEARS WITH XYZ COMPANY, <90 HISTORICAL CPUS," "<90K #OF CPUS, <2 USE CASES, <18 HISTORICAL CPUS," and "<9K #OF CPUS, <2 USE CASES, <8 HISTORICAL CPUS" and the columns of attributes are respectively identified, "USE CASES BOUGHT, "% SHARE OF ACCOUNTS," "% SHARE OF #CPUS," "% SHARE OF TOTAL YEARLY CPU USAGE," and "ANNUAL CPUS AS % ACCOUNT'S #OF CPUS." The intersection of the rows and columns include the corresponding data.

8.0 Operational Methods and Architecture

Figure 16:
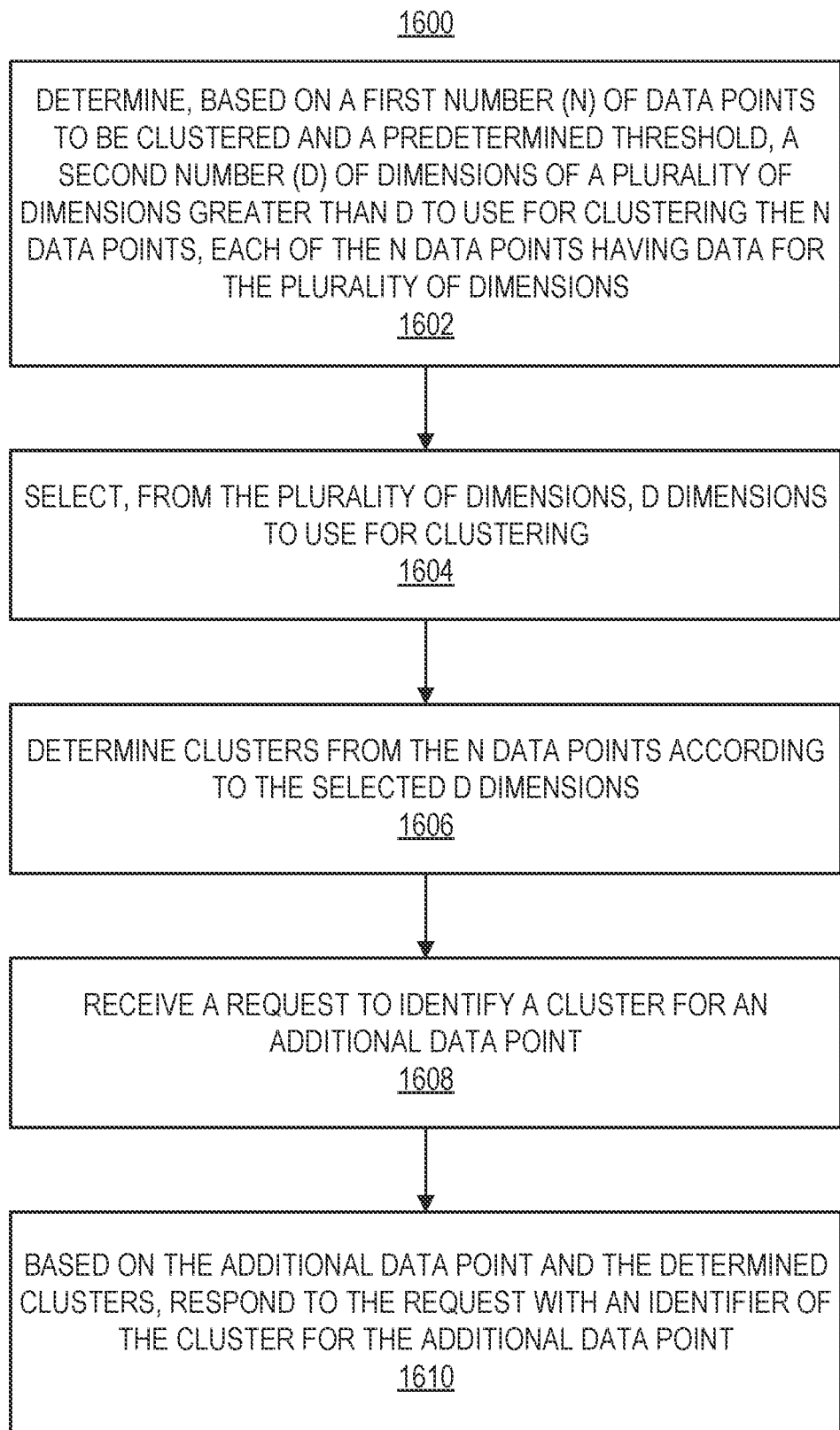
FIG. 16 is a flowchart illustrating an example process for clustering data points.

FIG. 16 is a flowchart illustrating an example process 1600 for clustering data points. The example process 1600 can be implemented, for example, by a computing device that comprises one or more processors and a non-transitory computer-readable medium. The non-transitory computer readable medium can be storing instructions that, when executed by the one or more processors, can cause the one or more processors to perform the operations of the illustrated process 1600. Alternatively or additionally, the process 1600 can be implemented using a non-transitory computer-readable medium storing instructions that, when executed by one or more processors, case the one or more processors to perform the operations of the process 1600 of FIG. 16. The process 1600 includes operations 1602, 1604, 1606, 1608, and 1610.

In operation 1602, one or more processors determine, based on a first number (N) of data points to be clustered and a predetermined threshold, a second number (D) of dimensions of a plurality of dimensions (C), where C is greater than D, to use for clustering the N data points. Each of the N data points has data for the plurality of dimensions. For example, N data points for N customers of a data intake and query system may be clustered into cohorts, to aid in prediction of products and services desired by the customers. The customer data may include geographic data that indicates where the customer is located, temporal data that indicates how long the customer has been a customer, been in existence, or been publicly traded; numeric data that indicates the quantity of products or services sold to the customer, the number of employees the customer has, the total value of products or services sold to the customer, the amount of data stored by the customer, or the number of searches performed by the customer; or any suitable combination thereof.

By way of example and not limitation, the N data points may be the data points of FIG. 4, FIG. 5, FIG. 6, FIG. 7, and FIG. 9. The daily peak SVC usage 410 comprises a series of data points, with each data point having a value in a time dimension and a SVCs dimension. The daily ingestion 510 comprises a series of data points, with each data point having a value in the time dimension and a GB/day dimension. The GBS_READ 610 comprises a series of data points, with each data point having a value in the time dimension and a GBs read dimension. Similarly, the daily total searches 710 data and the daily average search latency 910 data may be accessed. By correlating the data for a given company and date, data points may be constructed with data in dimensions of: time, SVCs used, GBs ingested, GBs read, searches performed, and average search latency. However, sufficient data may not be available to meaningfully use all of these dimensions of information to cluster the data points.

For example, if N is 2300 and the threshold is 3, D may be determined by finding a value of $$B = \frac{1}{D}\log2(N)$$

for multiple candidate values for D. Using the system and setting B_threshold=3=log 2(8)=no fewer than 8 data points per dimension, the system recommends the following:

$$D = 1, B = \frac{1}{1}\log2(2300) = 11.2 > B \text{ threshold, cohort acceptable}$$

$$D = 2, B = \frac{1}{2}\log2(2300) = 5.6 > B \text{ threshold, cohort acceptable}$$

$$D = 3, B = \frac{1}{3}\log2(2300) = 3.7 > B \text{ threshold, cohort acceptable}$$

$$D = 4, B = \frac{1}{4}\log2(2300) = 2.8 > B \text{ threshold,}$$

cohort inappropriate and will overfit

Accordingly, in this example, D is selected to be 3 in operation 1602.

In operation 1604, the one or more processors select, from the plurality of dimensions, D dimensions to use for clustering. For example, if each data point comprises eight dimensions of data but D is three, there are 56 different sets of three dimensions that can be chosen. The data may be clustered using all 56 different sets of three dimensions. The average error for each set of clusters may be determined and the D dimensions for the set of clusters that produced the least average error may be selected for use.

The processors, in operation 1606, determine clusters from the N data points according to the selected D dimensions. In some examples, the clusters are determined as part of the process of operation 1604. Each cluster comprises a center data point of the cluster defined by values in each of the D dimensions. The N data points are assigned to the cluster with the nearest center data point. For example, FIG. 10, FIG. 11, FIG. 12, and FIG. 13 show example visualizations of resulting clusters. FIG. 10 and FIG. 12 show the values of the center points of the clusters; FIG. 11 and FIG. 13 show the positions of the points in each cluster.

In operation 1608, the processors receive a request to identify a cluster for an additional data point. For example, an API call may be received that includes, as a parameter, a location for an additional data point. In response, in operation 1610, based on the additional data point and the determined clusters, the one or more processors respond to the request with an identifier of the cluster for the additional data point. For example, the distance from the additional data point to the center data points of the clusters may be determined and the cluster for the additional data point selected as the cluster with the nearest center data point. A response to the API call includes an identifier of the cluster (e.g., an index into a list of clusters, the location of the center point of the determined cluster, a string label for the determined cluster, or any suitable combination thereof).

Example 1 is a product management system, comprising: one or more hardware processors; and a non-transitory computer-readable medium having stored thereon instructions that, when executed by the one or more hardware processors, cause the one or more processors to perform operations including: determining, based on a first number (N) of data points to be clustered and a predetermined threshold, a second number (D) of dimensions of a plurality of dimensions to use for clustering the N data points, each of the N data points having data for the plurality of dimensions; selecting a plurality of dimension sets to use for clustering, wherein each dimension set includes, a different combination of the plurality of dimensions and includes no greater than D dimensions; for each dimension set, generating, via a machine learning model, a candidate cohort definition that clusters the N data points into cohorts according to the dimension set; and determining a selected cohort definition from the candidate cohort definitions based on a plurality of cohort quality measures from cohort results associated with the candidate cohort definitions.

In Example 2, the subject matter of Example 1, wherein the operations further comprise: receiving a request to identify a cohort for an additional data point using the selected cohort definition, the additional data point including data on dimensions corresponding to the dimension set corresponding to the selected cohort definition; based on the additional data point and the cohorts determined by the selected cohort definition, determining a first cohort corresponding to the additional data point; and transmitting, in response to the request, an identification of the first cohort and operational characteristics of the first cohort.

In Example 3, the subject matter of Examples 1-2, wherein the operations further comprise: determining, for a candidate number of dimensions, a number of bits of information per dimension (B) based on the candidate number of dimensions and the first number; and comparing B to the predetermined threshold.

In Example 4, the subject matter of Example 3, wherein the determining of B is based on $$B = \frac{1}{D}\log2(N).$$

In Example 5, the subject matter of Examples 3-4, wherein the operations further comprise: based on a result of the comparing, rejecting the candidate number of dimensions.

In Example 6, the subject matter of Examples 1-5, wherein generating a candidate cohort definition for each dimension set from the N data points comprises applying K-means clustering to the dimension set of the N data points.

In Example 7, the subject matter of Examples 1-6, wherein the operations further comprise: generating the N data points to be clustered by linking customer relationship management (CRM) data and product usage data based on shared identifiers.

In Example 8, the subject matter of Example 7, wherein the operations further comprise: accessing CRM data that indicates a parent-subsidiary relationship between a parent account and a subsidiary account; and accessing first product usage data that is linked to both the parent account and the subsidiary account; wherein the generating of the N data points comprises generating a data point that links the first product usage data to the subsidiary account.

In Example 9, the subject matter of Example 8, wherein the generating of the N data points excludes generating a second data point that links the first product usage data to the parent account.

Example 10 is a computer-implemented method, comprising: determining, by one or more hardware processors and based on a first number (N) of data points to be clustered and a predetermined threshold, a second number (D) of dimensions of a plurality of dimensions to use for clustering the N data points, each of the N data points having data for the plurality of dimensions; selecting a plurality of dimension sets to use for clustering, wherein each dimension set includes, a different combination of the plurality of dimensions and includes no greater than D dimensions; for each dimension set, generating, via a machine learning model, a candidate cohort definition that clusters the N data points into cohorts according to the dimension set; and determining a selected cohort definition from the candidate cohort definitions based on a plurality of cohort quality measures from cohort results associated with the candidate cohort definitions.

In Example 11, the subject matter of Example 10 includes receiving a request to identify a cohort for an additional data point using the selected cohort definition, the additional data point including data on dimensions corresponding to the dimension set corresponding to the selected cohort definition; based on the additional data point and the cohorts determined by the selected cohort definition, determining a first cohort corresponding to the additional data point; and transmitting, in response to the request, an identification of the first cohort and operational characteristics of the first cohort.

In Example 12, the subject matter of Examples 10-11 includes determining, for a candidate number of dimensions, a number of bits of information per dimension (B) based on the candidate number of dimensions and the first number; and comparing B to the predetermined threshold.

In Example 13, the subject matter of Example 12, wherein the determining of B is based on $$B = \frac{1}{D}\log 2(N).$$

In Example 14, the subject matter of Examples 12-13 includes, based on a result of the comparing, rejecting the candidate number of dimensions.

In Example 15, the subject matter of Examples 10-14, wherein generating a candidate cohort definition for each dimension set from the N data points comprises applying K-means clustering to the dimension set of the N data points.

In Example 16, the subject matter of Examples 10-15 includes generating the N data points to be clustered by linking customer relationship management (CRM) data and product usage data based on shared identifiers.

Example 17 is a non-transitory computer-readable medium having stored thereon instructions that, when executed by one or more processors, cause the one or more processors to perform operations including: determining, based on a first number (N) of data points to be clustered and a predetermined threshold, a second number (D) of dimensions of a plurality of dimensions to use for clustering the N data points, each of the N data points having data for the plurality of dimensions; selecting a plurality of dimension sets to use for clustering, wherein each dimension set includes, a different combination of the plurality of dimensions and includes no greater than D dimensions; for each dimension set, generating, via a machine learning model, a candidate cohort definition that clusters the N data points into cohorts according to the dimension set; and determining a selected cohort definition from the candidate cohort definitions based on a plurality of cohort quality measures from cohort results associated with the candidate cohort definitions.

In Example 18, the subject matter of Example 17, wherein the operations further comprise: receiving a request to identify a cohort for an additional data point using the selected cohort definition, the additional data point including data on dimensions corresponding to the dimension set corresponding to the selected cohort definition; based on the additional data point and the cohorts determined by the selected cohort definition, determining a first cohort corresponding to the additional data point; and transmitting, in response to the request, an identification of the first cohort and operational characteristics of the first cohort.

In Example 19, the subject matter of Examples 17-18, wherein the operations further comprise: determining, for a candidate number of dimensions, a number of bits of information per dimension (B) based on the candidate number of dimensions and the first number; and comparing B to the predetermined threshold.

In Example 20, the subject matter of Example 19, wherein the determining of B is based on $$B = \frac{1}{D}\log 2(N).$$

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

FIG. 17 is a flowchart illustrating an example process 1700 for determining and visualizing residual error as a function of a number of clusters for multiple sets of clusters. The example process 1700 can be implemented, for example, by a computing device that comprises one or more processors and a non-transitory computer-readable medium. The non-transitory computer readable medium can be storing instructions that, when executed by the one or more processors, can cause the one or more processors to perform the operations of the illustrated process 1700. Alternatively or additionally, the process 1700 can be implemented using a non-transitory computer-readable medium storing instructions that, when executed by one or more processors, case the one or more processors to perform the operations of the process 1700 of FIG. 17. The process 1700 includes operations 1702, 1704, and 1706.

In operation 1702, one or more processors determine, based on a first number (N) of data points to be clustered, a plurality of sets of clusters, each set of clusters comprising a different number (K) of clusters. For example, N may be 2300 and, in operation 1702, the 2300 data points may be clustered into each natural number of clusters in the range one to ten. Each cluster comprises a center data point of the cluster defined by values in each of the D dimensions. The N data points are assigned, in each set of clusters, to the cluster with the nearest center data point.

By way of example and not limitation, the N data points may be the data points of FIG. 4, FIG. 5, FIG. 6, FIG. 7, and FIG. 9, retrieved from a data intake and query system. The daily peak SVC usage 410 comprises a series of data points, with each data point having a value in a time dimension and a SVCs dimension. The daily ingestion 510 comprises a series of data points, with each data point having a value in the time dimension and a GB/day dimension. The GBS_READ 610 comprises a series of data points, with each data point having a value in the time dimension and a GBs read dimension. Similarly, the daily total searches 710 data and the daily average search latency 910 data may be accessed. By correlating the data for a given company and date, data points may be constructed with data in dimensions of: time, SVCs used, GBs ingested, GBs read, searches performed, and average search latency.

In operation 1704, the processors, for each set of clusters in the plurality of sets of clusters, determine a residual error (Rk) for the N data points. For example, for each set of clusters, the average distance from the center of its assigned cluster may be determined for each of the N data points. The total of these distances may be the Rk for the set of clusters. As the number of clusters (K) increases, Rk decreases. However, the reduction of Rk may not indicate an improved predictive power of the clustering. One measure of the effectiveness of increasing K is the difference in Rk between two sets of clusters using adjacent values of K. If the decrease in Rk is less than a predetermined threshold, increasing K may not be effective.

In operation 1706, the processors cause a user interface to be presented on a display device, the user interface comprising a graph that indicates Rk as a function of K for each set of clusters of the plurality of sets of clusters. The user interface may be configured to receive a user input to select a value of K to use for clustering the N points. The user interface may also comprise an option for the user to extend the range of values to use for K. For example, the initial clustering in operation 1702 may be for K in the range of one to ten but in response to receiving a user selection of a higher maximum value for K, operations 1702 and 1704 may be repeated for K in the range of eleven to twenty. Thereafter, the user interface of operation 1706 may be updated to include data for the additional sets of clusters. The user interface may also include a recommendation for a set of clusters of the plurality of sets of clusters, based on K and Rk for the plurality of sets of clusters and a predetermined threshold. For example, if increasing K results in decrease in Rk that is below the predetermined threshold, increasing K is not recommended. Thus, if increasing K from one to two decreases Rk more than the predetermined threshold, increasing K from two to three decreases Rk more than the predetermined threshold, and increasing K from three to four does not decrease Rk by more than the predetermined threshold, using K of two (and the resulting two clusters) would be recommended.

Example 25 is a computing device, comprising: one or more hardware processors; and a non-transitory computer-readable medium having stored thereon instructions that, when executed by the one or more hardware processors, cause the one or more hardware processors to perform operations including: generating, using a machine learning model, a plurality of sets of clusters from a first number (N) of data points based on a selected set of dimensions, each set of clusters comprising a different number (K) of clusters; for each set of clusters in the plurality of sets of clusters, determining a sum of residual errors (Rk) for the N data points; and causing a user interface to be presented on a display device, the user interface comprising a first graph that indicates Rk as a function of K for the plurality of sets of clusters, and a second graph that indicates a rate of decrease of Rk as a function of K for the plurality of sets of clusters.

In Example 26, the subject matter of Example 25, wherein: the plurality of sets of clusters comprises a set of clusters for each K in a range; and the operations further comprise: determining a fraction of the N data points that move between clusters as K increases for each increment of K in the range; and causing the user interface to comprise a weighted directional graph of movement of the N data points as K is increased.

In Example 27, the subject matter of Examples 25-26, wherein: the plurality of sets of clusters comprises a set of clusters for each K in a range; and the operations further comprise: in response to detecting a user input, increasing the range; and updating the user interface in accordance with the increased range.

In Example 28, the subject matter of Examples 25-27, wherein the operations further comprise: based on K and Rk for the plurality of sets of clusters and a predetermined threshold, including, in the user interface, a recommendation for a set of clusters to use.

In Example 29, the subject matter of Examples 25-28, wherein: the determining of the plurality of sets of clusters from the N data points is based on a first subset of D dimensions selected from C dimensions of data for each data point; and the operations further comprise: determining, based on a second subset of D dimensions selected from the C dimensions of data, a second plurality of sets of clusters from the N data points; for each set of clusters in the second plurality of sets of clusters, determining Rk for the N data points; and causing a second user interface to be presented on the display device, the second user interface comprising a third graph that indicates Rk as a function of K for the second plurality of sets of clusters.

In Example 30, the subject matter of Example 29, wherein the operations further comprise: detecting a first selection of a first set of clusters of the plurality of sets of clusters for the first subset of D dimensions; detecting a second selection of a second set of clusters of the second plurality of sets of clusters for the second subset of D dimensions; causing a third user interface to be presented on the display device, the third user interface comprising information regarding the first set of clusters and the second set of clusters; and based on a user input detected via the third user interface, selecting the first set of clusters and the first subset of D dimensions.

In Example 31, the subject matter of Example 30, wherein the operations further comprise: receiving, via a network, a request to identify a cluster for an additional data point; and based on the additional data point and the selected first set of clusters, responding to the request with an identifier of the cluster for the additional data point.

Example 32 is a computer-implemented method, comprising: generating, by one or more hardware processors using a machine learning model, a plurality of sets of clusters from a first number (N) of data points based on a selected set of dimensions, each set of clusters comprising a different number (K) of clusters; for each set of clusters in the plurality of sets of clusters, determining a sum of residual errors (Rk) for the N data points; and causing a user interface to be presented on a display device, the user interface comprising a first graph that indicates Rk as a function of K for the plurality of sets of clusters, and a second graph that indicates a rate of decrease of Rk as a function of K for the plurality of sets of clusters.

In Example 33, the subject matter of Example 32, wherein: the plurality of sets of clusters comprises a set of clusters for each K in a range; and the method further comprises: determining a fraction of the N data points that shift between clusters as K increases for each increment of K in the range; and causing the user interface to comprise a weighted directional graph of movement of the N data points as K is increased.

In Example 34, the subject matter of Examples 32-33, wherein: the plurality of sets of clusters comprises a set of clusters for each K in a range; and the method further comprises: in response to detecting a user input, increasing the range; and updating the user interface in accordance with the increased range.

In Example 35, the subject matter of Examples 32-34 includes, based on K and Rk for the plurality of sets of clusters and a predetermined threshold, including, in the user interface, a recommendation for a set of clusters to use.

In Example 36, the subject matter of Examples 32-35, wherein: the determining of the plurality of sets of clusters from the N data points is based on a first subset of D dimensions selected from C dimensions of data for each data point; and the method further comprises: determining, based on a second subset of D dimensions selected from the C dimensions of data, a second plurality of sets of clusters from the N data points; for each set of clusters in the second plurality of sets of clusters, determining Rk for the N data points; and causing a second user interface to be presented on the display device, the second user interface comprising a third graph that indicates Rk as a function of K for the second plurality of sets of clusters.

In Example 37, the subject matter of Example 36 includes detecting a first selection of a first set of clusters of the plurality of sets of clusters for the first subset of D dimensions; detecting a second selection of a second set of clusters of the second plurality of sets of clusters for the second subset of D dimensions; causing a third user interface to be presented on the display device, the third user interface comprising information regarding the first set of clusters and the second set of clusters; and based on a user input detected via the third user interface, selecting the first set of clusters and the first subset of D dimensions.

In Example 38, the subject matter of Example 37 includes receiving, via a network, a request to identify a cluster for an additional data point; and based on the additional data point and the selected first set of clusters, responding to the request with an identifier of the cluster for the additional data point.

Example 39 is a non-transitory computer-readable medium having stored thereon instructions that, when executed by one or more processors, cause the one or more processors to perform operations including: generating, using a machine learning model, a plurality of sets of clusters from a first number (N) of data points based on a selected set of dimensions, each set of clusters comprising a different number (K) of clusters; for each set of clusters in the plurality of sets of clusters, determining a sum of residual errors (Rk) for the N data points; and causing a user interface to be presented on a display device, the user interface comprising a first graph that indicates Rk as a function of K for the plurality of sets of clusters, and a second graph that indicates a rate of decrease of Rk as a function of K for the plurality of sets of clusters.

In Example 40, the subject matter of Example 39, wherein: the plurality of sets of clusters comprises a set of clusters for each K in a range; and the operations further comprise: determining a fraction of the N data points that move between clusters as K increases for each increment of K in the range; and causing the user interface to comprise a weighted directional graph of movement of the N data points as K is increased.

In Example 41, the subject matter of Examples 39-40, wherein: the plurality of sets of clusters comprises a set of clusters for each K in a range; and the operations further comprise: in response to detecting a user input, increasing the range; and updating the user interface in accordance with the increased range.

In Example 42, the subject matter of Examples 39-41, wherein the operations further comprise: based on K and Rk for the plurality of sets of clusters and a predetermined threshold, including, in the user interface, a recommendation for a set of clusters to use.

In Example 43, the subject matter of Examples 39-42, wherein: the determining of the plurality of sets of clusters from the N data points is based on a first subset of D dimensions selected from C dimensions of data for each data point; and the operations further comprise: determining, based on a second subset of D dimensions selected from the C dimensions of data, a second plurality of sets of clusters from the N data points; for each set of clusters in the second plurality of sets of clusters, determining Rk for the N data points; and causing a second user interface to be presented on the display device, the second user interface comprising a third graph that indicates Rk as a function of K for the second plurality of sets of clusters.

In Example 44, the subject matter of Example 43, wherein the operations further comprise: detecting a first selection of a first set of clusters of the plurality of sets of clusters for the first subset of D dimensions; detecting a second selection of a second set of clusters of the second plurality of sets of clusters for the second subset of D dimensions; causing a third user interface to be presented on the display device, the third user interface comprising information regarding the first set of clusters and the second set of clusters; and based on a user input detected via the third user interface, selecting the first set of clusters and the first subset of D dimensions.

Example 45 is at least one machine-readable medium including instructions that, when executed by processing circuitry, cause the processing circuitry to perform operations to implement any of Examples 25-44.

Example 46 is an apparatus comprising means to implement any of Examples 25-44.

Example 47 is a system to implement any of Examples 25-44.

Example 48 is a method to implement any of Examples 25-44.

FIG. 18 is a flowchart illustrating an example process 1800 for providing a user interface comprising an indication of differences between clusters generated using the same clustering model on different data sets. The example process 1800 can be implemented, for example, by a computing device that comprises one or more processors and a non-transitory computer-readable medium. The non-transitory computer readable medium can store instructions that, when executed by the one or more processors, can cause the one or more processors to perform the operations of the illustrated process 1800. Alternatively or additionally, the process 1800 can be implemented using a non-transitory computer-readable medium storing instructions that, when executed by one or more processors, case the one or more processors to perform the operations of the process 1800 of FIG. 18. The process 1800 includes operations 1802, 1804, 1806, 1808, and 1810.

In operation 1802, one or more processors apply a clustering model (e.g., k-means, affinity propagation, agglomerative clustering, spectral clustering, or any suitable combination thereof) to a first data set comprising first data points. The clustering model determines a first center data point for each of a number (K) of first clusters and assigns each data point in the first data set to a first cluster. For example, the first data points may be assigned to the first cluster with the nearest first center data point.

By way of example and not limitation, the first data points may be the data points of FIG. 4, FIG. 5, FIG. 6, FIG. 7, and FIG. 9. The daily peak SVC usage 410 comprises a series of data points, with each data point having a value in a time dimension and a SVCs dimension. The daily ingestion 510 comprises a series of data points, with each data point having a value in the time dimension and a GB/day dimension. The GBS_READ 610 comprises a series of data points, with each data point having a value in the time dimension and a GBs read dimension. Similarly, the daily total searches 710 data and the daily average search latency 910 data may be accessed. By correlating the data for a given company and date, data points may be constructed with data in dimensions of: time, SVCs used, GBs ingested, GBs read, searches performed, and average search latency.

In operation 1804, the processors, apply the clustering model to a second data set comprising second data points. The clustering model determines a second center data point for each of K second clusters and assigns each data point in the second data set to a second cluster. For example, the second data points may be assigned to the second cluster with the nearest second center data point. The second data points may have the same source as the first data points, but be for a different date range. For example, the first data points may be the data shown in FIG. 4, FIG. 5, FIG. 6, FIG. 7, and FIG. 9 for October 1-October 5 and the second data points may be for October 6-October 10.

In operation 1806, the processors determine, for each second center point, a difference vector from a nearest first center point to the second center point. For example, the first center point may be subtracted from the second center point to determine the difference vector. The magnitude of the difference vector indicates an amount of change between the two center points.

Based on the determined difference vectors, in operation 1808 the processors determine a difference measure between the first clusters and the second clusters. For example, the total magnitude or average magnitude of the difference vectors may be used as the difference measure.

In operation 1810, the processors cause a user interface to be presented on a display device, whereby the user interface comprises an indication of the difference measure. For example, the difference measure may be presented as a numeric value in a table or graphically in a graph. Operations 1804-1808 may be repeated for additional data sets. Accordingly, the user interface may include multiple difference measures, allowing a user to see the change in the clusters over time.

Example 49 is a computing device, comprising: one or more hardware processors; and a non-transitory computer-readable medium having stored thereon instructions that, when executed by the one or more hardware processors, cause the one or more hardware processors to perform operations comprising: generating a cohort definition using a machine learning model based on a combination of a number (D) of dimensions selected from a first data set comprising first data points, wherein the cohort definition clusters the first data points into a number (K) of first clusters, each of the first clusters having a first center point; applying the machine learning model to a second data set comprising second data points to determine a second center point for each of K of second clusters; causing a user interface to be presented on a display device, the user interface comprising an indication of a difference measure between the first clusters and the second clusters, wherein the different measure is generated based on a difference vector determined for each second center point and a nearest first center point.

In Example 50, the subject matter of Example 49, the operations further comprising: determining, for each second cluster: a first cluster having a first center point nearest to the second center point of the second cluster; and a difference scalar between a number of second data points assigned to the second cluster and a number of first data points assigned to the first cluster; wherein the determining of the difference measure between the first clusters and the second clusters is further based on the determined difference scalars.

In Example 51, the subject matter of Examples 49-50, the operations further comprising: based on the difference measure between the first clusters and the second clusters and a predetermined threshold, the user interface further comprises a recommendation to select different dimensions for clustering.

In Example 52, the subject matter of Examples 49-51, the operations further comprising: applying the cohort definition to a third data set comprising third data points to determine a third center point for each of K of third clusters and assign each data point in the third data set to a third cluster; determining, for each third center point, a second difference vector from a nearest second center point to the third center point; and based on the determined second difference vectors, determining a second difference measure between the second clusters and the third clusters; wherein the user interface further comprises an indication of the second difference measure.

In Example 53, the subject matter of Examples 49-52, wherein: the first data points comprise data for a first period of time; and the second data points comprise data for a second period of time.

In Example 54, the subject matter of Examples 49-53, wherein the applying of the cohort definition to the first data set comprising the first data points comprises applying K-means clustering to the first data points.

In Example 55, the subject matter of Examples 49-54, wherein the operations further comprise: generating the first data points by linking customer relationship management (CRM) and product usage data using shared identifiers.

In Example 56, the subject matter of Example 55, wherein the operations further comprise: accessing CRM data that indicates a parent-subsidiary relationship between a parent account and a subsidiary account; and accessing first product usage data that is linked to both the parent account and the subsidiary account; wherein the generating of the first data points comprises generating a data point that links the first product usage data to the subsidiary account.

Example 57 is a non-transitory computer-readable medium having stored thereon instructions that, when executed by one or more processors, cause the one or more processors to perform operations including: generating a cohort definition using a machine learning model based on a combination of a number (D) of dimensions selected from a first data set comprising first data points, wherein the cohort definition clusters the first data points into a number (K) of first clusters, each of the first clusters having a first center point; applying the machine learning model to a second data set comprising second data points to determine a second center point for each of K of second clusters; causing a user interface to be presented on a display device, the user interface comprising an indication of a difference measure between the first clusters and the second clusters, wherein the different measure is generated based on a difference vector determined for each second center point and a nearest first center point.

In Example 58, the subject matter of Example 57, the operations further comprising: determining, for each second cluster: a first cluster having a first center point nearest to the second center point of the second cluster; and a difference scalar between a number of second data points assigned to the second cluster and a number of first data points assigned to the first cluster; wherein the determining of the difference measure between the first clusters and the second clusters is further based on the determined difference scalars.

In Example 59, the subject matter of Examples 57-58, the operations further comprising: based on the difference measure between the first clusters and the second clusters and a predetermined threshold, the user interface further comprises a recommendation to select different dimensions for clustering.

In Example 60, the subject matter of Examples 57-59, the operations further comprising: applying the cohort definition to a third data set comprising third data points to determine a third center point for each of K of third clusters and assign each data point in the third data set to a third cluster; determining, for each third center point, a second difference vector from a nearest second center point to the third center point; and based on the determined second difference vectors, determining a second difference measure between the second clusters and the third clusters; wherein the user interface further comprises an indication of the second difference measure.

In Example 61, the subject matter of Examples 57-60, wherein: the first data points comprise data for a first period of time; and the second data points comprise data for a second period of time.

In Example 62, the subject matter of Examples 57-61, wherein the applying of the cohort definition to the first data set comprising the first data points comprises applying K-means clustering to the first data points.

In Example 63, the subject matter of Examples 57-62, wherein the operations further comprise: generating the first data points by linking customer relationship management (CRM) and product usage data using shared identifiers.

In Example 64, the subject matter of Example 63, wherein the operations further comprise: accessing CRM data that indicates a parent-subsidiary relationship between a parent account and a subsidiary account; and accessing first product usage data that is linked to both the parent account and the subsidiary account; wherein the generating of the first data points comprises generating a data point that links the first product usage data to the subsidiary account.

Example 65 is a computer-implemented method, comprising: generating, by one or more processors, a cohort definition using a machine learning model based on a combination of a number (D) of dimensions selected from a first data set comprising first data points, wherein the cohort definition clusters the first data points into a number (K) of first clusters, each of the first clusters having a first center point; applying the machine learning model to a second data set comprising second data points to determine a second center point for each of K of second clusters; causing a user interface to be presented on a display device, the user interface comprising an indication of a difference measure between the first clusters and the second clusters, wherein the different measure is generated based on a difference vector determined for each second center point and a nearest first center point.

In Example 66, the subject matter of Example 65 includes determining, for each second cluster: a first cluster having a first center point nearest to the second center point of the second cluster; and a difference scalar between a number of second data points assigned to the second cluster and a number of first data points assigned to the first cluster; wherein the determining of the difference measure between the first clusters and the second clusters is further based on the determined difference scalars.

In Example 67, the subject matter of Examples 65-66 includes, based on the difference measure between the first clusters and the second clusters and a predetermined threshold, the user interface further comprises a recommendation to select different dimensions for clustering.

In Example 68, the subject matter of Examples 65-67 includes applying the cohort definition to a third data set comprising third data points to determine a third center point for each of K of third clusters and assign each data point in the third data set to a third cluster; determining, for each third center point, a second difference vector from a nearest second center point to the third center point; and based on the determined second difference vectors, determining a second difference measure between the second clusters and the third clusters; wherein the user interface further comprises an indication of the second difference measure.

Example 69 is at least one machine-readable medium including instructions that, when executed by processing circuitry, cause the processing circuitry to perform operations to implement any of Examples 49-68.

Example 70 is an apparatus comprising means to implement any of Examples 49-68.

Example 71 is a system to implement any of Examples 49-68.

Example 72 is a method to implement any of Examples 49-68.

Figure 19:
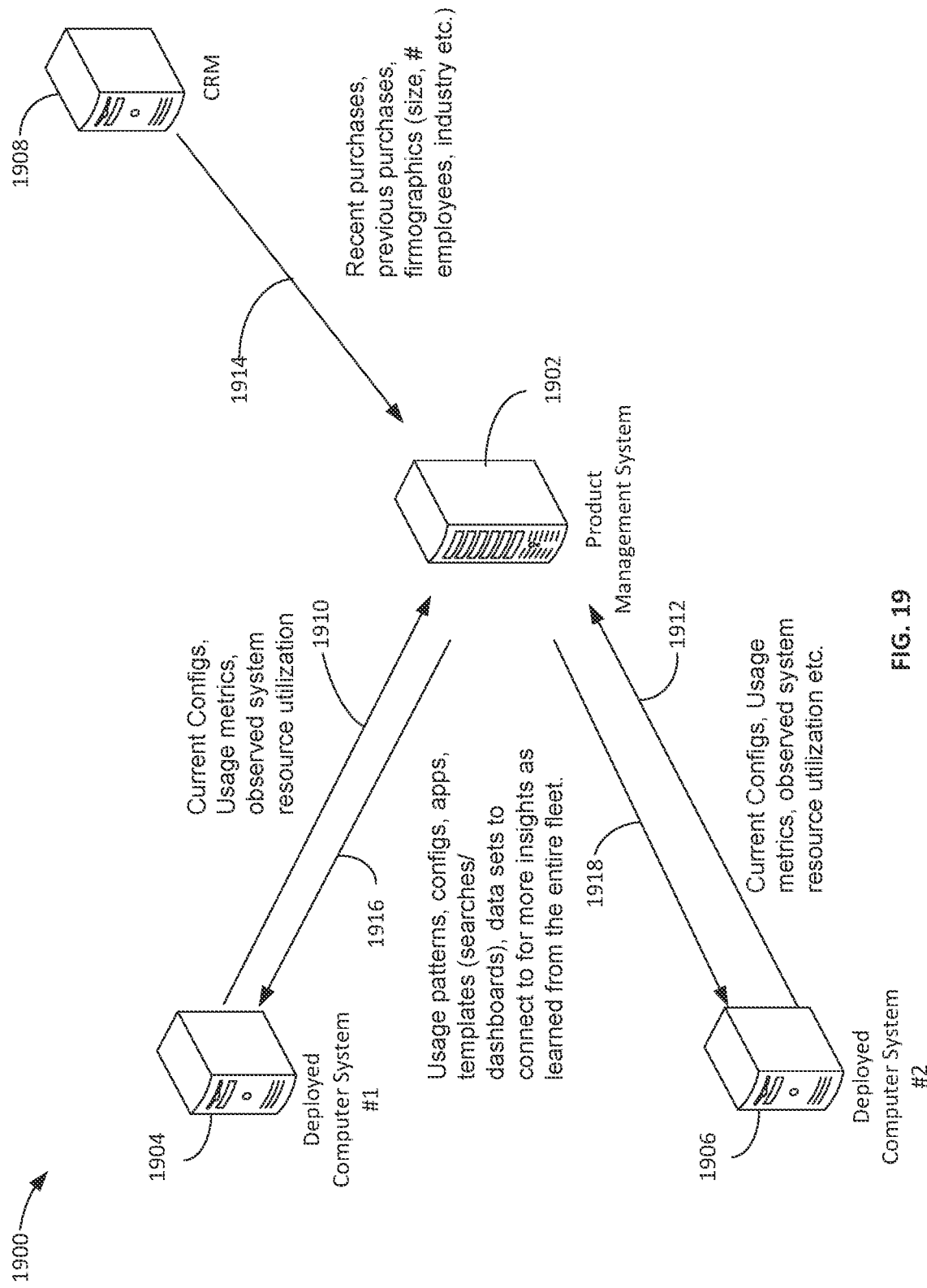
FIG. 19 is an overview diagram of a computing system implementing one or more of the disclosed examples.

FIG. 19 is an overview diagram of a computing system implementing one or more of the disclosed examples. The computing system may be utilized to implement one or more of the methods and systems for customer cohort identification described herein. FIG. 19 shows a product management system 1902 in communication with two deployed computer systems, a first deployed computer system 1904 and a second deployed computer system 1906. The first deployed computer system 1904 and the second deployed computer system 1906 are both examples of a data intake and query system. Each of deployed computer systems 1902 and 1904 may further be examples of systems utilized by a customer of XYZ Company. The product management system 1902 trains a model based on input from each of the first deployed computer system 1904 and second deployed computer system 1906. For example, each of the first deployed computer system 1904 and the second deployed computer system 1906 provide usage information and resource utilization information, installed product information to the product management system 1902. This supplied information is shown as message 1910 and message 1912, transmitted by the first deployed computer system 1904 and the second deployed computer system 1906 respectively.

The product management system 1902 also receives customer relational information from a customer relationship management (CRM) system 1908, via a CRM info message 1914. The CRM system 1908 provides information pertaining to a plurality of customers. Information such as recent purchases, previous purchases, firmographics (e.g., data regarding the customer, such as data analogous to demographic information of a user). Firmographics includes, in various examples, one or more of a number of employees at the customer, the customer's line of business/industry, terms of the customer's license, or other information. In some examples, the product management system 1902 trains the model based on the CRM information received from the CRM system 1908, as discussed below.

A trained cohort model for configuring cohort structures is generated and maintained at the product management system 1902. In some embodiments, the trained model may be provided by the product management system 1902 to each of the first deployed computer system 1904 and the second deployed computer system 1906 via a first deployment message 1916 and a second deployment message 1918. As shown in FIG. 19, product management system 1902 receives product usage data from each of deployed computer systems 1903 and 1906, including: current configurations, usage metrics, and observed system resource utilization. This product usage data may be received via messages 1910 and 1912.

As previously described, the CRM data and product usage data is joined and input into the trained model to place the customer corresponding to the deployed computer system within a customer cohort. Once a customer is placed into a customer cohort, various analytics may be determined for the customer. For example, one of a plurality of predefined states may be determined to be appropriate for the customer for their current operating environment. Each of the predefined states define values for a plurality of configuration parameters. Based on the predefined state most appropriate for their operating environment, each of the first deployed computer system 1904 and second deployed computer system 1906 may update their operating system parameters defined by the predefined state.

Figure 20:
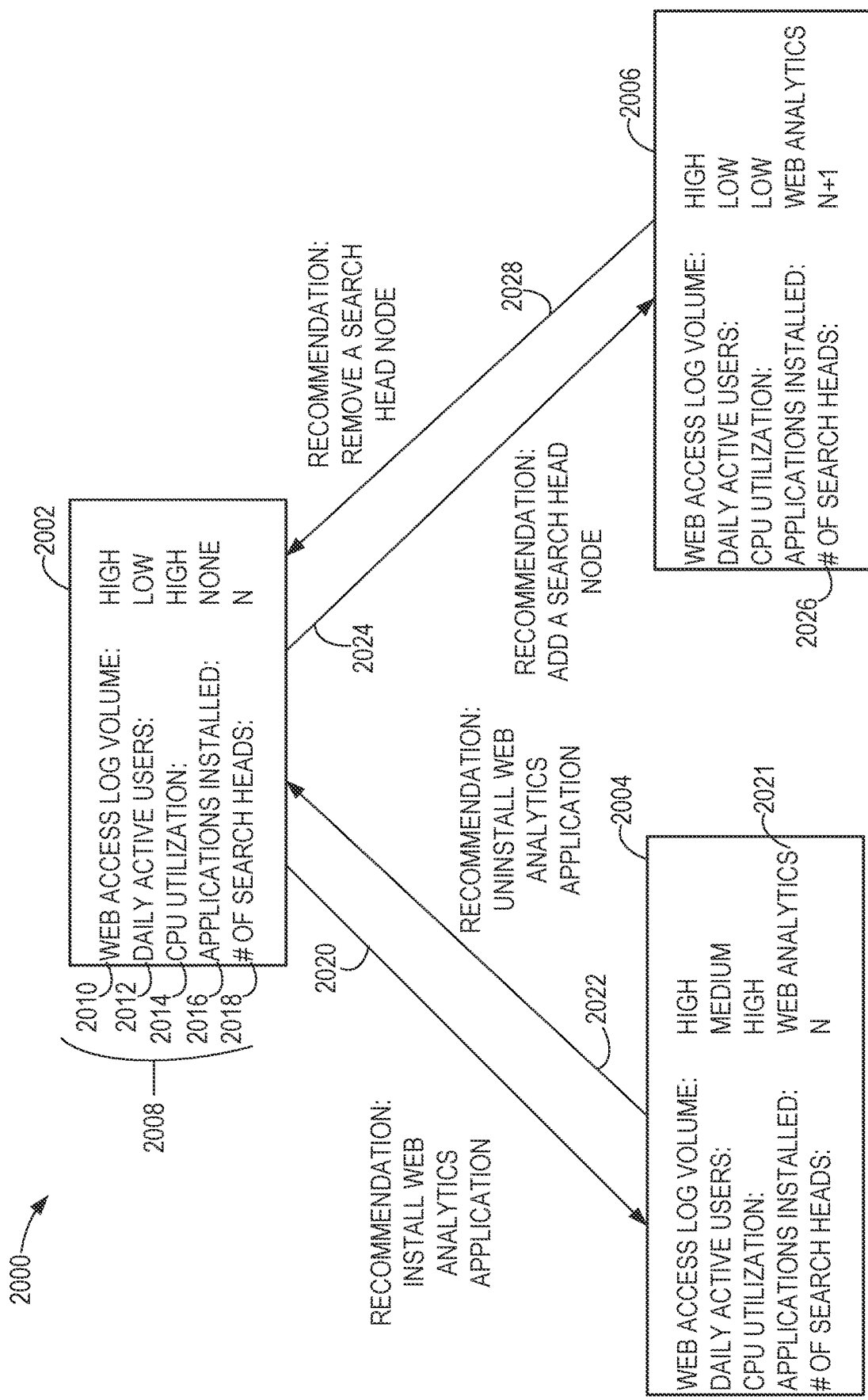
FIG. 20 is a state transition diagram illustrating example state transitions implemented in one or more of the disclosed embodiments.

FIG. 20 is a state transition diagram 2000 illustrating example state transitions implemented in one or more of the disclosed embodiments. FIG. 20 shows three states, a first state 2002, a second state 2004, and a third state 2006. Each state is defined by a plurality of parameter values, such as parameter values 2008. In the example of FIG. 20, the parameter values 2008 include a web access log volume 2010, a number of daily active users 2012, CPU utilization 2014, a list of installed applications 2016, and a number of search heads parameter 2018.

FIG. 20 shows that, while an example installation of a software program is operating in the first state 2002, it receives a recommendation from a model to install a "web analytics" application. This causes a state transition 2020 from the first state 2002 to the second state 2004. Due to the state transition 2020, the example installation of a software program implementing the second state 2004 initiates an installation of a "web analytics" application, as defined by the second state 2004. Thus, the parameter 2021 shows that, as a result of operating in the second state 2004, the example installation of a software program installs the "web analytics" application.

FIG. 20 also shows a state transition 2022 from the second state 2004 back to the first state 2002. The state transition 2022 is in response, in at least some embodiments, to output from a machine learning model indicating that the first state 2002 is preferred or recommended for an installation of a software program given a current set of operational parameter values. As a result, the example installation of a software program uninstalls the "web analytics" application, as reflected in the list of installed applications 2016.

FIG. 20 further illustrates a state transition 2024 that indicates a recommendation to add a search node. As a result, the example installation of a software program transitions from the first state 2002 to the third state 2006. As a result of operating in the third state 2006, the example installation of a software program increases the number of search heads from a number indicated by the number of search heads parameter 2018 to a different number of search heads shown by the parameter 2026.

FIG. 20 further shows a state transition 2028 from the third state 2006 back to the first state 2002 based on a recommendation from a model to reduce a number of search heads from the number specified by the parameter 2026 to the number specified by the number of search heads parameter 2018. Thus, the example installation of a software program operates in the first state 2002.

Figure 21:
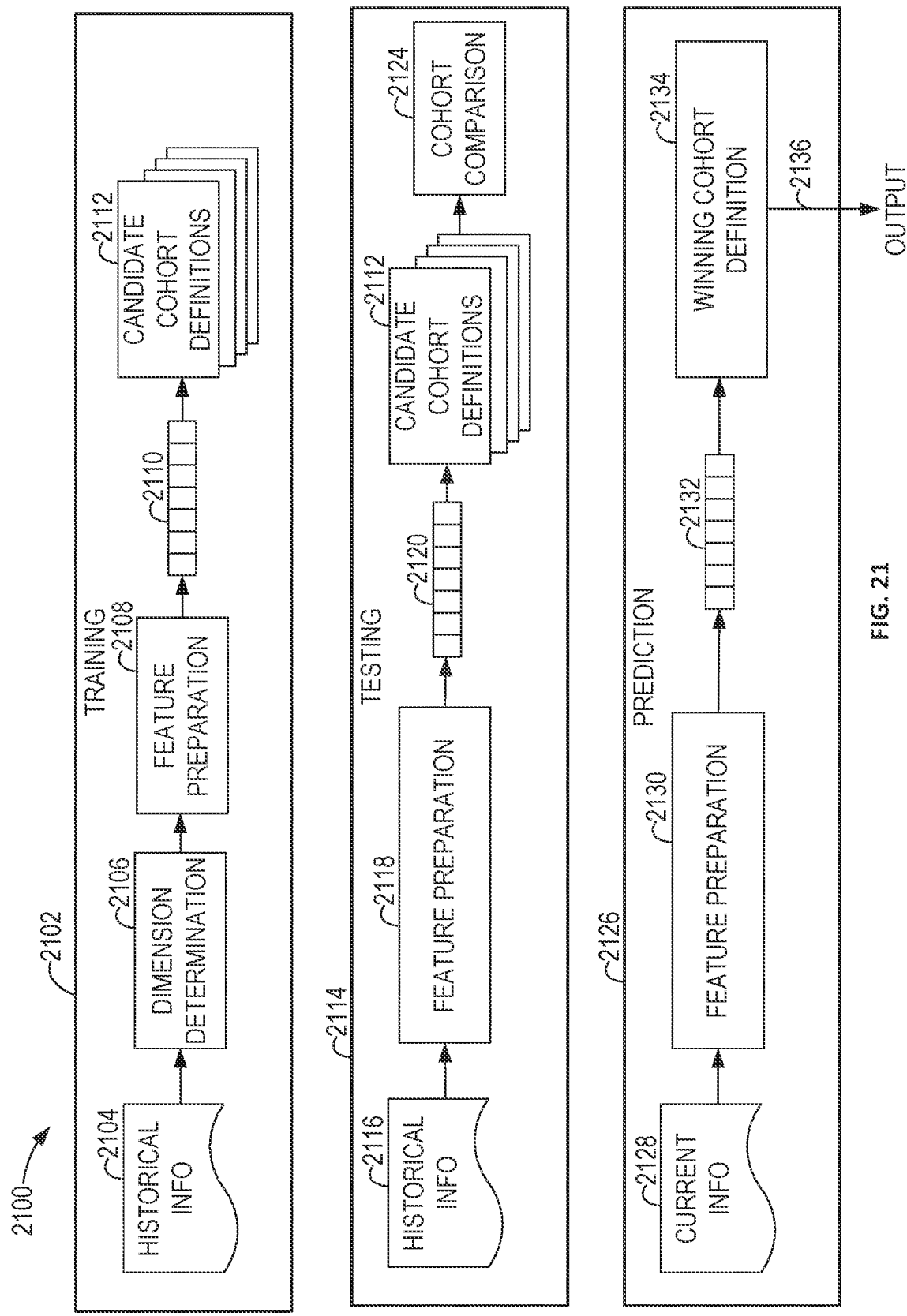
FIG. 21 shows an example machine learning module according to some examples of the present disclosure.

FIG. 21 shows an example machine learning module 2100 according to some examples of the present disclosure. In various embodiments, machine learning module 2100 is deployed by product management system 1902. Machine learning module 2100 utilizes a training module 2102, a testing module 2114, and a prediction module 2126. The training module 2102 inputs historical information 2104 into dimension determination module 2106. The historical information 2104 represents, in some embodiments, a training database that stores training data for training a machine learning clustering model. In some embodiments, the historical information 2104 is labeled. Example historical information includes CRM data joined with product usage data.

The dimension determination module 2106 determines a number of dimensions of the historical information 2104 to use for clustering, as previously described and with reference to FIG. 16. Once the number of dimensions is determined, various combinations of dimensions may be selected to train and generate a cohort model.

The feature preparation module 2108 prepares data for clustering. For each combination of dimensions, feature preparation module 2108 determines and configures one or more features 2110 from this historical information 2104 based on the corresponding dimensions. Stated generally, features 2110 are a set of the information input and are determined to be predictive of a particular outcome (i.e. cohort). In some examples, the features 2110 may be all the historical information 2104, but in other examples, the features 2110 are a subset of the historical information 2104. For example, a base-10 or base-2 logarithm of the historical data values may be taken before clustering is performed.

The prepared features 2110 are used by the cohort model to prepare candidate cohort definitions 2112. A different candidate cohort definition 2112 is prepared for each different combination of dimensions. For example, if the historical information 2104 comprises N data points of C dimensions each and the dimension determination module 2106 determines that D of the C dimensions should be used for clustering, there are combinations of candidate input dimensions and candidate cohort definitions 2112. A cohort definition comprises identification of the D dimensions used for clustering, identification of a number (K) of clusters, and identification of the K cluster centers.

As previously described, FIGS. 10-15 illustrate examples of visualizations of generated candidate cohort definitions. For Example, FIG. 10 illustrates a table showing cohorts clustered based on a first candidate cohort definition, and FIG. 11 visualizes the data points, with each cohort indicated by color, over 3 dimensions, user created indexes, monthly page views, and daily searches. As another example, FIG. 12 illustrates a table showing cohorts clustered based on a second candidate cohort definition, and FIG. 13 visualizes the data points, with each cohort indicated by color, over 3 dimensions, user created indexes, monthly page views, and daily searches. FIGS. 14 and 15 show a table view of cohorts clustered based on up to 9 dimensions.

The testing module 2114 determines which of the cohort definitions 2112 to use for clustering based on various cohort quality measures. Different historical information 2116 is used for testing. For example, a large data set may be divided into a training set and a testing set (e.g., with 90% of the data points randomly selected to be in the training set and the remaining 10% composing the testing set). As another example, data from a first period of time may be used as the training set and data from a second period of time may be used as the testing set. The feature preparation module 2118 prepares the features of the historical information 2118 for clustering based on the selected dimensions corresponding to the particular cohort definition. The prepared features 2120 are provided to the corresponding candidate cohort definitions 2112 and an error measure for each candidate cohort definition 2112 is determined (e.g., the mean distance between each data point and the nearest cluster center point), as described with reference to FIG. 17. The error measures are compared by the cohort comparison module 2124 and a winning cohort definition is selected based on various cohort quality measures. For example, the candidate cohort definition 2112 with the lowest median error or the cohort definition with the least maximum error may be selected as the winning cohort definition. As another example, the candidate cohort definition with the lowest 60$^{th}$ percentile error, or the lowest 80$^{th}$ percentile error, may be selected. As a further example, a candidate cohort definition with the lowest sum of residual errors (Rk) may be selected.

In the prediction module 2126, current information 2128 may be input to the feature preparation module 2130. The current information 2128 in the disclosed embodiments include similar indications of that described above with respect to the historical information 2104 and the historical information 2116, and include joined CRM and product usage data. The current information 2128 may correspond to CRM and product usage data for a target customer to be cohorted. For example, an installation of a computer program provides, in various embodiments, one or more of the operational parameter values discussed above, that characterize a current operating environment of the installation, and the CRM data may be obtained from a CRM system, that includes information pertaining to the target customer.

Feature preparation module 2130 determines, in some embodiments, an equivalent set of features or a different set of features from the current information 2128 as the feature preparation modules 2108 and 2116. In some examples, the feature preparation modules 2108, 2118, and 2130 are the same module. The feature preparation module 2130 produces the features 2132, based on the particular combination of dimensions in the winning candidate definition, which are input into the winning cohort definition 2134 to generate an identification of a cohort based on the current information 2128. For example, the cohort may correspond to selection of a preferred or recommended operating state of an installation of a software program.

The training module 2102 may operate in an offline manner to generate the candidate cohort definitions 2112. The training module 2102 also operates, in some embodiments, in an online manner. For example, some embodiments of the training module 2102 receive historical information 2104 from one or more installations of a software program and use this information to generate the candidate cohort definitions 2112. This also applies to the testing module 2114. In some embodiments, testing module 2114 may be the same module, or a different configuration of, training module 2102.

The prediction module 2126, generally operates locally at an installation of a software program. For example, the prediction module 2126 may be implemented by product management system 1902. However prediction module 2126 may also be implemented on any one of the systems described with reference to FIG. 19. The installation invokes the winning cohort definition 2134 to determine whether installation of software on customer systems corresponding to the target customer should transition from an existing or first operating state to a second operating state, as discussed above. The determination may be based on software configuration characteristics of the cohort that the target customer is associated with by the model implementing the winning cohort definition.

In some embodiments, the winning cohort definition 2134 is made available via a web service or other technology that provides for remote invocation of the model. For example, in some embodiments, the product deployment server 1902 executes the winning cohort definition 2134, and each of the installations of a software program (e.g. 1904 and/or 1906) remotely provide input (e.g. current information 2128) to the winning cohort definition 2134 executing at the product management server 1902. As discussed above, the winning cohort definition 2134 may be periodically updated via additional training and/or user feedback.

The prediction module 2126 generates one or more outputs 2136. The outputs include, in some embodiments, a selection of a recommended or preferred operating mode or state of an installation of a software product.

The candidate cohort definitions 2112 may be generated using various different models. Examples of clustering models include k-means, affinity propagation, agglomerative clustering, and spectral clustering.

Figure 22:
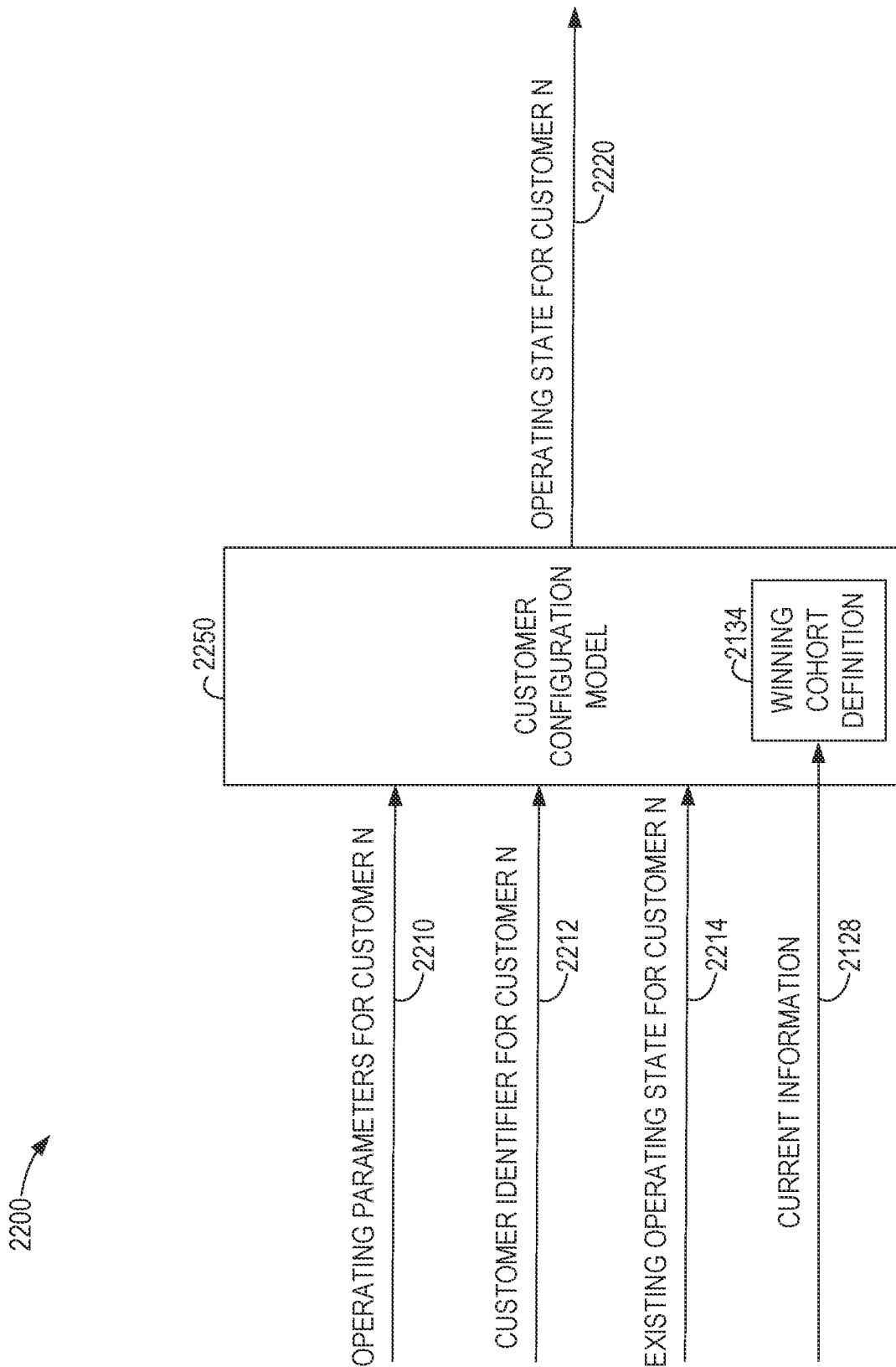
FIG. 22 illustrates data flow during a model training process that is implemented in one or more of the disclosed embodiments.

FIG. 22 illustrates data flow during a customer configuration model usage process that is implemented in one or more of the disclosed embodiments. The data flow 2200 shows operating parameter values 2210 of an installation of a software program for a customer being provided to customer configuration model 2250. In various embodiments, customer configuration model 2250 may be a model including the customer cohort model implementing the winning cohort definition 2134. In some embodiments customer configuration model 2250 is the same model as the customer cohort model. Based on the current information 2128 being input into the winning cohort definition 2134, as described with reference to prediction module 2126, the customer is grouped within a defined cohort. Based on the operating parameter values 2210, a customer identifier 2212, and an existing operating state of the customer 2214, customer configuration model 2250 identifies a recommended or selected operating state 2220 for the customer's software program. The cohort may correspond to the recommended or selected operating state 2220.

Thus, the data flow 2200 illustrated with respect to FIG. 22 relies, in at least some embodiments, on the winning cohort definition 2134 resulting from the machine learning module 2100. As shown in FIG. 22, a deployed computer system (1904 or 1906) provides operating parameter values 2210 and a customer identifier 2212 to the customer configuration model.

Based on the provided operating parameter values 2210, the customer identifier 2212, and the existing operating state 2214, the customer configuration model 2250 generates an operating state indicator 2220. The operating state indicator 2220 indicates a suggested operating state for the installation of a software program to operate in, based on the installation of the software program's operating parameter values 2210 and the recommended operating parameter values corresponding to the relevant cohort.

As discussed above, the operating state defines a plurality of parameters or sub-states that govern operation of the installation of a software program. These include, for example, a number of search heads, a number of processing threads, a list of installed applications, or other configuration information. The winning cohort definition 2134 utilizes the customer identifier 2212 to identify an existing operating state of the customer, which can affect which operating state is recommended or selected via the operating state indicator 2220.

Figure 23:
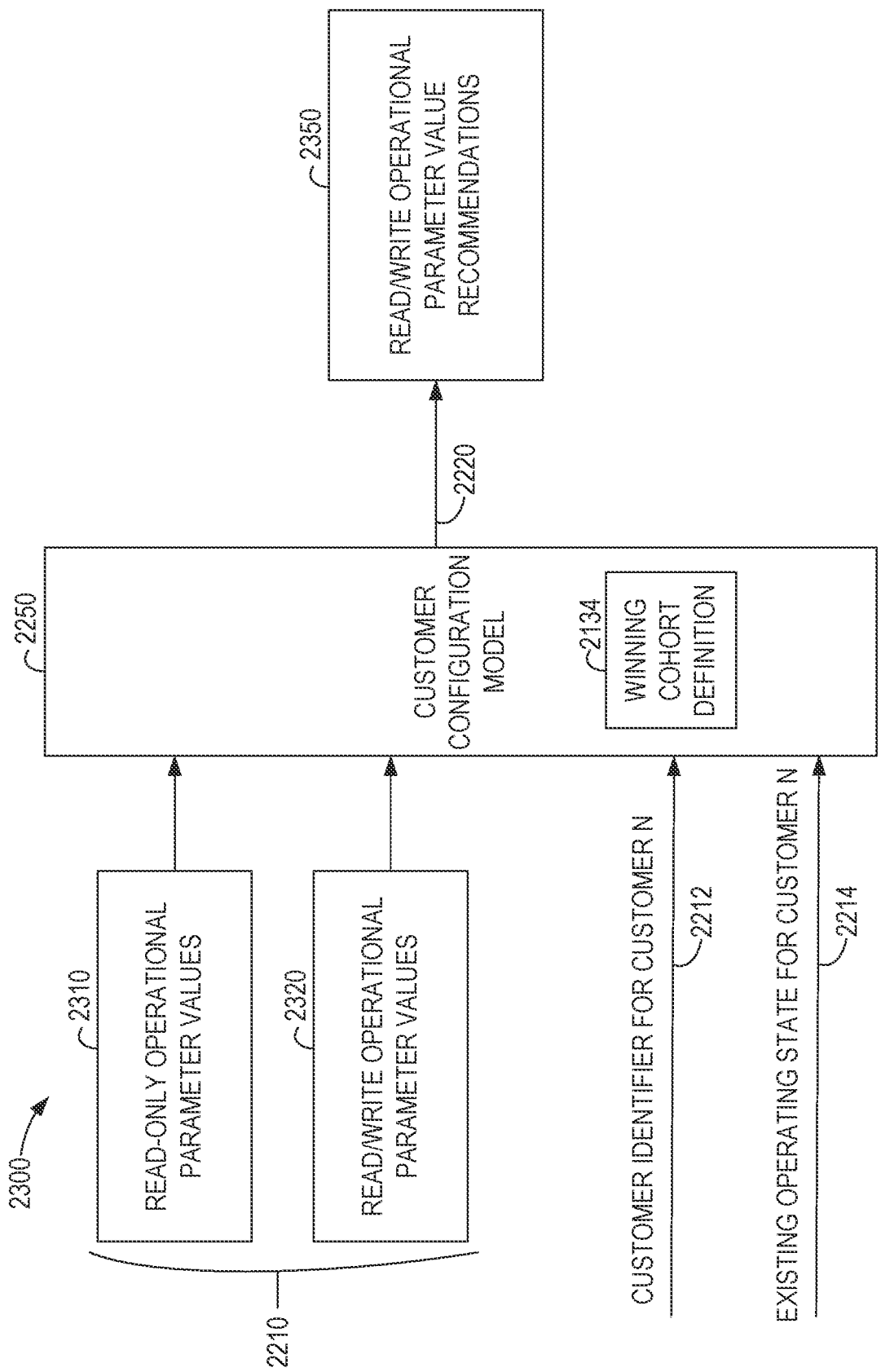
FIG. 23 illustrates data flow through a model in one or more of the disclosed embodiments.

FIG. 23 illustrates data flow through a customer configuration model in one or more of the disclosed embodiments. The data flow 2300 shows customer configuration model 2250 being provided with operational parameter values 2210, a customer identifier 2212, and an indication of an existing operating state 2214 of an installation of a software program at the customer. Input 2210, 2212, and 2214 may be transmitted by, or received from, a deployed computer system (1904 or 1906) of the customer.

The operational parameter values 2210 both include read-only operational parameter values 2310 and read/write operational parameter values 2320. The read-only operational parameter values 2310 are those that cannot be directly modified based on, for example, output from the customer configuration model. Some examples of read-only operational parameter values include resource utilization metrics, such as CPU utilization, memory utilization, or performance metrics, such as latency or throughput metrics. Read/write operational parameter values 2320 are those that can be modified directly by the disclosed embodiments, for example, based on the operating state indicator 2220 output by the winning cohort definition 2134. These include, for example, a list of applications installed as part of an installation of a software program, a number of search heads (e.g., an instance that distributes searches to other indexers, and in some embodiments, does not include any indexes itself, or a reception point or process for incoming computational requests), a number of processing threads, or other parameters.

As discussed above, the customer configuration model outputs a selection of one of a plurality of predefined states 2220, with each state defining or being associated with values of one or more operational parameter values. The selected operating state 2220 may include only read/write operational parameter value recommendations 2350. Customer configuration model 2250 thus relies on output from the winning cohort definition 2134 to determine operational parameter values according to those defined by the state indicated by the cohort.

Figure 24:
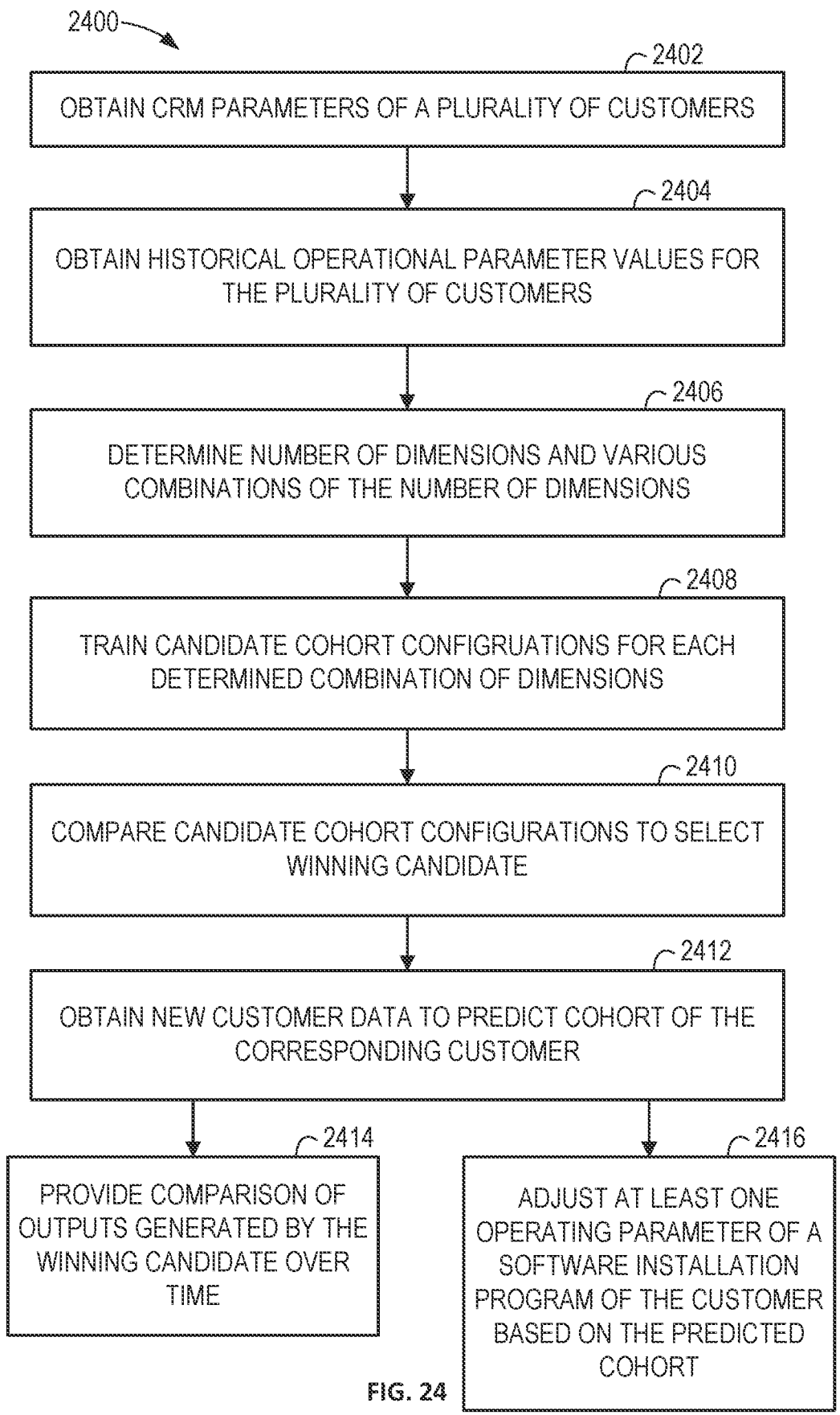
FIG. 24 is a flowchart illustrating an example process for training cohort configurations and using the trained cohort configurations to provide comparison of outputs over time or adjust operating parameters of a software installation program.

FIG. 24 is a flowchart illustrating an example process 2400 for training cohort configurations and using the trained cohort configurations to provide comparison of outputs over time or adjust operating parameters of a software installation program. The process 2400 includes operations 2402, 2404, 2406, 2408, 2410, 2412, 2414, AND 2416. By way of example and not limitation, the process 2400 is described as being performed by the product management system 1902 of FIG. 19.

In operation 2402, the product management system 1902 obtains CRM parameters of a plurality of customers. For example, the CRM system 1908 may provide CRM information messages 1914 with CRM parameters for multiple customers.

The product management system 1902, in operation 2404, obtains historical operational parameter values for the plurality of customers. For example, historical operational parameter values may be accessed from a database, from the deployed computer systems 1904 and 1906, from the CRM system 1908, or any suitable combination thereof.

In operation 2406, the product management system 1902 determines a number of dimensions to use for clustering and various combinations of the number of dimensions. For example, as discussed above, the number of data points and the number of bits of information per data point may be used in combination with a predetermined threshold to determine a maximum number of dimensions to use. If the maximum number of dimensions to use is less than the number of dimensions available, multiple possible selections of combinations of dimensions are determined. Operations 1602, 1604, and 1606 of the process 1600 of FIG. 16 and/or operation 1802 of the process 1800 of FIG. 18 may be performed as part of operation 2406.

The product management system 1902 trains a machine learning model to generate candidate cohort configurations for each determined combination of dimensions (operation 2408). As an example, the machine learning module 2100 of FIG. 21 may generate the candidate cohort definitions 2112. Using the testing module 2114, the candidate cohort configurations are compared to select the winning cohort definition 2134 is determined (operation 2410).

In operation 2412, the product management system 1902 obtains new customer data and uses the new customer data to predict a cohort of the corresponding customer. For example, the messages 1910 and 1912 of FIG. 19 may include new customer data. Features of the new customer data may be prepared by the feature preparation module 2130 of FIG. 21 and provided to the winning cohort definition 2134. Operations 1702 and 1704 of the process 1700 of FIG. 17 may be performed as part of operation 2412.

Operation 2412 may be performed repeatedly as new data is obtained. For example, operation 2412 may be performed hourly, weekly, or monthly. The product management system 1902, in operation 2414, provides a comparison of outputs generated by the winning candidate over time. Thus, a change in the cohort for the customer may be detected and displayed. Operations 1804, 1806, and 1808 of the process 1800 of FIG. 18 may be performed as part of operation 2412.

In operation 2416, the product management system 1902 adjusts at least one operating parameter of a software installation program of the customer based on the predicted cohort. For example, the cohorts may be the cohorts of FIG. 12 and categorize customers as having smallest stacks, smaller stacks, medium stacks, larger stacks, or largest stacks. If the winning cohort definition 2134 determines that a customer that was previously in the smaller stacks cohort is now in the medium stacks cohort, additional computing resources may be allocated to the customer.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 25:
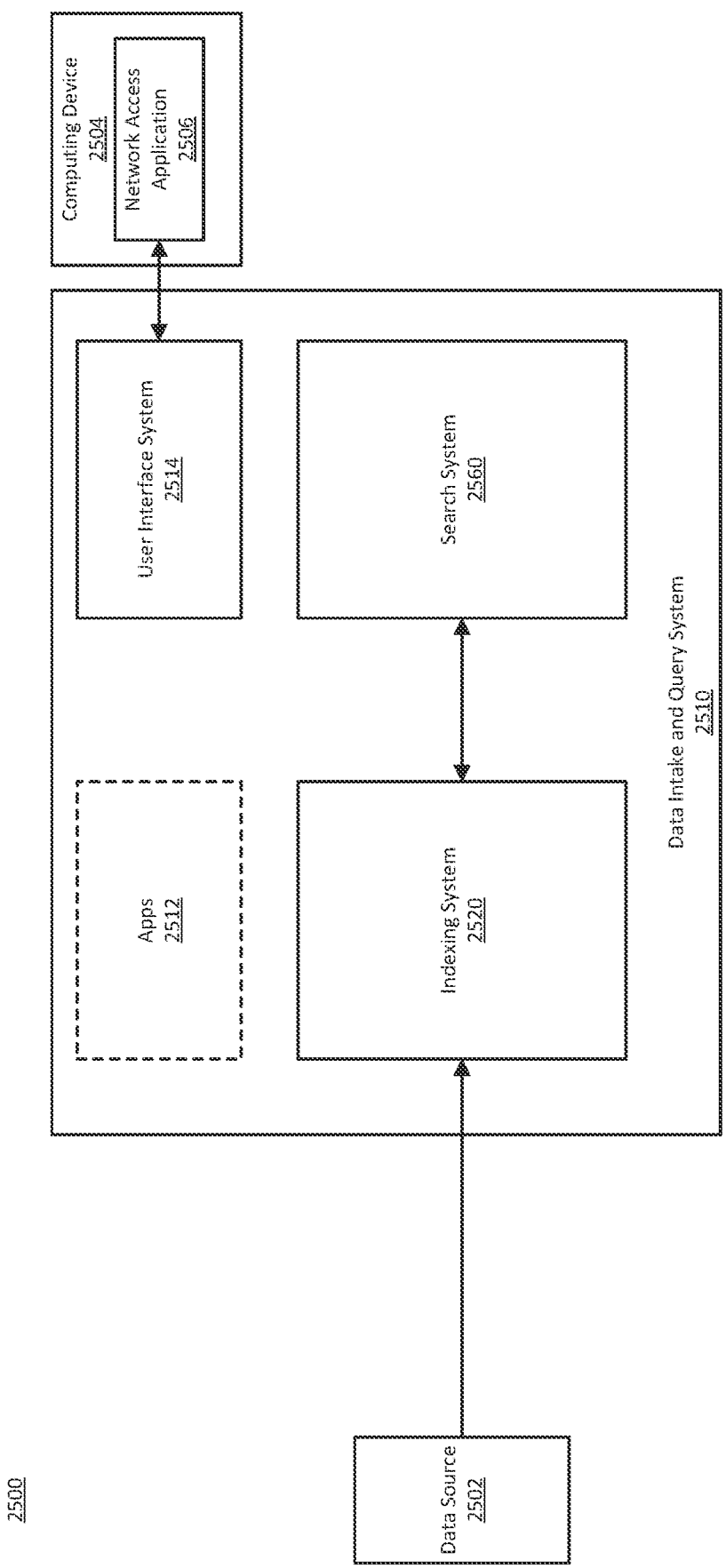
FIG. 25 is a block diagram illustrating an example computing environment that includes a data intake and query system.

FIG. 25 is a block diagram illustrating an example computing environment 2500 that includes a data intake and query system 2510. The data intake and query system 2510 obtains data from a data source 2502 in the computing environment 2500, and ingests the data using an indexing system 2520. A search system 2560 of the data intake and query system 2510 enables users to navigate the indexed data. Though drawn with separate boxes, in some implementations the indexing system 2520 and the search system 2560 can have overlapping components. A computing device 2504, running a network access application 2506, can communicate with the data intake and query system 2510 through a user interface system 2514 of the data intake and query system 2510. Using the computing device 2504, a user can perform various operations with respect to the data intake and query system 2510, such as administration of the data intake and query system 2510, management and generation of "knowledge objects," initiating of searches, and generation of reports, among other operations. The data intake and query system 2510 can further optionally include apps 2512 that extend the search, analytics, and/or visualization capabilities of the data intake and query system 2510.

The data intake and query system 2510 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 2510 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 2510 can execute on a single computing device, or may be distributed over multiple computing devices. For example, the program code can include instructions for executing both indexing and search components (which may be part of the indexing system 2520 and/or the search system 2560, respectively), and can be executed on a computing device that also provides the data source 2502. As another example, the program code can execute on one computing device, where the program code executes both indexing and search components, while another copy of the program code executes on a second computing device that provides the data source 2502. As another example, the program code can execute only an indexing component or only a search component. In this example, a first instance of the program code that is executing the indexing component and a second instance of the program code that is executing the search component can be executing on the same computing device or on different computing devices.

The data source 2502 of the computing environment 2500 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 2502 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 2520 obtains machine date from the data source 2502 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 2520 does not require prior knowledge of the structure of incoming data (e.g., the indexing system 2520 does not need to be provided with a schema describing the data). Additionally, the indexing system 2520 retains a copy of the data as it was received by the indexing system 2520 such that the original data is always available for searching (e.g., no data is discarded, though, in some examples, the indexing system 2520 can be configured to do so).

The search system 2560 searches the data stored by the indexing 2520 system. As discussed in greater detail below, the search system 2560 enables users associated with the computing environment 2500 (and possibly also other users) to navigate the data, generate reports, and visualize results in "dashboards" output using a graphical interface. Using the facilities of the search system 2560, users can obtain insights about the data, such as retrieving events from an index, calculating metrics, searching for specific conditions within a rolling time window, identifying patterns in the data, and predicting future trends, among other examples. To achieve greater efficiency, the search system 2560 can apply map-reduce methods to parallelize searching of large volumes of data. Additionally, because the original data is available, the search system 2560 can apply a schema to the data at search time. This allows different structures to be applied to the same data, or for the structure to be modified if or when the content of the data changes. Application of a schema at search time may be referred to herein as a late-binding schema technique.

The user interface system 2514 provides mechanisms through which users associated with the computing environment 2500 (and possibly others) can interact with the data intake and query system 2510. These interactions can include configuration, administration, and management of the indexing system 2520, initiation and/or scheduling of queries to the search system 2560, receipt or reporting of search results, and/or visualization of search results. The user interface system 2514 can include, for example, facilities to provide a command line interface or a web-based interface.

Users can access the user interface system 2514 using a computing device 2504 that communicates with data intake and query system 2510, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 2500. For example, a person can log in as a particular user and, using the user's digital information, can access the data intake and query system 2510. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 2504 can provide a human-machine interface through which a person can have a digital presence in the computing environment 2500 in the form of a user. The computing device 2504 is an electronic device having one or more processors and a memory capable of storing instructions for execution by the one or more processors. The computing device 2504 can further include input/output (I/O) hardware and a network interface. Applications executed by the computing device 2504 can include a network access application 2506, which can a network interface of the client computing device 2504 to communicate, over a network, with the user interface system 2514 of the data intake and query system 2510. The user interface system 2514 can use the network access application 2506 to generate user interfaces that enable a user to interact with the data intake and query system 2510. A web browser is one example of a network access application. A shell tool can also be used as a network access application. In some examples, the data intake and query system 2510 is an application executing on the computing device 2506. In such examples, the network access application 2506 can access the user interface system 2514 without needed to go over a network.

The data intake and query system 2510 can optionally include apps 2512. An app of the data intake and query system 2510 is a collection of configurations, knowledge objects (a user-defined entity that enriches the data in the data intake and query system 2510), views, and dashboards that may provide additional functionality, different techniques for searching the data, and/or additional insights into the data. The data intake and query system 2510 can execute multiple applications simultaneously. Example applications include an information technology service intelligence application, which can monitor and analyze the performance and behavior of the computing environment 2500, and an enterprise security application, which can include content and searches to assist security analysts in diagnosing and acting on anomalous or malicious behavior in the computing environment 2500.

Though FIG. 25 illustrates only one data source, in practical implementations, the computing environment 2500 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 2500, the data intake and query system 2510 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 2500 can include on-prem and cloud-based computing resources, or only cloud-based resources. For example, an entity may have on-prem computing devices and a private cloud. In this example, the entity operates the data intake and query system 2510 and can choose to execute the data intake and query system 2510 on an on-prem computing device or in the cloud. In another example, a provider entity operates the data intake and query system 2510 in a public cloud and provides the functionality of the data intake and query system 2510 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 2510. In some implementations, the entity providing the data intake and query system 2510 is itself subscribing to the cloud services of a cloud service provider. As an example, a first entity provides computing resources under a public cloud service model, a second entity subscribes to the cloud services of the first provider entity and uses the cloud computing resources to operate the data intake and query system 2510, and a third entity can subscribe to the services of the second provider entity in order to use the functionality of the data intake and query system 2510. In this example, the data sources are associated with the third entity, users accessing the data intake and query system 2510 are associated with the third entity, and the analytics and insights provided by the data intake and query system 2510 are for purposes of the third entity's operations.

Figure 26:
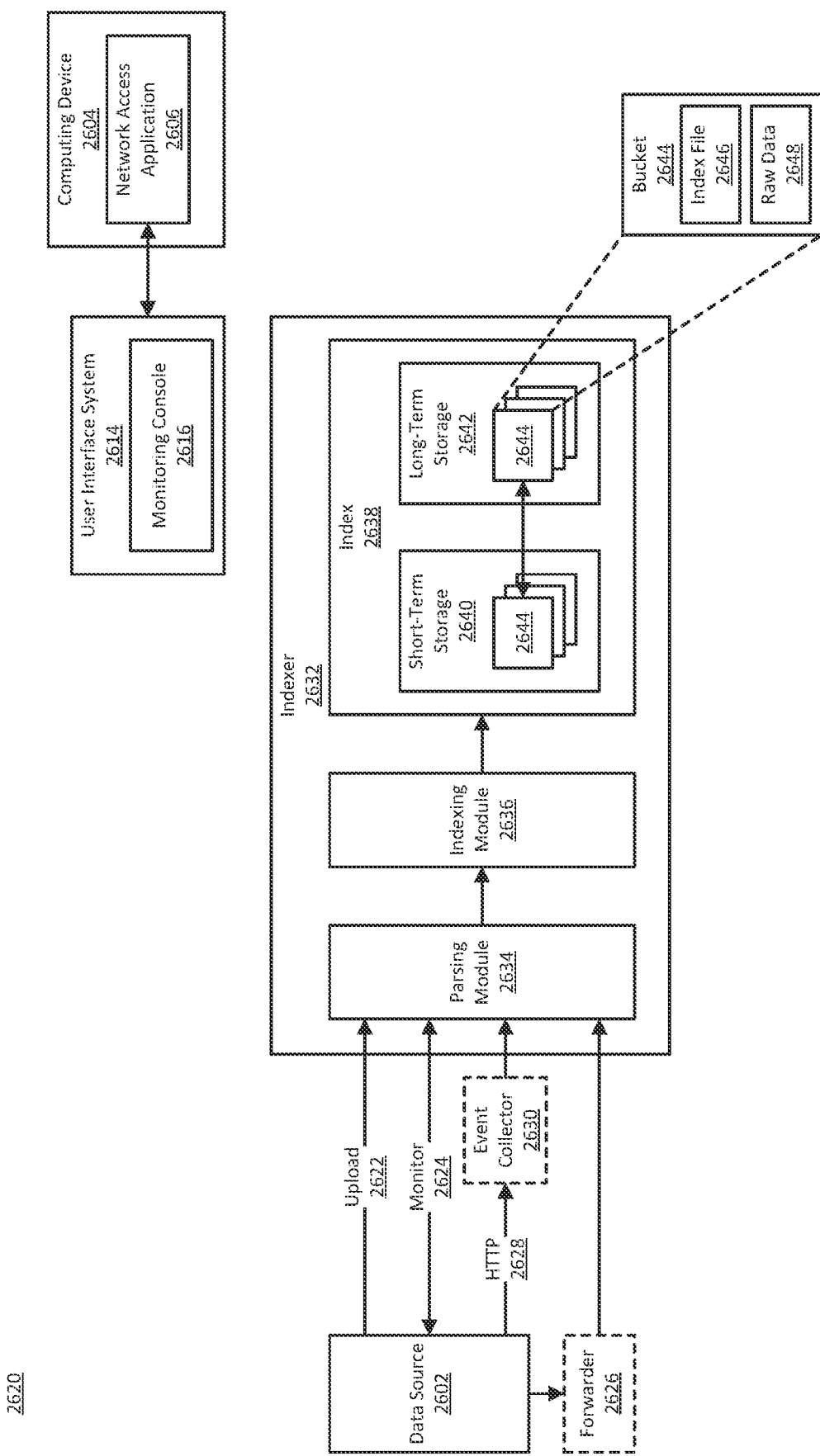
FIG. 26 is a block diagram illustrating in greater detail an example of an indexing system of a data intake and query system, such as the data intake and query system of FIG. 25.

FIG. 26 is a block diagram illustrating in greater detail an example of an indexing system 2620 of a data intake and query system, such as the data intake and query system 2510 of FIG. 25. The indexing system 2620 of FIG. 26 uses various methods to obtain machine data from a data source 2602 and stores the data in an index 2638 of an indexer 2632. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 2620 enables the data intake and query system to obtain the machine data produced by the data source 2602 and to store the data for searching and retrieval.

Users can administer the operations of the indexing system 2620 using a computing device 2604 that can access the indexing system 2620 through a user interface system 2614 of the data intake and query system. For example, the computing device 2604 can be executing a network access application 2606, such as a web browser or a terminal, through which a user can access a monitoring console 2616 provided by the user interface system 2614. The monitoring console 2616 can enable operations such as: identifying the data source 2602 for indexing; configuring the indexer 2632 to index the data from the data source 2632; configuring a data ingestion method; configuring, deploying, and managing clusters of indexers; and viewing the topology and performance of a deployment of the data intake and query system, among other operations. The operations performed by the indexing system 2620 may be referred to as "index time" operations, which are distinct from "search time" operations that are discussed further below.

The indexer 2632, which may be referred to herein as a data indexing component, coordinates and performs most of the index time operations. The indexer 2632 can be implemented using program code that can be executed on a computing device. The program code for the indexer 2632 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 2632. In some implementations, the indexer 2632 executes on the computing device 2604 through which a user can access the indexing system 2620. In some implementations, the indexer 2632 executes on a different computing device.

The indexer 2632 may be executing on the computing device that also provides the data source 2602 or may be executing on a different computing device. In implementations wherein the indexer 2632 is on the same computing device as the data source 2602, the data produced by the data source 2602 may be referred to as "local data." In other implementations the data source 2602 is a component of a first computing device and the indexer 2632 executes on a second computing device that is different from the first computing device. In these implementations, the data produced by the data source 2602 may be referred to as "remote data." In some implementations, the first computing device is "on-prem" and in some implementations the first computing device is "in the cloud." In some implementations, the indexer 2632 executes on a computing device in the cloud and the operations of the indexer 2632 are provided as a service to entities that subscribe to the services provided by the data intake and query system.

For a given data produced by the data source 2602, the indexing system 2620 can be configured to use one of several methods to ingest the data into the indexer 2632. These methods include upload 2622, monitor 2624, using a forwarder 2626, or using HyperText Transfer Protocol (HTTP 2628) and an event collector 2630. These and other methods for data ingestion may be referred to as "getting data in" (GDI) methods.

Using the upload 2622 method, a user can instruct the indexing system to 2602 to specify a file for uploading into the indexer 2632. For example, the monitoring console 2616 can include commands or an interface through which the user can specify where the file is located (e.g., on which computing device and/or in which directory of a file system) and the name of the file. Once uploading is initiated, the indexer 2632 processes the file, as discussed further below. Uploading is a manual process and occurs when instigated by a user. For automated data ingestion, the other ingestion methods are used.

The monitor 2624 method enables the indexing system 2602 to monitor the data source 2602 and continuously or periodically obtain data produced by the data source 2602 for ingestion by the indexer 2632. For example, using the monitoring console 2616, a user can specify a file or directory for monitoring. In this example, the indexing system 2602 can execute a monitoring process that detects whenever data is added to the file or directory and causes the data to be sent to the indexer 2632. As another example, a user can specify a network port for monitoring. In this example, a monitoring process can capture data received at or transmitting from the network port and cause the data to be sent to the indexer 2632. In various examples, monitoring can also be configured for data sources such as operating system event logs, performance data generated by an operating system, operating system registries, operating system directory services, and other data sources.

Monitoring is available when the data source 2602 is local to the indexer 2632 (e.g., the data source 2602 is on the computing device where the indexer 2632 is executing). Other data ingestion methods, including forwarding and the event collector 2630, can be used for either local or remote data sources.

A forwarder 2626, which may be referred to herein as a data forwarding component, is a software process that sends data from the data source 2602 to the indexer 2632. The forwarder 2626 can be implemented using program code that can be executed on the computer device that provides the data source 2602. A user launches the program code for the forwarder 2626 on the computing device that provides the data source 2602. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 2626 can provide various capabilities. For example, the forwarder 2626 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 2626 can break the data into individual events (event generation is discussed further below) and send the events to a receiver. Other operations that the forwarder 2626 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 2630 provides an alternate method for obtaining data from the data source 2602. The event collector 2630 enables data and application events to be sent to the indexer 2632 using HTTP 2628. The event collector 2630 can be implemented using program code that can be executing on a computing device. The program code may be a component of the data intake and query system or can be a standalone component that can be executed independently of the data intake and query system and operates in cooperation with the data intake and query system.

To use the event collector 2630, a user can, for example using the monitoring console 2616 or a similar interface provided by the user interface system 2614, enable the event collector 2630 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 2602 as an alternative method to using a username and password for authentication.

To send data to the event collector 2630, the data source 2602 is supplied with a token and can then send HTTP 2628 requests to the event collector 2630. To send HTTP 2628 requests, the data source 2602 can be configured to use an HTTP client and/or to use logging libraries such as those supplied by Java, JavaScript, and .NET libraries. An HTTP client enables the data source 2602 to send data to the event collector 2630 by supplying the data, and a Uniform Resource Identifier (URI) for the event collector 2630 to the HTTP client. The HTTP client then handles establishing a connection with the event collector 2630, transmitting a request containing the data, closing the connection, and receiving an acknowledgment if the event collector 2630 sends one. Logging libraries enable HTTP 2628 requests to the event collector 2630 to be generated directly by the data source. For example, an application can include or link a logging library, and through functionality provided by the logging library manage establishing a connection with the event collector 2630, transmitting a request, and receiving an acknowledgement.

An HTTP 2628 request to the event collector 2630 can contain a token, a channel identifier, event metadata, and/or event data. The token authenticates the request with the event collector 2630. The channel identifier, if available in the indexing system 2620, enables the event collector 2630 to segregate and keep separate data from different data sources. The event metadata can include one or more key-value pairs that describe the data source 2602 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 2630 extracts events from HTTP 2628 requests and sends the events to the indexer 2632. The event collector 2630 can further be configured to send events or event data to one or more indexers. Extracting the events can include associating any metadata in a request with the event or events included in the request. In these implementations, event generation by the indexer 2632 (discussed further below) is bypassed, and the indexer 2632 moves the events directly to indexing. In some implementations, the event collector 2630 extracts event data from a request and outputs the event data to the indexer 2632, and the indexer generates events from the event data. In some implementations, the event collector 2630 sends an acknowledgement message to the data source 2602 to indicate that the event collector 2630 has received a particular request form the data source 2602, and/or to indicate to the data source 2602 that events in the request have been added to an index.

The indexer 2632 ingests incoming data and transforms the data into searchable knowledge in the form of events. In the data intake and query system, an event is a single piece of data that represents activity of the component represented in FIG. 26 by the data source 2602. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 2632 can include a parsing module 2634 and an indexing module 2636 for generating and storing the events. The parsing module 2634 and indexing module 2636 can be modular and pipelined, such that one component can be operating on a first set of data while the second component is simultaneously operating on a second sent of data. Additionally, the indexer 2632 may at any time have multiple instances of the parsing module 2634 and indexing module 2636, with each set of instances configured to simultaneously operate on data from the same data source or from different data sources. The parsing module 2634 and indexing module 2636 are illustrated to facilitate discussion, with the understanding that implementations with other components are possible to achieve the same functionality.

The parsing module 2634 determines information about event data, where the information can be used to identify events within the event data. For example, the parsing module 2634 can associate a source type with the event data. A source type identifies the data source 2602 and describes a possible data structure of event data produced by the data source 2602. For example, the source type can indicate which fields to expect in events generated at the data source 2602 and the keys for the values in the fields, and possibly other information such as sizes of fields, an order of the fields, a field separator, and so on. The source type of the data source 2602 can be specified when the data source 2602 is configured as a source of event data. Alternatively, the parsing module 2634 can determine the source type from the event data, for example from an event field or using machine learning.

Other information that the parsing module 2634 can determine includes timestamps. In some cases, an event includes a timestamp as a field, and the timestamp indicates a point in time when the action represented by the event occurred or was recorded by the data source 2602 as event data. In these cases, the parsing module 2634 may be able to determine from the source type associated with the event data that the timestamps can be extracted from the events themselves. In some cases, an event does not include a timestamp and the parsing module 2634 determines a timestamp for the event, for example from a name associated with the event data from the data source 2602 (e.g., a file name when the event data is in the form of a file) or a time associated with the event data (e.g., a file modification time). As another example, when the parsing module 2634 is not able to determine a timestamp from the event data, the parsing module 2634 may use the time at which it is indexing the event data. As another example, the parsing module 2634 can use a user-configured rule to determine the timestamps to associate with events.

The parsing module 2634 can further determine event boundaries. In some cases, a single line (e.g., a sequence of characters ending with a line termination) in event data represents one event while in other cases, a single line represents multiple events. In yet other cases, one event may span multiple lines within the event data. The parsing module 2634 may be able to determine event boundaries from the source type associated with the event data, for example from a data structure indicated by the source type. In some implementations, a user can configure rules the parsing module 2634 can use to identify event boundaries.

The parsing module 2634 can further extract data from events and possibly also perform transformations on the events. For example, the parsing module 2634 can extract a set of fields for each event, such as a host or hostname, source or source name, and/or source type. The parsing module 2634 may extract certain fields by default or based on a user configuration. Alternatively or additionally, the parsing module 2634 may add fields to events, such as a source type or a user-configured field. As another example of a transformation, the parsing module 2634 can anonymize fields in events to mask sensitive information, such as social security numbers or account numbers. Anonymizing fields can include changing or replacing values of specific fields. The parsing component 2634 can further perform user-configured transformations.

The parsing module 2634 outputs the results of processing incoming event data to the indexing module 2636, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 2632 can be configured to identify searchable segments that are parts of fields, searchable segments that are entire fields, or both. The parsing module 2634 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 2646, to find event data that matches a search query. In some implementations, segmentation can alternatively be performed by the forwarder 2626. Segmentation can also be disabled, in which case the indexer 2632 will not build a lexicon for the event data. When segmentation is disabled, the search system searches the event data directly.

Building index data structures generates the index 2638. The index 2638 is a storage data structure on a storage device (e.g., a disk drive or other physical device for storing digital data). The storage device may be a component of the computing device on which the indexer 2632 is operating (referred to herein as local storage) or may be a component of a different computing device (referred to herein as remote storage) that the indexer 2638 has access to over a network. The indexer 2632 can include more than one index and can include indexes of different types. For example, the indexer 2632 can include event indexes, which impose minimal structure on stored data and can accommodate any type of data. As another example, the indexer 2632 can include metrics indexes, which use a highly structured format to handle the higher volume and lower latency demands associated with metrics data.

The indexing module 2636 organizes files in the index 2638 in directories referred to as buckets. The files in a bucket 2644 can include raw data files, index files, and possibly also other metadata files. As used herein, "raw data" means data as when the data was produced by the data source 2602, without alteration to the format or content. As noted previously, the parsing component 2634 may add fields to event data and/or perform transformations on fields in the event data, and thus a raw data file 2648 can include, in addition to or instead of raw data, what is referred to herein as enriched raw data. The raw data file 2648 may be compressed to reduce disk usage. An index file 2646, which may also be referred to herein as a "time-series index" or tsidx file, contains metadata that the indexer 2632 can use to search a corresponding raw data file 2648. As noted above, the metadata in the index file 2646 includes a lexicon of the event data, which associates each unique keyword in the event data in the raw data file 2648 with a reference to the location of event data within the raw data file 2648. The keyword data in the index file 2646 may also be referred to as an inverted index. In various implementations, the data intake and query system can use index files for other purposes, such as to store data summarizations that can be used to accelerate searches.

A bucket 2644 includes event data for a particular range of time. The indexing module 2636 arranges buckets in the index 2638 according to the age of the buckets, such that buckets for more recent ranges of time are stored in short-term storage 2640 and buckets for less recent ranges of time are stored in long-term storage 2642. Short-term storage 2640 may be faster to access while long-term storage 2642 may be slower to access. Buckets may move from short-term storage 2640 to long-term storage 2642 according to a configurable data retention policy, which can indicate at what point in time a bucket is old enough to be moved.

A bucket's location in short-term storage 2640 or long-term storage 2642 can also be indicated by the bucket's status. As an example, a bucket's status can be "hot," "warm," "cold," "frozen," or "thawed." In this example, hot bucket is one to which the indexer 2632 is writing data and the bucket becomes a warm bucket when the index 2632 stops writing data to it. In this example, both hot and warm buckets reside in short-term storage 2640. Continuing this example, when a warm bucket is moved to long-term storage 2642, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 2620 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 2620 through the monitoring console 2616 provided by the user interface system 2614. Using the monitoring console 2616, the user can configure and monitor an index cluster, and see information such as disk usage by an index, volume usage by an indexer, index and volume size over time, data age, statistics for bucket types, and bucket settings, among other information.

Figure 27:
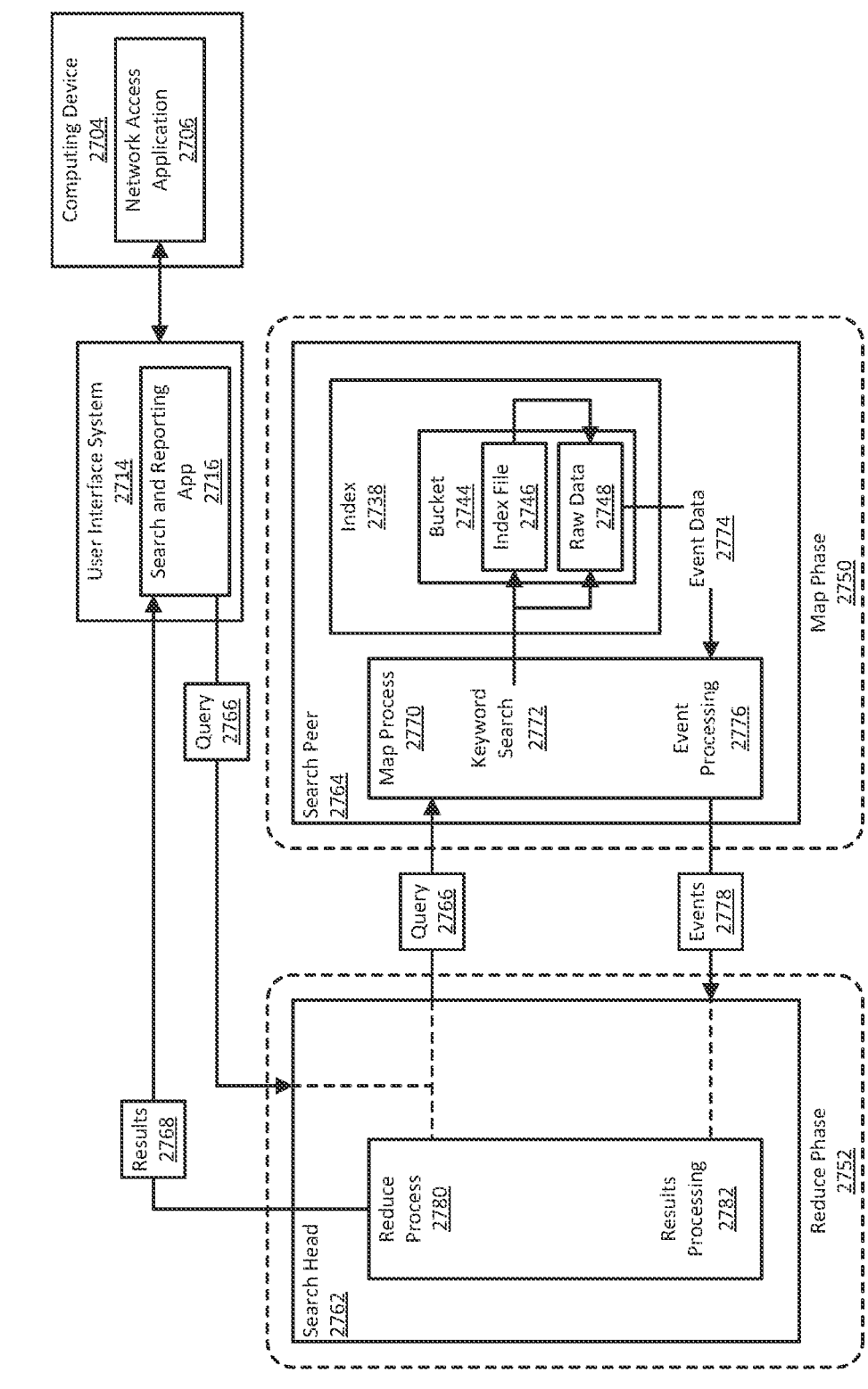
FIG. 27 is a block diagram illustrating in greater detail an example of the search system of a data intake and query system, such as the data intake and query system of FIG. 25.

FIG. 27 is a block diagram illustrating in greater detail an example of the search system 2760 of a data intake and query system, such as the data intake and query system 2510 of FIG. 25. The search system 2760 of FIG. 27 issues a query 2766 to a search head 2762, which sends the query 2766 to a search peer 2764. Using a map process 2770, the search peer 2764 searches the appropriate index 2738 for events identified by the query 2766 and sends events 2778 so identified back to the search head 2762. Using a reduce process 2782, the search head 2762 processes the events 2778 and produces results 2768 to respond to the query 2766. The results 2768 can provide useful insights about the data stored in the index 2738. These insights can aid in the administration of information technology systems, in security analysis of information technology systems, and/or in analysis of the development environment provided by information technology systems.

The query 2766 that initiates a search is produced by a search and reporting app 2716 that is available through the user interface system 2714 of the data intake and query system. Using a network access application 2706 executing on a computing device 2704, a user can input the query 2766 into a search field provided by the search and reporting app 2716. Alternatively or additionally, the search and reporting app 2716 can include pre-configured queries or stored queries that can be activated by the user. In some cases, the search and reporting app 2716 initiates the query 2766 when the user enters the query 2766. In these cases, the query 2766 maybe referred to as an "ad-hoc" query. In some cases, the search and reporting app 2716 initiates the query 2766 based on a schedule. For example, the search and reporting app 2716 can be configured to execute the query 2766 once per hour, once per day, at a specific time, on a specific date, or at some other time that can be specified by a date, time, and/or frequency. These types of queries maybe referred to as scheduled queries.

The query 2766 is specified using a search processing language. The search processing language includes commands that the search peer 2764 will use to identify events to return in the search results 2768. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 2766 to include sequential commands, where a subsequent command may operate on the results of a prior command. As an example, sequential commands may be separated in the query 2766 by a vertical line ("I" or "pipe") symbol.

In addition to one or more search commands, the query 2766 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 2766 occurs in two broad phases: a map phase 2750 and a reduce phase 2752. The map phase 2750 takes place across one or more search peers. In the map phase 2750, the search peers locate event data that matches the search terms in the search query 2766 and sorts the event data into field-value pairs. When the map phase 2750 is complete, the search peers send events that they have found to one or more search heads for the reduce phase 2752. During the reduce phase 2752, the search heads process the events through commands in the search query 2766 and aggregate the events to produce the final search results 2768.

A search head, such as the search head 2762 illustrated in FIG. 27, is a component of the search system 2760 that manages searches. The search head 2762, which may also be referred to herein as a search management component, can be implemented using program code that can be executed on a computing device. The program code for the search head 2762 can be stored on a non-transitory computer-readable medium and from this medium can be loaded or copied to the memory of a computing device. One or more hardware processors of the computing device can read the program code from the memory and execute the program code in order to implement the operations of the search head 2762.

Upon receiving the search query 2766, the search head 2762 directs the query 2766 to one or more search peers, such as the search peer 2764 illustrated in FIG. 27. "Search peer" is an alternate name for "indexer" and a search peer may be largely similar to the indexer described previously. The search peer 2764 may be referred to as a "peer node" when the search peer 2764 is part of an indexer cluster. The search peer 2764, which may also be referred to as a search execution component, can be implemented using program code that can be executed on a computing device. In some implementations, one set of program code implements both the search head 2762 and the search peer 2764 such that the search head 2762 and the search peer 2764 form one component. In some implementations, the search head 2762 is an independent piece of code that performs searching and no indexing functionality. In these implementations, the search head 2762 may be referred to as a dedicated search head.

The search head 2762 may consider multiple criteria when determining whether to send the query 2766 to the particular search peer 2764. For example, the search system 2760 may be configured to include multiple search peers that each have duplicative copies of at least some of the event data. In this example, the sending the search query 2766 to more than one search peer allows the search system 2760 to distribute the search workload across different hardware resources. As another example, search system 2760 may include different search peers for different purposes (e.g., one has an index storing a first type of data or from a first data source while a second has an index storing a second type of data or from a second data source). In this example, the search query 2766 may specify which indexes to search, and the search head 2762 will send the query 2766 to the search peers that have those indexes.

To identify events 2778 to send back to the search head 2762, the search peer 2764 performs a map process 2770 to obtain event data 2774 from the index 2738 that is maintained by the search peer 2764. During a first phase of the map process 2770, the search peer 2764 identifies buckets that have events that are described by the time indicator in the search query 2766. As noted above, a bucket contains events whose timestamps fall within a particular range of time. For each bucket 2744 whose events can be described by the time indicator, during a second phase of the map process 2770, the search peer 2764 performs a keyword search 2774 using search terms specified in the search query 2766. The search terms can be one or more of keywords, phrases, fields, Boolean expressions, and/or comparison expressions that in combination describe events being searched for. When segmentation is enabled at index time, the search peer 2764 performs the keyword search 2772 on the bucket's index file 2746. As noted previously, the index file 2746 includes a lexicon of the searchable terms in the events stored in the bucket's raw data 2748 file. The keyword search 2772 searches the lexicon for searchable terms that correspond to one or more of the search terms in the query 2766. As also noted above, the lexicon incudes, for each searchable term, a reference to each location in the raw data 2748 file where the searchable term can be found. Thus, when the keyword search identifies a searchable term in the index file 2746 that matches query 2766, the search peer 2764 can use the location references to extract from the raw data 2748 file the event data 2774 for each event that include the searchable term.

In cases where segmentation was disabled at index time, the search peer 2764 performs the keyword search 2772 directly on the raw data 2748 file. To search the raw data 2748, the search peer 2764 may identify searchable segments in events in a similar manner as when the data was indexed. Thus, depending on how the search peer 2764 is configured, the search peer 2764 may look at event fields and/or parts of event fields to determine whether an event matches the query 2766. Any matching events can be added to the event data 2774 read from the raw data 2748 file. The search peer 2764 can further be configured to enable segmentation at search time, so that searching of the index 2738 causes the search peer 2764 to build a lexicon in the index file 2746.

The event data 2774 obtained from the raw data 2748 file includes the full text of each event found by the keyword search 2772. During a third phase of the map process 2770, the search peer 2764 performs event processing 2776 on the event data 2774, with the steps performed being determined by the configuration of the search peer 2764 and/or commands in the search query 2766. For example, the search peer 2764 can be configured to perform field discovery and field extraction. Field discovery is a process by which the search peer 2764 identifies and extracts key-value pairs from the events in the event data 2774. The search peer 2764 can, for example, be configured to automatically extract the first 100 fields (or another number of fields) in the event data 2774 that can be identified as key-value pairs. As another example, the search peer 2764 can extract any fields explicitly mentioned in the search query 2766. The search peer 2764 can, alternatively or additionally, be configured with particular field extractions to perform.

Other examples of steps that can be performed during event processing 2776 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 2764 sends processed events 2778 to the search head 2762, which performs a reduce process 2780.

The reduce process 2780 potentially receives events from multiple search peers and performs various results processing 2782 steps on the events. The results processing 2782 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 2782 can further include applying commands from the search query 2766 to the events. The query 2766 can include, for example, commands for evaluating and/or manipulating fields (e.g., to generate new fields from existing fields or parse fields that have more than one value). As another example, the query 2766 can include commands for calculating statistics over the events, such as counts of the occurrences of fields, or sums, averages, ranges, and so on, of field values. As another example, the query 2766 can include commands for generating statistical values for purposes of generating charts of graphs of the events.

Through results processing 2782, the reduce process 2780 produces the events found by processing the search query 2766, as well as some information about the events, which the search head 2762 outputs to the search and reporting app 2716 as search results 2768. The search and reporting app 2716 can generate visual interfaces for viewing the search results 2768. The search and reporting app 2716 can, for example, output visual interfaces for the network access application 2706 running on a computing device 2704 to generate.

The visual interfaces can include various visualizations of the search results 2768, such as tables, line or area charts, Chloropleth maps, or single values. The search and reporting app 2716 can organize the visualizations into a dashboard, where the dashboard includes a panel for each visualization. A dashboard can thus include, for example, a panel listing the raw event data for the events in the search results 2768, a panel listing fields extracted at index time and/or found through field discovery along with statistics for those fields, and/or a timeline chart indicating how many events occurred at specific points in time (as indicated by the timestamps associated with each event). In various implementations, the search and reporting app 2716 can provide one or more default dashboards. Alternatively or additionally, the search and reporting app 2716 can include functionality that enables a user to configure custom dashboards.

The search and reporting app 2716 can also enable further investigation into the events in the search results 2716. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 2766. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the techniques described herein can be performed in a different sequence, can be added, merged, or left out altogether (e.g., not all are necessary for the practice of the techniques). In certain embodiments, operations, acts, functions, or events can be performed concurrently, e.g., through multi-threaded processing, interrupt processing, or multiple processors or processor cores or on other parallel architectures, rather than sequentially.

The invention claimed is:

1. A computing device, comprising:
one or more hardware processors; and
a non-transitory computer-readable medium having stored thereon instructions that, when executed by the one or more hardware processors, cause the one or more hardware processors to perform operations comprising:
generating a cohort definition using a machine learning model based on a combination of a number (D) of dimensions selected from a first data set comprising first data points, wherein the cohort definition clusters the first data points into a number (K) of first clusters, each of the first clusters having a first center point;
applying the machine learning model to a second data set comprising second data points to determine a second center point for each of K of second clusters;
causing a user interface to be presented on a display device, the user interface comprising an indication of a difference measure between the first clusters and the second clusters, wherein the different measure is generated based on a difference vector determined for each second center point and a nearest first center point.

2. The computing device of claim 1, the operations further comprising:
determining, for each second cluster:
a first cluster having a first center point nearest to the second center point of the second cluster; and
a difference scalar between a number of second data points assigned to the second cluster and a number of first data points assigned to the first cluster;
wherein the determining of the difference measure between the first clusters and the second clusters is further based on the determined difference scalars.

3. The computing device of claim 1, the operations further comprising:
based on the difference measure between the first clusters and the second clusters and a predetermined threshold, the user interface further comprises a recommendation to select different dimensions for clustering.

4. The computing device of claim 1, the operations further comprising:
applying the cohort definition to a third data set comprising third data points to determine a third center point for each of K of third clusters and assign each data point in the third data set to a third cluster;
determining, for each third center point, a second difference vector from a nearest second center point to the third center point; and
based on the determined second difference vectors, determining a second difference measure between the second clusters and the third clusters;
wherein the user interface further comprises an indication of the second difference measure.

5. The computing device of claim 1, wherein:
the first data points comprise data for a first period of time; and
the second data points comprise data for a second period of time.

6. The computing device of claim 1, wherein the applying of the cohort definition to the first data set comprising the first data points comprises applying K-means clustering to the first data points.

7. The computing device of claim 1, wherein the operations further comprise:
generating the first data points by linking customer relationship management (CRM) and product usage data using shared identifiers.

8. The computing device of claim 7, wherein the operations further comprise:
accessing CRM data that indicates a parent-subsidiary relationship between a parent account and a subsidiary account; and
accessing first product usage data that is linked to both the parent account and the subsidiary account; wherein
the generating of the first data points comprises generating a data point that links the first product usage data to the subsidiary account.

9. A non-transitory computer-readable medium having stored thereon instructions that, when executed by one or more processors, cause the one or more processors to perform operations including:
generating a cohort definition using a machine learning model based on a combination of a number (D) of dimensions selected from a first data set comprising first data points, wherein the cohort definition clusters the first data points into a number (K) of first clusters, each of the first clusters having a first center point;
applying the machine learning model to a second data set comprising second data points to determine a second center point for each of K of second clusters;
causing a user interface to be presented on a display device, the user interface comprising an indication of a difference measure between the first clusters and the second clusters, wherein the different measure is generated based on a difference vector determined for each second center point and a nearest first center point.

10. The non-transitory computer-readable medium of claim 9, the operations further comprising:
determining, for each second cluster:
a first cluster having a first center point nearest to the second center point of the second cluster; and
a difference scalar between a number of second data points assigned to the second cluster and a number of first data points assigned to the first cluster;
wherein the determining of the difference measure between the first clusters and the second clusters is further based on the determined difference scalars.

11. The non-transitory computer-readable medium of claim 9, the operations further comprising:
based on the difference measure between the first clusters and the second clusters and a predetermined threshold, the user interface further comprises a recommendation to select different dimensions for clustering.

12. The non-transitory computer-readable medium of claim 9, the operations further comprising:
applying the cohort definition to a third data set comprising third data points to determine a third center point for each of K of third clusters and assign each data point in the third data set to a third cluster;
determining, for each third center point, a second difference vector from a nearest second center point to the third center point; and based on the determined second difference vectors, determining a second difference measure between the second clusters and the third clusters;

wherein the user interface further comprises an indication of the second difference measure.

13. The non-transitory computer-readable medium of claim 9, wherein:
the first data points comprise data for a first period of time; and
the second data points comprise data for a second period of time.

14. The non-transitory computer-readable medium of claim 9, wherein the applying of the cohort definition to the first data set comprising the first data points comprises applying K-means clustering to the first data points.

15. The non-transitory computer-readable medium of claim 9, wherein the operations further comprise:
generating the first data points by linking customer relationship management (CRM) and product usage data using shared identifiers.

16. The non-transitory computer-readable medium of claim 15, wherein the operations further comprise:
accessing CRM data that indicates a parent-subsidiary relationship between a parent account and a subsidiary account; and
accessing first product usage data that is linked to both the parent account and the subsidiary account; wherein
the generating of the first data points comprises generating a data point that links the first product usage data to the subsidiary account.

17. A computer-implemented method, comprising:
generating, by one or more processors, a cohort definition using a machine learning model based on a combination of a number (D) of dimensions selected from a first data set comprising first data points, wherein the cohort definition clusters the first data points into a number (K) of first clusters, each of the first clusters having a first center point;
applying the machine learning model to a second data set comprising second data points to determine a second center point for each of K of second clusters;
causing a user interface to be presented on a display device, the user interface comprising an indication of a difference measure between the first clusters and the second clusters, wherein the different measure is generated based on a difference vector determined for each second center point and a nearest first center point.

18. The computer-implemented method of claim 17, further comprising:
determining, for each second cluster:
a first cluster having a first center point nearest to the second center point of the second cluster; and
a difference scalar between a number of second data points assigned to the second cluster and a number of first data points assigned to the first cluster;
wherein the determining of the difference measure between the first clusters and the second clusters is further based on the determined difference scalars.

19. The computer-implemented method of claim 17, further comprising:
based on the difference measure between the first clusters and the second clusters and a predetermined threshold, the user interface further comprises a recommendation to select different dimensions for clustering.

20. The computer-implemented method of claim 17, further comprising:
applying the cohort definition to a third data set comprising third data points to determine a third center point for each of K of third clusters and assign each data point in the third data set to a third cluster;
determining, for each third center point, a second difference vector from a nearest second center point to the third center point; and
based on the determined second difference vectors, determining a second difference measure between the second clusters and the third clusters;
wherein the user interface further comprises an indication of the second difference measure.

* * * * *